United States Patent
Choi et al.

(10) Patent No.: US 10,635,379 B2
(45) Date of Patent: Apr. 28, 2020

(54) METHOD FOR SHARING SCREEN BETWEEN DEVICES AND DEVICE USING THE SAME

(71) Applicant: Samsung Electronics Co., Ltd., Gyeonggi-do (KR)

(72) Inventors: Seung-hwan Choi, Gyeonggi-do (KR); Im-kyeong You, Seoul (KR); Young-bin Jung, Gyeonggi-do (KR); Jung-hyun Shim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/416,901

(22) Filed: May 20, 2019

(65) Prior Publication Data
US 2019/0272142 A1    Sep. 5, 2019

Related U.S. Application Data

(63) Continuation of application No. 14/886,929, filed on Oct. 19, 2015, now Pat. No. 10,353,661.

(30) Foreign Application Priority Data

Oct. 17, 2014  (KR) .................. 10-2014-0140804

(51) Int. Cl.
*G06F 3/14* (2006.01)
*G09G 5/00* (2006.01)
(Continued)

(52) U.S. Cl.
CPC ........ *G06F 3/1454* (2013.01); *G06F 3/04817* (2013.01); *G06F 3/04842* (2013.01);
(Continued)

(58) Field of Classification Search
CPC ............. G06F 3/04817; G06F 3/04842; G06F 3/1423; G06F 3/1454; G09G 2354/00;
(Continued)

(56) References Cited

U.S. PATENT DOCUMENTS

| 4,513,317 A | 4/1985 | Ruoff, Jr. |
| 5,422,653 A | 6/1995 | Maguire, Jr. |

(Continued)

FOREIGN PATENT DOCUMENTS

| CN | 101924823 | 12/2010 |
| CN | 102123197 | 7/2011 |

(Continued)

OTHER PUBLICATIONS

International Search Report dated Feb. 18, 2016 issued in counterpart application No. PCT/KR2015/010961, 7 pages.

(Continued)

*Primary Examiner* — Tony O Davis
(74) *Attorney, Agent, or Firm* — The Farrell Law Firm, P.C.

(57) ABSTRACT

A method of sharing a screen of a first device with a second device and a device using the same are provided. The method includes transmitting information on a first screen displayed on the first device to the second device, in a first connection state so that a same screen is displayed by the first device and the second device; switching the first connection state between the first device and the second device into a second connection state; and performing a control so that the first screen displayed on the first device is switched into a second screen so that the first screen displayed is continuously displayed on the second device, when a user input is received in a state in which the first connection state is switched into the second connection state in which an independent screen is displayed by the first device and the second device.

20 Claims, 38 Drawing Sheets

(51) Int. Cl.
*G09G 5/14* (2006.01)
*G06F 3/0481* (2013.01)
*G06F 3/0484* (2013.01)
*G09G 5/12* (2006.01)

(52) U.S. Cl.
CPC .......... *G06F 3/1423* (2013.01); *G09G 5/006* (2013.01); *G09G 5/12* (2013.01); *G09G 5/14* (2013.01); *G09G 2354/00* (2013.01); *G09G 2370/16* (2013.01); *G09G 2370/22* (2013.01)

(58) Field of Classification Search
CPC .......... G09G 2370/16; G09G 2370/22; G09G 5/006; G09G 5/12; G09G 5/14
USPC .................................................. 345/1.1, 168
See application file for complete search history.

(56) References Cited

U.S. PATENT DOCUMENTS

| | | | |
|---|---|---|---|
| 6,823,525 | B1 | 11/2004 | Martyn |
| 6,959,450 | B1 | 10/2005 | Ritter |
| 7,284,201 | B2 | 10/2007 | Cohen-Solal |
| 7,850,306 | B2 | 12/2010 | Uusitalo |
| 7,876,978 | B2 | 1/2011 | Berger |
| 8,661,350 | B2 | 2/2014 | Kim et al. |
| 8,819,268 | B1 | 8/2014 | Sauer |
| 8,958,747 | B2 | 2/2015 | Baek et al. |
| 9,047,244 | B1 | 6/2015 | Puppin |
| 9,503,786 | B2 | 11/2016 | el Kaliouby |
| 9,530,450 | B2 | 12/2016 | Laksono |
| 9,646,046 | B2 | 5/2017 | Sadowsky |
| 9,646,196 | B2 | 5/2017 | Miyazaki |
| 9,647,780 | B2 | 5/2017 | Jung |
| 9,792,082 | B1 | 10/2017 | Deyle |
| 9,807,140 | B2 | 10/2017 | Liahm |
| 9,829,970 | B2 | 11/2017 | Ellis |
| 9,906,692 | B2 | 2/2018 | Zou et al. |
| 2004/0160383 | A1 | 8/2004 | Wen |
| 2005/0012813 | A1 | 1/2005 | Wu |
| 2009/0102972 | A1* | 4/2009 | Kurita ................. H04N 1/00137 348/554 |
| 2009/0290753 | A1 | 11/2009 | Liu |
| 2010/0007636 | A1 | 1/2010 | Tomisawa |
| 2011/0029891 | A1 | 2/2011 | Kim et al. |
| 2011/0165841 | A1 | 7/2011 | Baek |
| 2011/0241985 | A1 | 10/2011 | Hill et al. |
| 2012/0042102 | A1 | 2/2012 | Chung |
| 2012/0092235 | A1 | 4/2012 | Ham |
| 2012/0159340 | A1 | 6/2012 | Bae |
| 2012/0281020 | A1 | 11/2012 | Yamamoto |
| 2013/0005250 | A1 | 1/2013 | Kim |
| 2013/0125018 | A1 | 5/2013 | Park |
| 2013/0138728 | A1 | 5/2013 | Kim et al. |
| 2013/0194187 | A1* | 8/2013 | Pasquero ............ G06F 3/04883 345/168 |
| 2013/0219072 | A1 | 8/2013 | Han et al. |
| 2013/0254291 | A1 | 9/2013 | Park |
| 2013/0278484 | A1 | 10/2013 | Hwang et al. |
| 2014/0009394 | A1 | 1/2014 | Lee |
| 2014/0032635 | A1 | 1/2014 | Pimmel et al. |
| 2014/0077690 | A1 | 3/2014 | Lee |
| 2014/0176393 | A1* | 6/2014 | Endo .................... G06F 3/1423 345/1.1 |
| 2014/0293581 | A1 | 10/2014 | Bae |
| 2014/0310256 | A1 | 10/2014 | Olsson |
| 2014/0358992 | A1 | 12/2014 | Lo |
| 2014/0362308 | A1 | 12/2014 | Chen |
| 2015/0058900 | A1 | 2/2015 | Nakagawa |
| 2015/0082058 | A1 | 3/2015 | Hahm |
| 2015/0082241 | A1 | 3/2015 | Kang |
| 2015/0084894 | A1 | 3/2015 | Yang |
| 2015/0120958 | A1 | 4/2015 | Zou et al. |
| 2015/0228705 | A1 | 8/2015 | Kim |
| 2015/0281769 | A1* | 10/2015 | Chiu ........................ H04N 5/38 348/564 |
| 2015/0340646 | A1 | 11/2015 | Shin |
| 2015/0349289 | A1 | 12/2015 | Yu |
| 2015/0357602 | A1 | 12/2015 | Li |
| 2015/0378665 | A1 | 12/2015 | Han |
| 2016/0057567 | A1 | 2/2016 | Nakagawa |
| 2016/0104869 | A1 | 4/2016 | Choi |
| 2016/0110151 | A1 | 4/2016 | Isonishi |
| 2016/0110152 | A1 | 4/2016 | Choi |
| 2016/0143066 | A1 | 5/2016 | Bengtsson |
| 2016/0253142 | A1 | 9/2016 | Choi |
| 2016/0286338 | A1 | 9/2016 | Bengtsson |
| 2016/0313960 | A1 | 10/2016 | Zhou |
| 2016/0321841 | A1 | 11/2016 | Christen |
| 2016/0323542 | A1 | 11/2016 | Kim |

FOREIGN PATENT DOCUMENTS

| | | |
|---|---|---|
| CN | 103294428 | 9/2013 |
| CN | 103379221 | 10/2013 |
| CN | 103534679 | 1/2014 |
| EP | 2 464 082 | 6/2012 |
| KR | 1020120015931 | 2/2012 |
| KR | 1020140093451 | 7/2014 |
| WO | WO 2014/077411 | 5/2014 |
| WO | WO 2014/137200 | 9/2014 |

OTHER PUBLICATIONS

European Search Report dated Aug. 8, 2017 issued in counterpart application No. 15851326.7-1914, 14 pages.
European Search Report dated Dec. 14, 2017 issued in counterpart application No. 15851326.7-1914, 20 pages.
European Search Report dated Dec. 19, 2018 issued in counterpart application No. 15851326.7-1210, 13 pages.
Chinese Office Action dated May 17, 2019 issued in counterpart application No. 201580062292.4, 19 pages.
Summons to Attend Oral Proceedings dated Nov. 21, 2019 issued in counterpart application No. 15851326.7-1210, 23 pages.
Chinese Office Action dated Feb. 6, 2020 issued in counterpart application No. 201580062292.4, 15 pages.

* cited by examiner

FIG. 6B
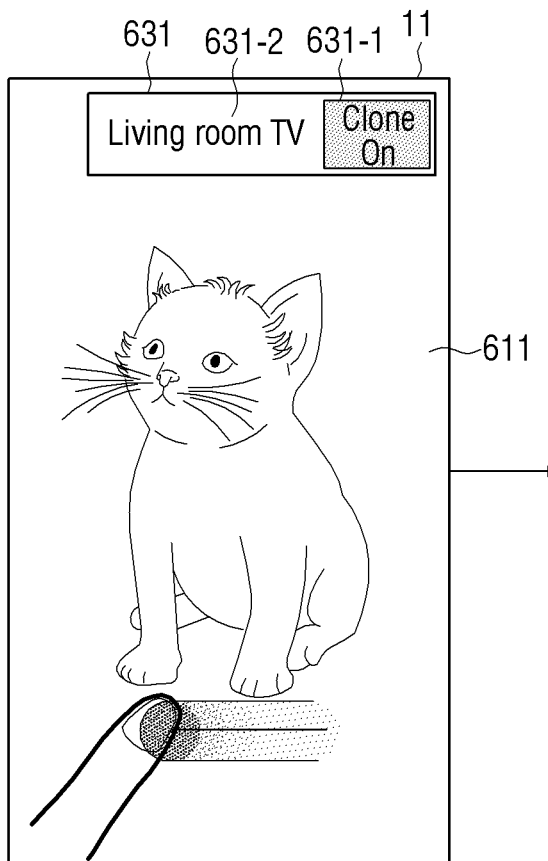
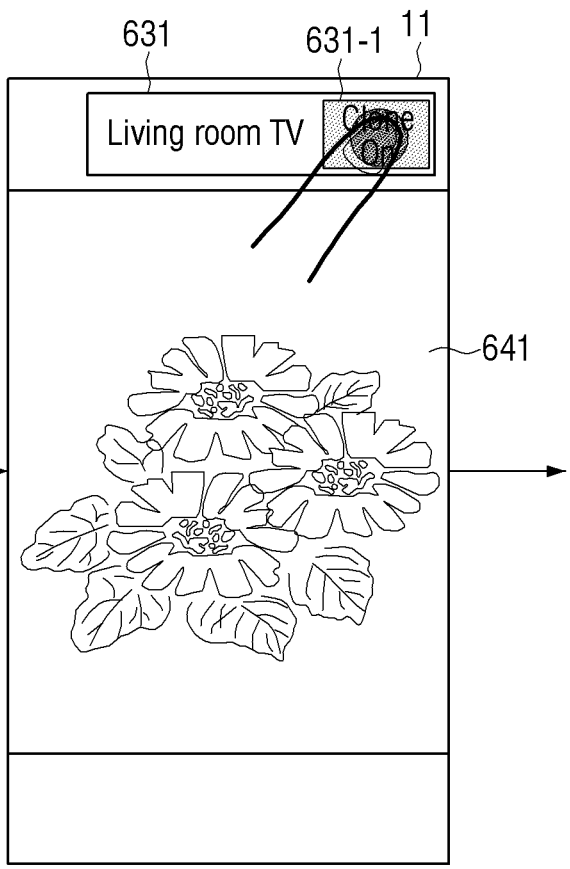
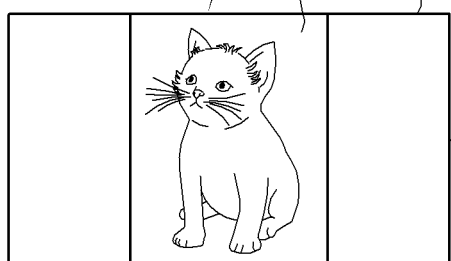
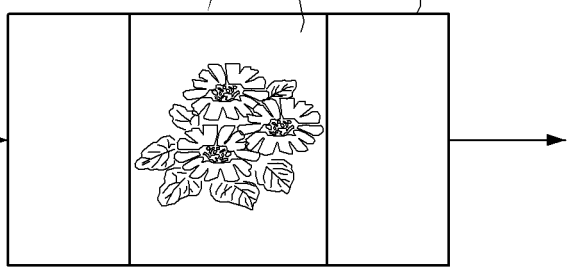

FIG. 6C
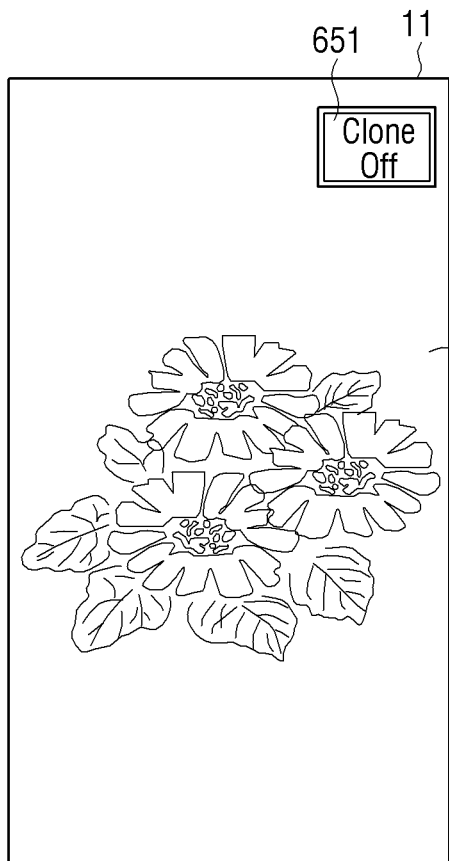
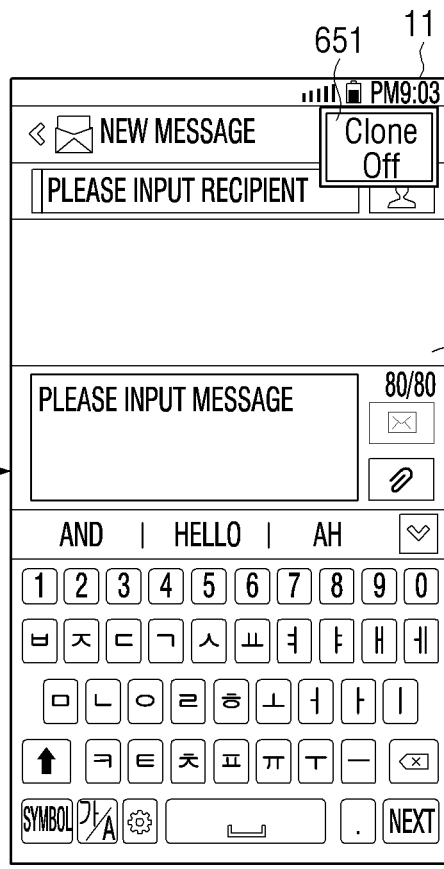
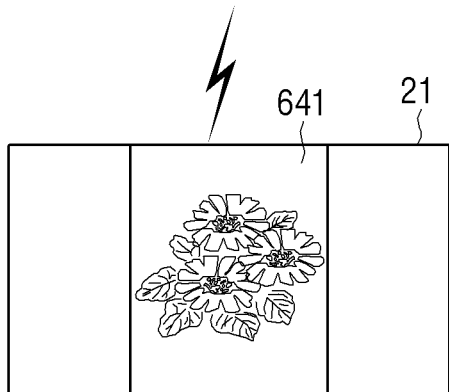
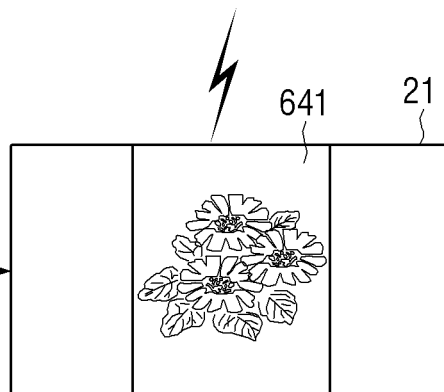

FIG. 6D
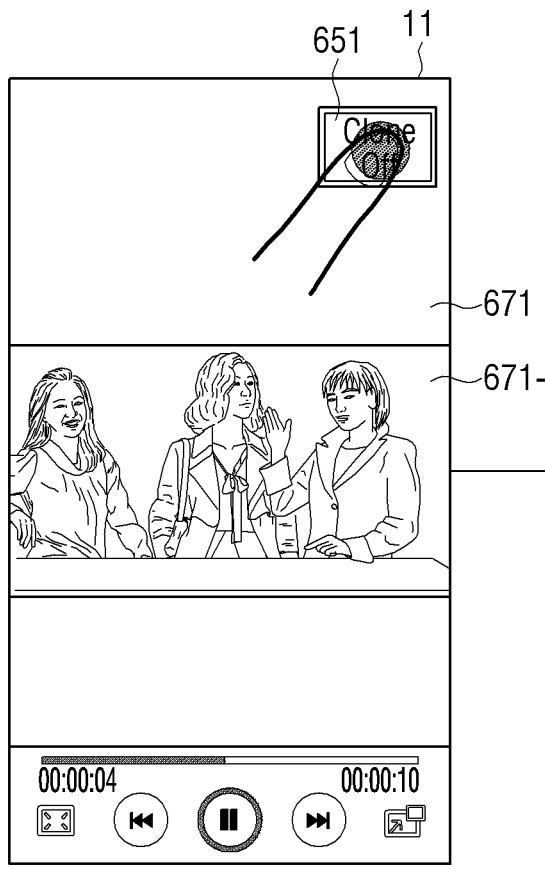
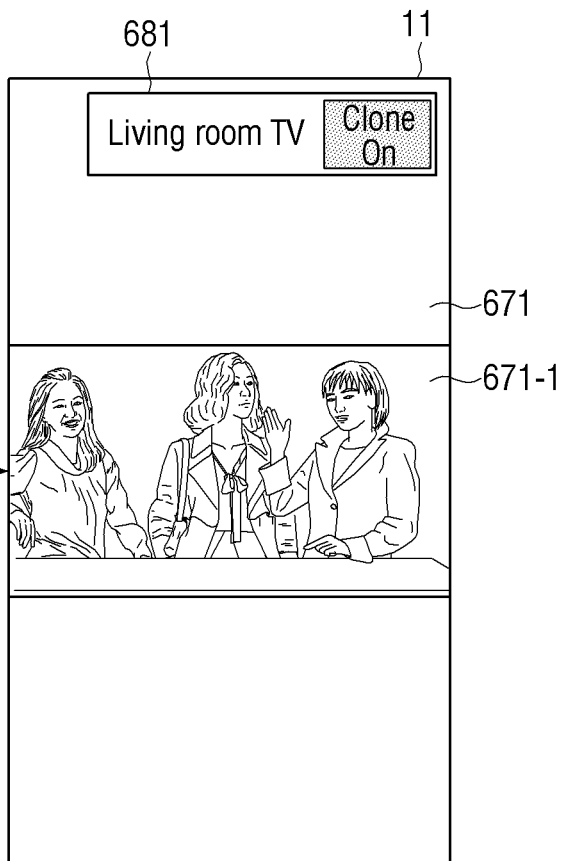
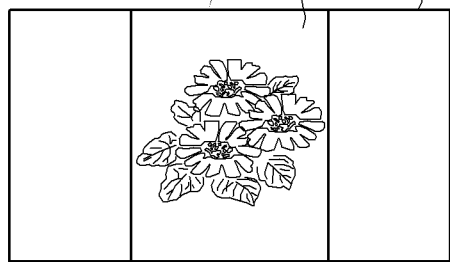

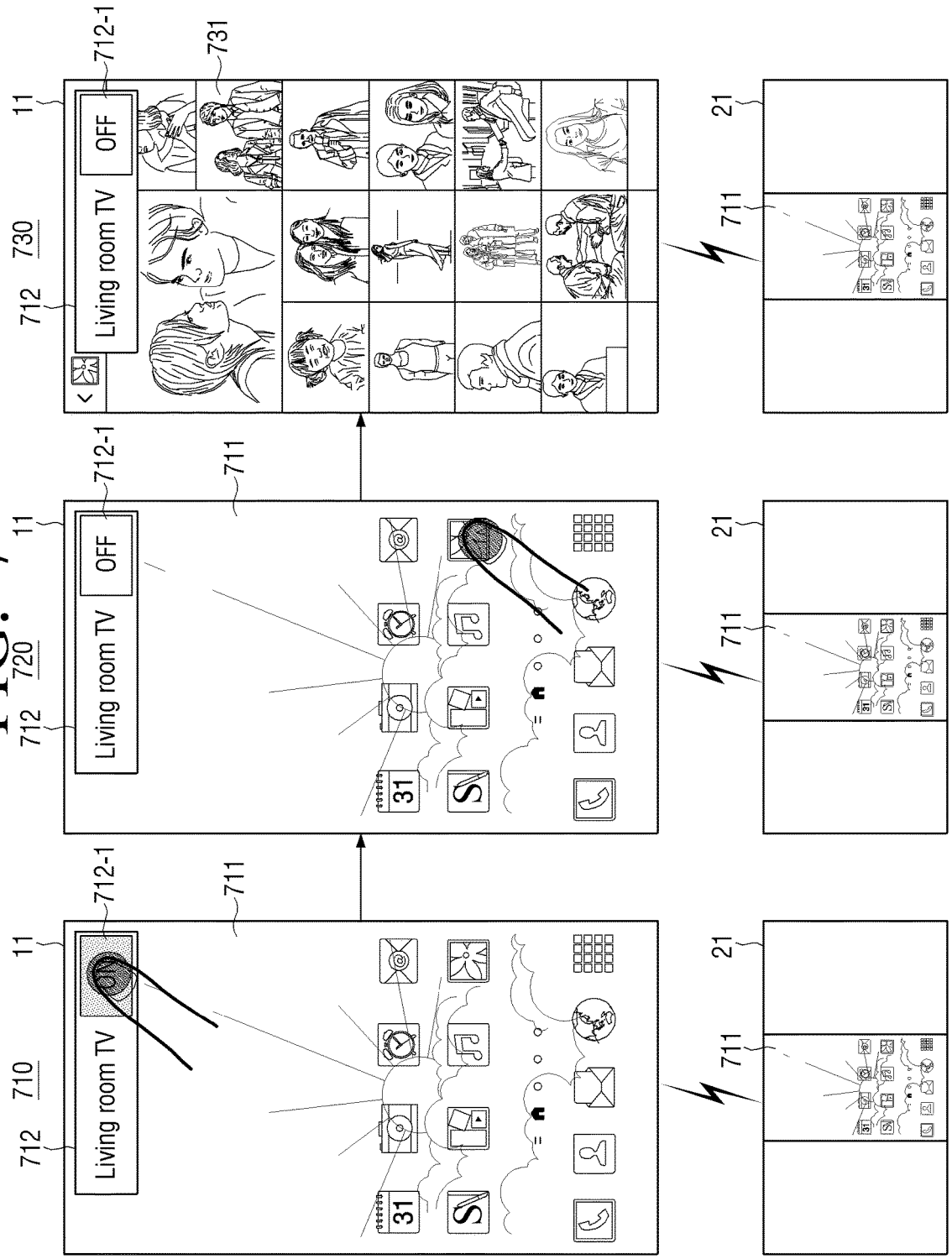

FIG. 8
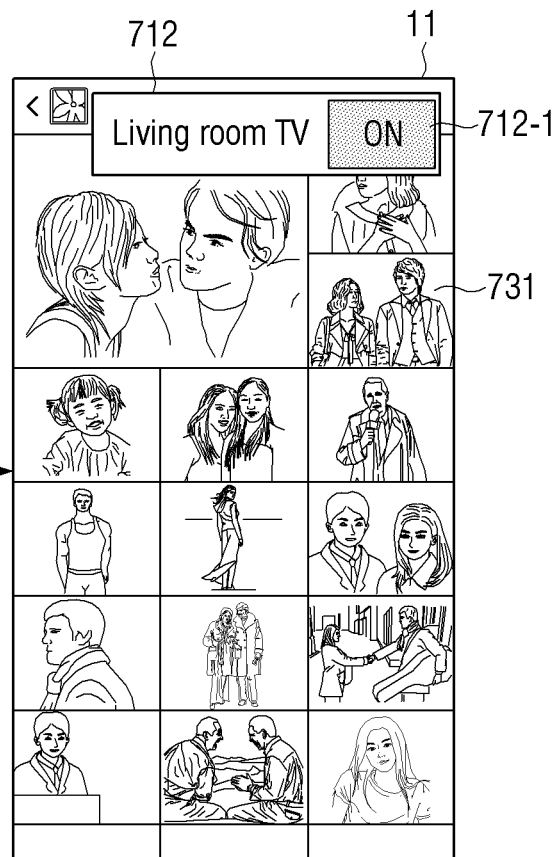
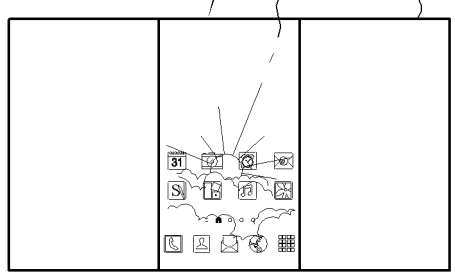
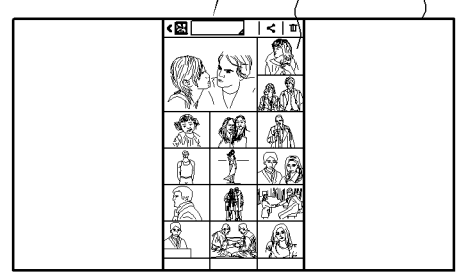

FIG. 9
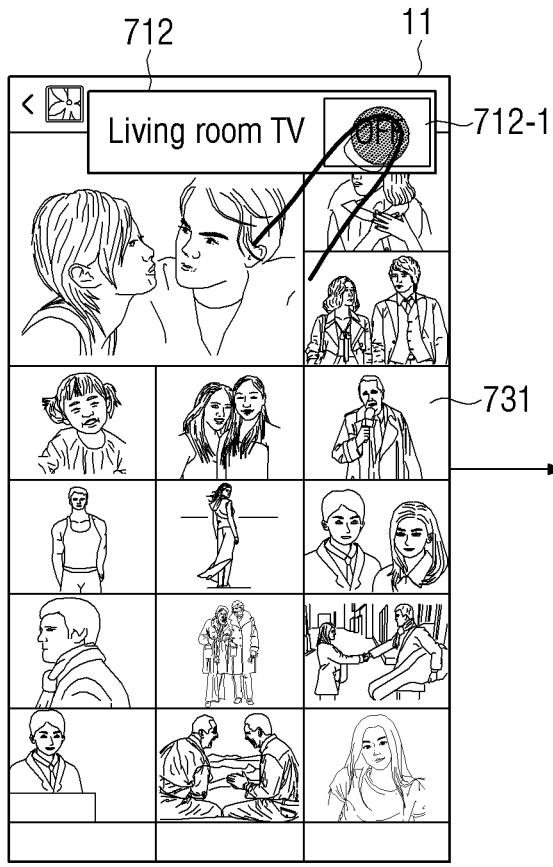
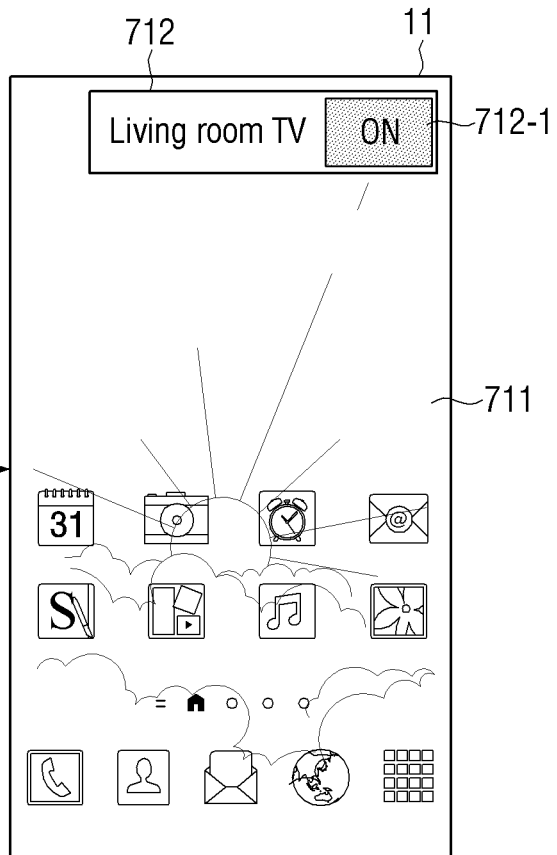
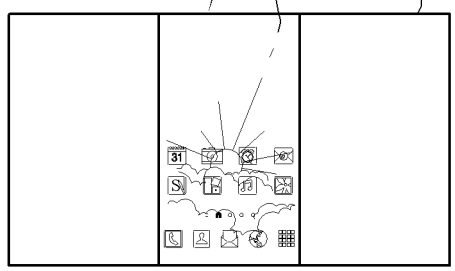
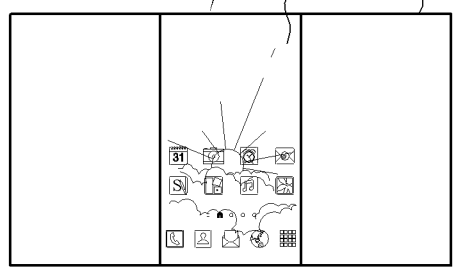

FIG. 13B
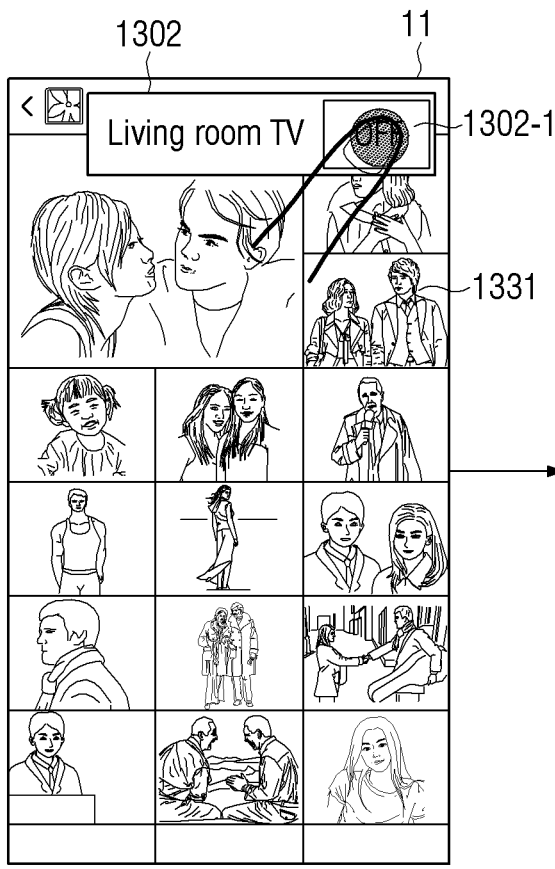
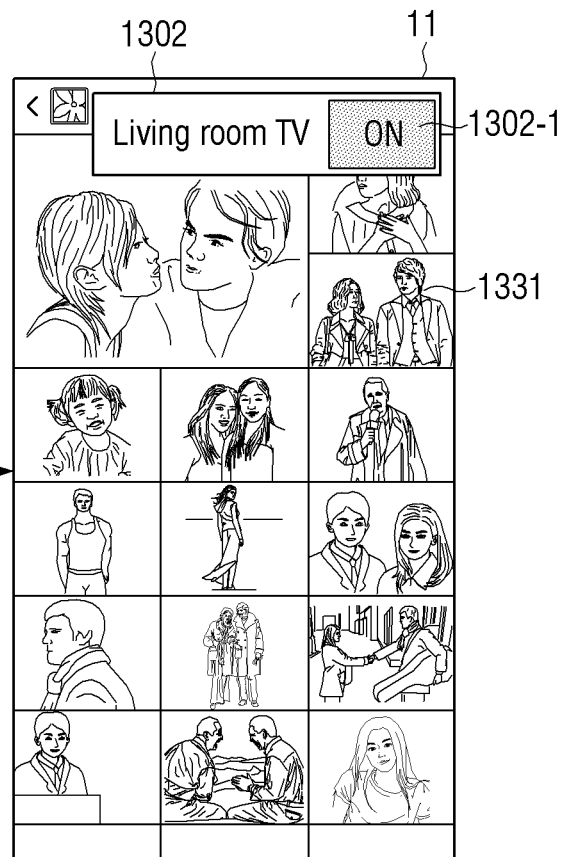
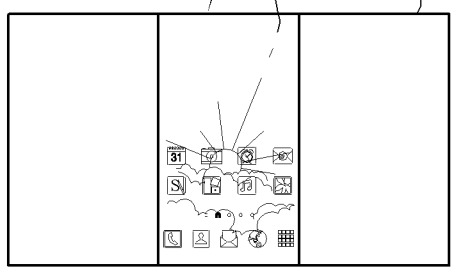
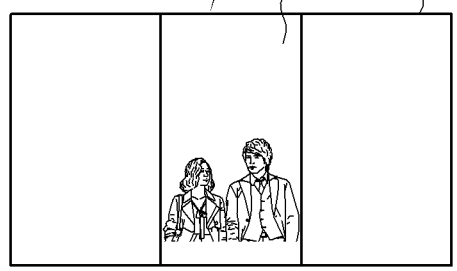

FIG. 14A
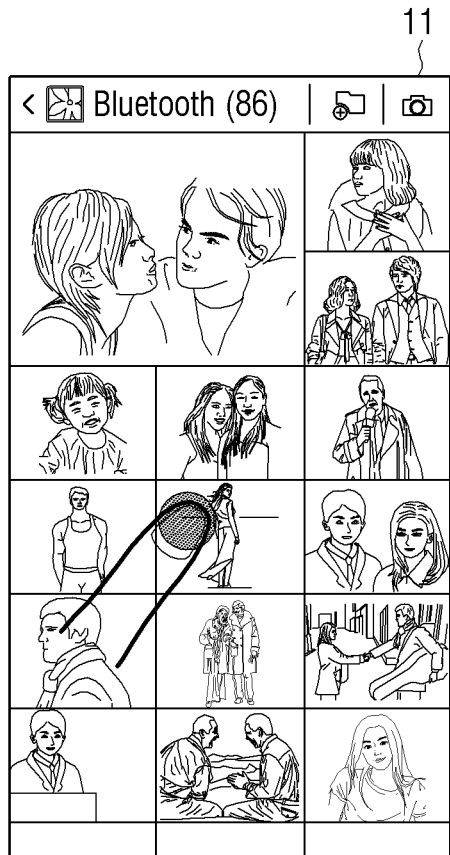
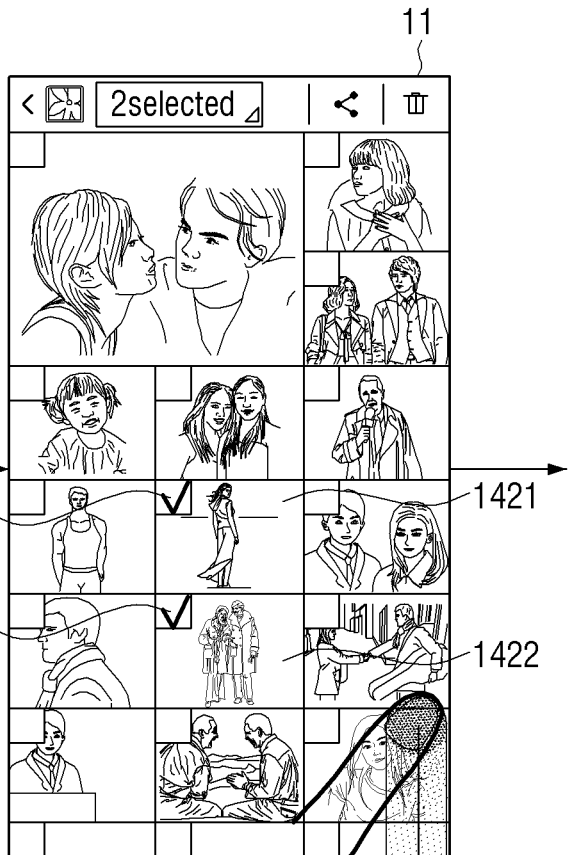

FIG. 15C
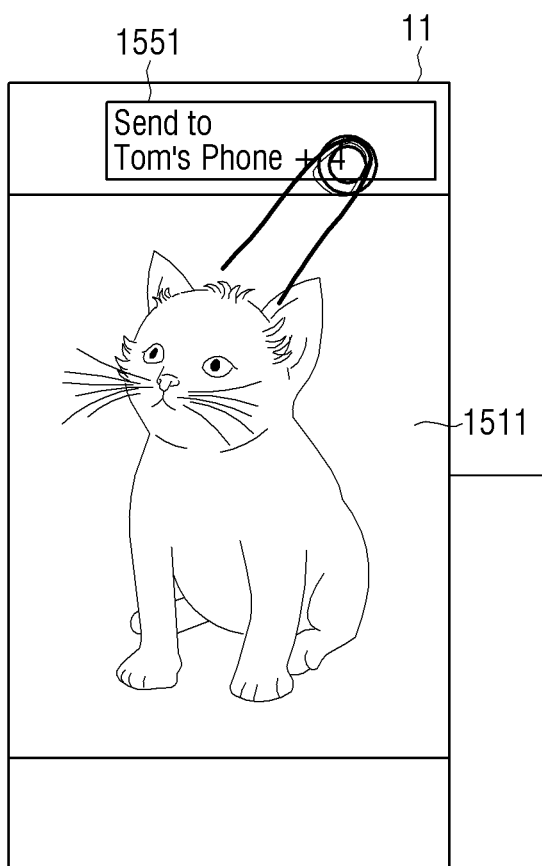
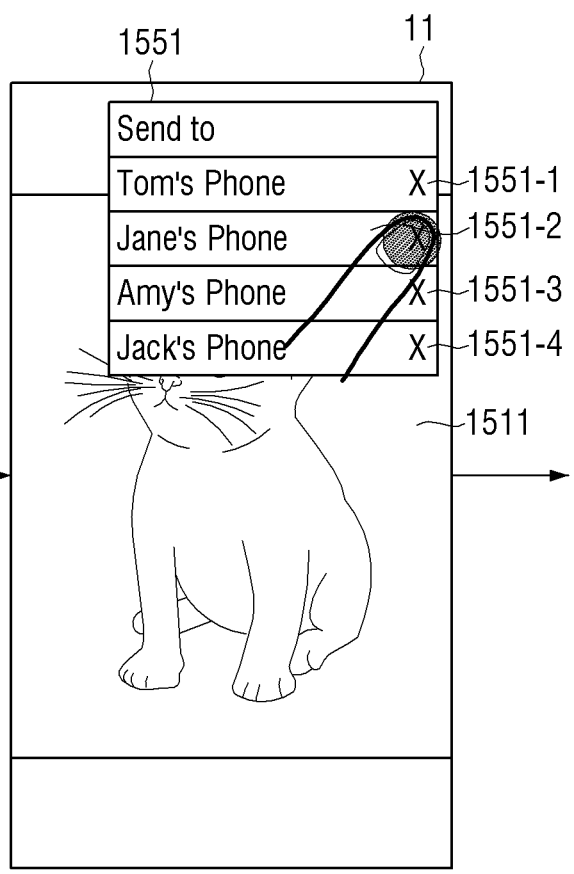

FIG. 15D
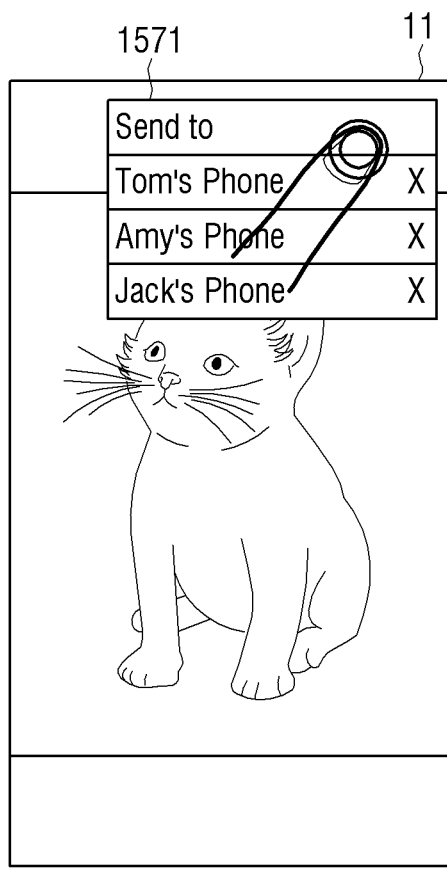
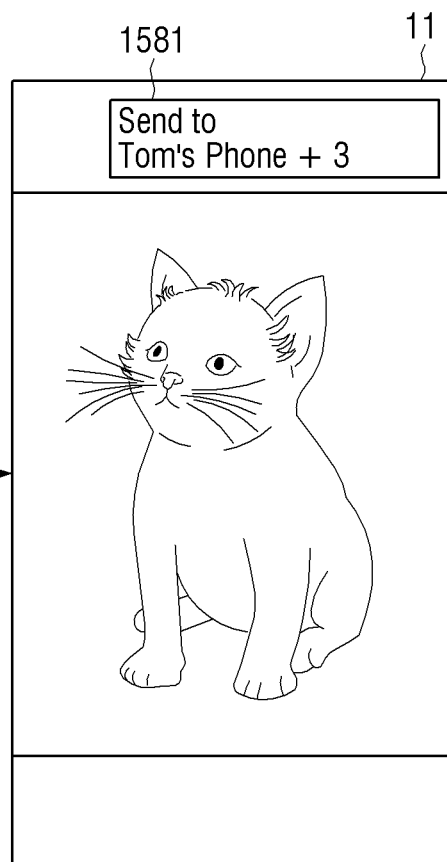

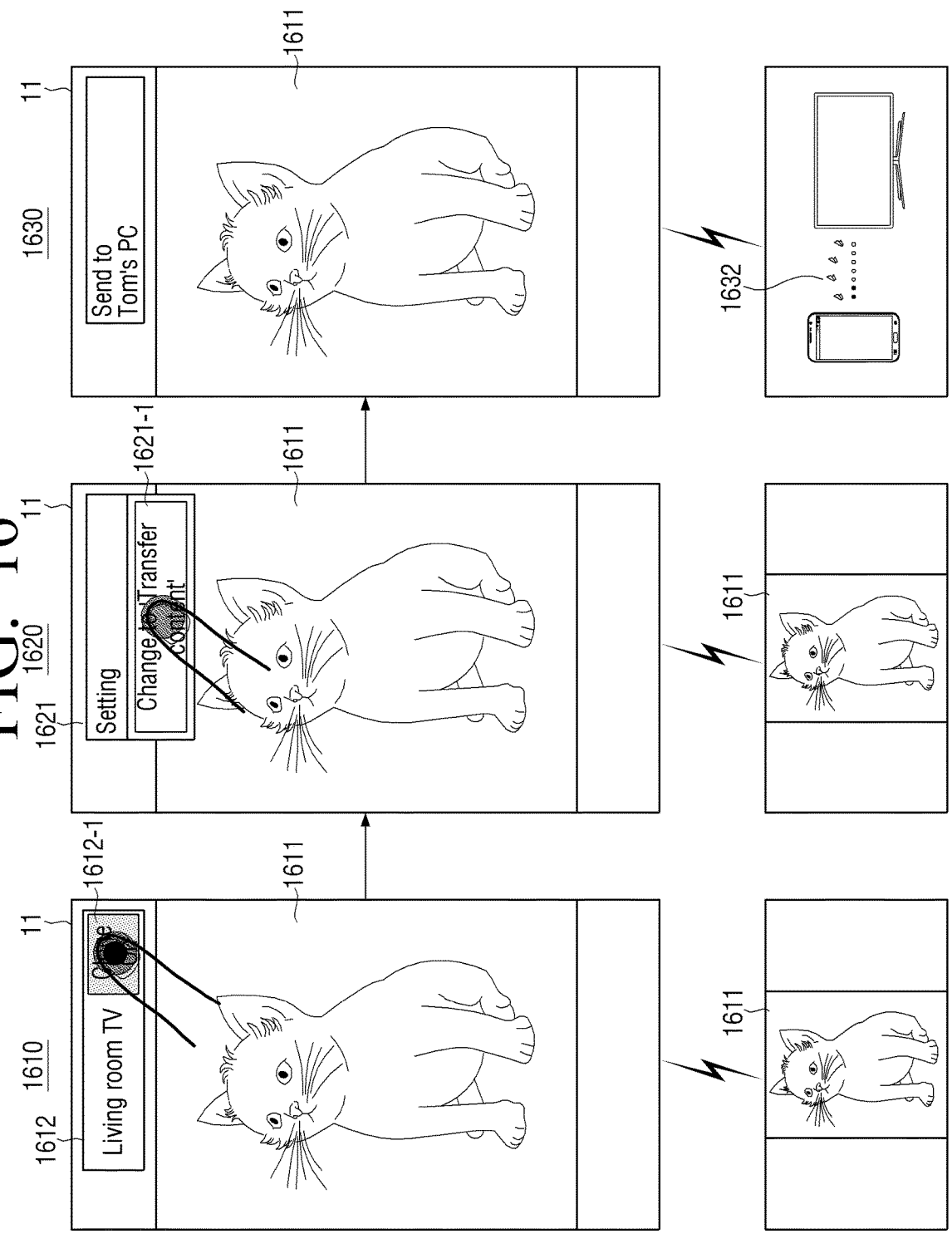

FIG. 19
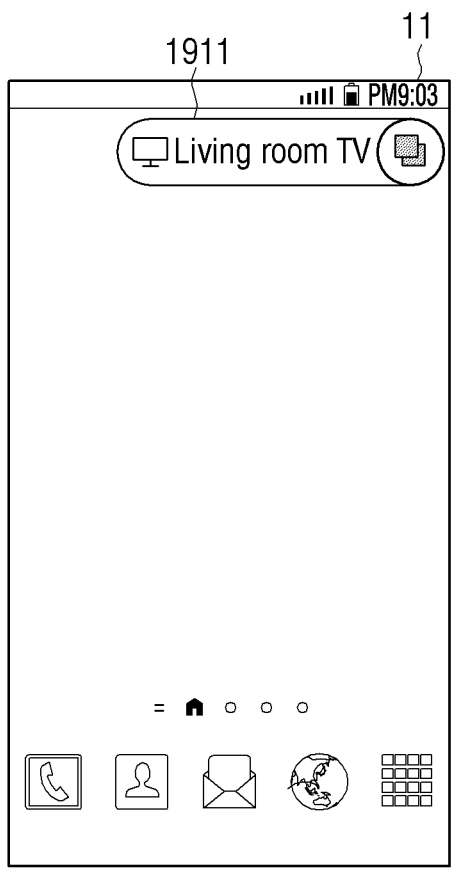
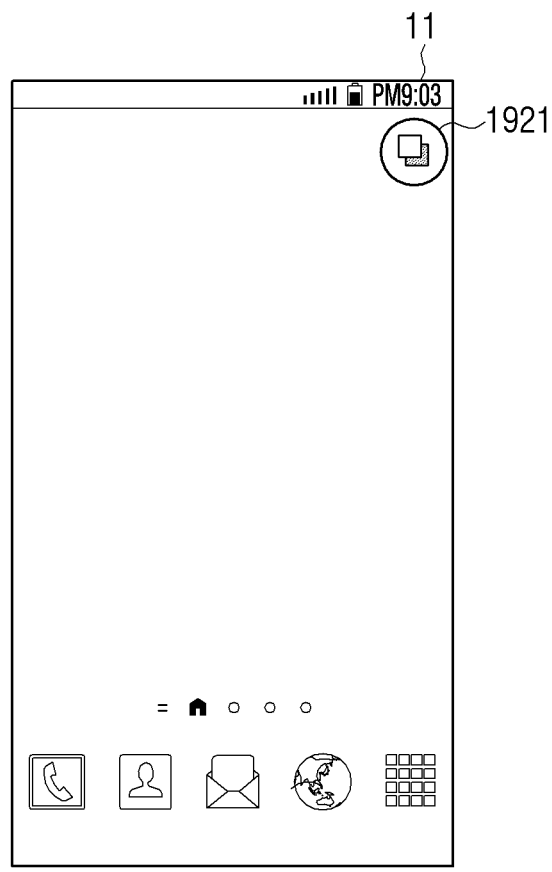

FIG. 20
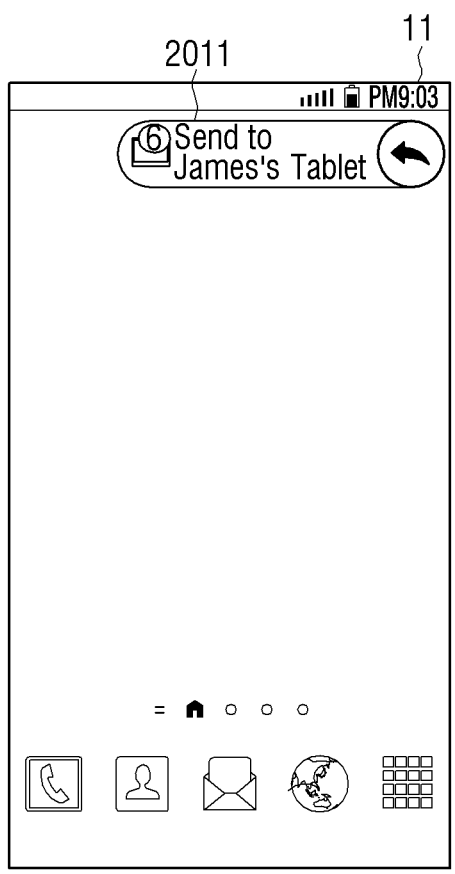
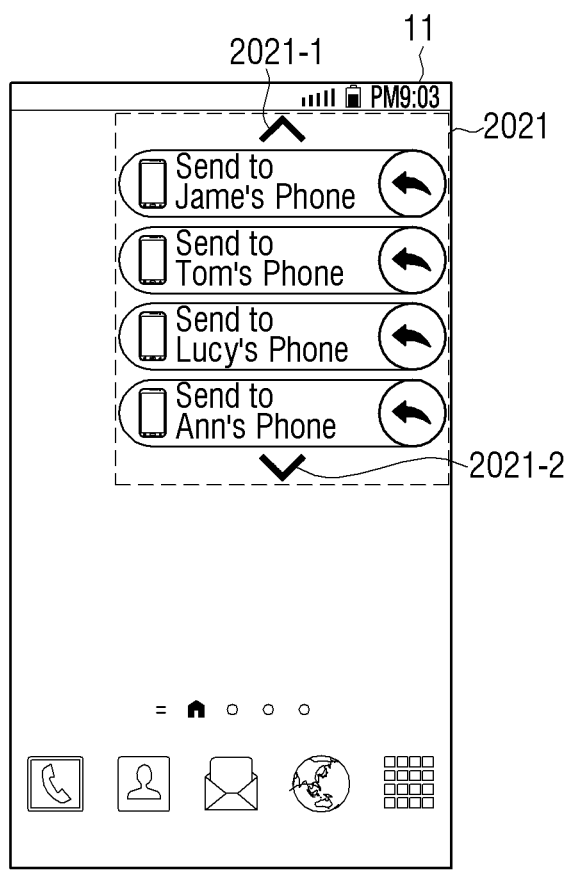

FIG. 22
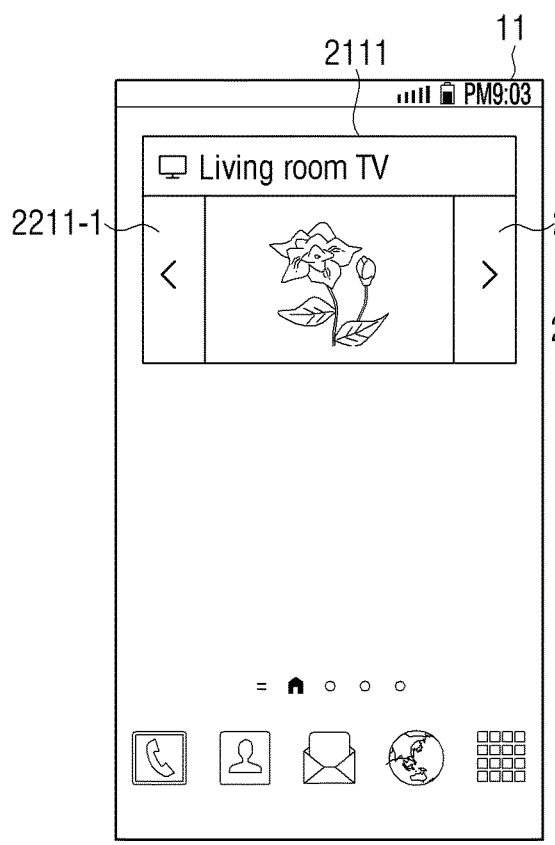
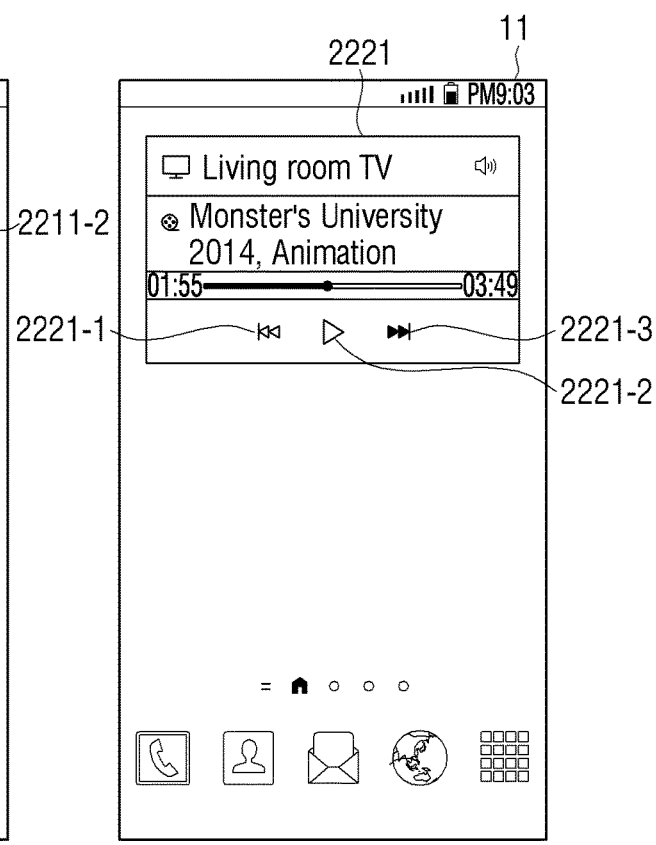

METHOD FOR SHARING SCREEN BETWEEN DEVICES AND DEVICE USING THE SAME

PRIORITY

This application is a Continuation Application of U.S. patent application Ser. No. 14/886,929, filed on Oct. 19, 2015, and claims priority under 35 U.S.C. § 119(a) to Korean Patent Application filed on Oct. 17, 2014, in the Korean Intellectual Property Office and assigned Serial No. 10-2014-0140804, the entire disclosure of which is incorporated herein by reference.

BACKGROUND

1. Field of the Invention

The present invention relates generally to a method for sharing a screen between devices and a device using the same, and more particularly, to a method for transmitting information on a screen which is being displayed on a first device to a second device.

2. Description of the Related Art

In accordance with the development of wired and wireless communication networks, devices outputting data which may be visually recognized by a user by displaying a screen may be interconnected via wired and wireless communication networks.

In this case, a variety of data may be transmitted and received between devices via wired and wireless communication networks. For example, a screen may be shared between devices, and to this end, a screen sharing technology such as a mirroring technology, a streaming technology, or the like may be used.

In this case, a first device that transmits information or contents about a screen may be referred to as a source device, a master device, or a control device, and a second device that receives the information or the contents about the screen may be referred to as a synchronization device, a client device, or a connection device.

A mirroring technology allows data which is output to a screen to be shared between devices. For example, according to the mirroring technology, a screen of a source device is compressed, and the compressed screen is transmitted to a synchronization device. Then, the synchronization device may decompress the compressed screen and display the screen.

A streaming technology may also allow data which is output to a screen to be shared between devices. The streaming technology transmits compressed image contents stored in a source device to a synchronization device. Then, the synchronization device may decompress the compressed image contents and display the image contents.

In accordance with the performance improvement of a wired and wireless connecting technology between apparatuses such as a cable, wireless fidelity (Wi-Fi) Direct, or the like, screen sharing technology has rapidly been developed. Particularly, screen sharing technology has widely been developed so as to be applicable to a portable computer such as a notebook, a netbook, a tablet personal computer (PC), or the like, a portable terminal such as a smartphone, a personal digital assistant (PDA), or the like, and all electronic devices capable of outputting a screen such as TV, or the like.

Conventionally, in order for a user to perform another task while a screen is shared between devices, there was inconvenience that the sharing of the screen needs to be stopped. Particularly, there was a problem that it is difficult to separately operate one device while contents are reproduced by one device. In addition, conventionally, a situation in which the screen is shared between devices is mainly a situation in which two devices are connected to each other, but a situation in which one device and a plurality of devices are connected to each other gradually also needs to be considered.

In addition, in the case in which another convergence service is performed in a situation in which one convergence service is performed between the devices, there was inconvenience that a user needs to stop the convergence service which is being performed. In this case, the convergence service may include various services such as contents streaming between the devices, screen sharing between the devices, file transmission between the devices, remote control between the devices, and the like, by way of example.

Therefore, various methods for improving convenience of the user in a situation in which the screen is shared between the devices are required. Particularly, an intuitive user interaction suitable for each of various convergence services may be required.

SUMMARY

An aspect of the present invention provides methods for improving convenience of a user in a situation in which a screen is shared between devices.

Another aspect of the present invention provides an intuitive user interaction suitable for each of various convergence services.

Another aspect of the present invention provides that switching of a first connection state between a first device and a second device into a second connection state may include performing the switching in response to a user input selecting a user interface (UI) element included in a pop-up screen which is independent of a first screen which is being displayed on the first device.

Another aspect of switching of a first connection state between a first device and a second device into a second connection state may include stopping a synchronization mode in which a screen is displayed by the first device and the second device and executing a desynchronization mode in which an independent screen is displayed by the first device and the second device.

Another aspect of the present invention provides that transmitting of information on a first screen to a second device may include compressing the first screen which is currently being displayed on a first device and transmitting the compressed first screen to the second device.

Another aspect of the present invention provides that transmitting of information on a first screen to a second device may include compressing image contents included in the first screen which are currently being displayed on a first device and transmitting the compressed image contents to the second device.

Another aspect of the present invention provides a method that includes receiving information on a user input through a second device from the second device; and transmitting information on a third screen related to the user input to the second device, in response to the information on the user input.

Another aspect of the present invention provides a method that includes, before transmitting information on a first screen to a second device, displaying icons representative of each of a plurality of second devices which communicate with a first device; and when one of the displayed icons is selected, connecting the first device to a second device corresponding to the selected icon in a first connection state.

Another aspect of the present invention provides a pop-up screen that may include notification information indicating synchronization or desynchronization between screens of a first device and a second device.

Another aspect of the present invention provides that when a first device shares a screen with a group of second devices including a plurality of second devices, a pop-up screen may include at least one of a number of second devices included in the group of second devices, identification information of the group of second devices, and identification information of the second devices included in the group of second devices.

Another aspect of the present invention provides that a sensing unit may sense a user input selecting a UI element included in a pop-up screen which is independent of a first screen which is being displayed on a first device, in order to perform switching from a first connection state to a second connection state.

Another aspect of the present invention provides that when switching from a first connection state to a second connection state is performed, a control unit may stop a synchronization mode in which a screen is displayed by a first device and a second device, and execute a desynchronization mode in which an independent screen is displayed by the first device and the second device.

Another aspect of the present invention provides that when a communication unit transmits information on a first screen which is being displayed on a first device to a second device, the communication unit may transmit the first screen which is compressed to the second device.

Another aspect of the present invention provides that when a communication unit transmits information on a first screen which is being displayed on a first device to a second device, the communication unit may transmit image contents included in the first screen which is compressed to the second device.

Another aspect of the present invention provides that a communication unit may receive information on a user input through a second device from the second device, and transmit information on a third screen related to the user input to the second device.

Another aspect of the present invention provides that a display unit may display icons representative of each of a plurality of second devices which communicate with a first device, and a control unit may connect the first device to a second device corresponding to a selected icon in a first connection state, when a user input selecting one of the displayed icons is received through a sensing unit.

Another aspect of the present invention provides that a pop-up screen may include notification information indicating synchronization or desynchronization between screens of a first device and a second device.

Another aspect of the present invention provides that when a first device shares a screen with a group of second devices including a plurality of second devices, a pop-up screen may include at least one of a number of second devices included in the group of second devices, identification information of the group of second devices, and identification information of the second devices included in the group of second devices.

Another aspect of the present invention provides that, while a screen is shared between devices, a user may easily perform a multi-tasking job without exposing private information to another device. Particularly, the user may simply control another device using a pop-up screen which is separate from the pop-up screen which is being displayed.

Another aspect of the present invention provides that, in a case in which a plurality of devices share a screen with one device, a user may easily add or exclude a screen sharing target device.

Another aspect of the present invention provides that a user may selectively and easily switch a mirroring technology and a streaming technology in order to share a screen.

According to an aspect of the present invention, a method of sharing a screen of a first device with a second device by the first device is provided. The method includes transmitting information on a first screen displayed on the first device to the second device, in a first connection state so that a same screen is displayed by the first device and the second device; switching the first connection state between the first device and the second device into a second connection state; and performing a control so that the first screen displayed on the first device is switched into a second screen so that the first screen displayed is continuously displayed on the second device, when a user input is received in a state in which the first connection state is switched into the second connection state in which an independent screen is displayed by the first device and the second device.

According to another aspect of the present invention, a method of sharing a screen of a first device with a second device by the first device is provided. The method includes transmitting information on a first screen displayed on the first device to the second device, in a first connection state in which a same screen is displayed by the first device and the second device; switching the first connection state between the first device and the second device into a second connection state; and transmitting information on a third screen to the second device while the first screen is continuously displayed on the first device, when information requesting that the first screen displayed on the second device be switched into the third screen is received from the second device, in a state in which the first connection state is switched into the second connection state in which an independent screen is displayed by the first device and the second device.

According to another aspect of the present invention, a first device for sharing a screen with a second device is provided. The first device includes a sensing unit configured to sense a user input; a display unit configured to display a first screen; a communication unit configured to transmit information on the first screen displayed on the first device to the second device, in a first connection state in which a same screen is displayed by the first device and the second device; and a control unit configured to perform a control so that the first screen displayed on the first device is switched into a second screen to be displayed and the first screen is continuously displayed on the second device, when the user input is received through the sensing unit in a state in which the first connection state is switched into a second connection state in which an independent screen is displayed by the first device and the second device.

According to another aspect of the present invention, a first device for sharing a screen with a second device is provided. The first device includes a sensing unit configured to sense a user input; a display unit configured to display a first screen; a communication unit configured to transmit information on the first screen displayed on the first device to the second device, in a first connection state in which a same screen is displayed by the first device and the second device; and a control unit configured to control the communication unit so that information on a third screen is transmitted to the second device while the first screen is continuously displayed on the first device, when information requesting that the first screen displayed on the second device be switched into the third screen is received from the second device through the communication unit in a state in which the first connection state is switched into a second connection state in which an independent screen is displayed by the first device and the second device.

BRIEF DESCRIPTION OF THE DRAWINGS

The above and/or other aspects, features, and advantages of the present invention will be more apparent from the following description, taken in conjunction with the accompanying drawings, in which:

FIGS. 6A to 18 are diagrams illustrating processes for sharing a screen between a first device and a second device according to an embodiment of the present invention;

FIGS. 19 to 21 are diagrams illustrating an example of a pop-up screen according to an embodiment of the present invention;

FIG. 22 is a diagram illustrating an example of a controller panel according to an embodiment of the present invention;

DETAILED DESCRIPTION OF EMBODIMENTS OF THE PRESENT INVENTION

Figure 1:
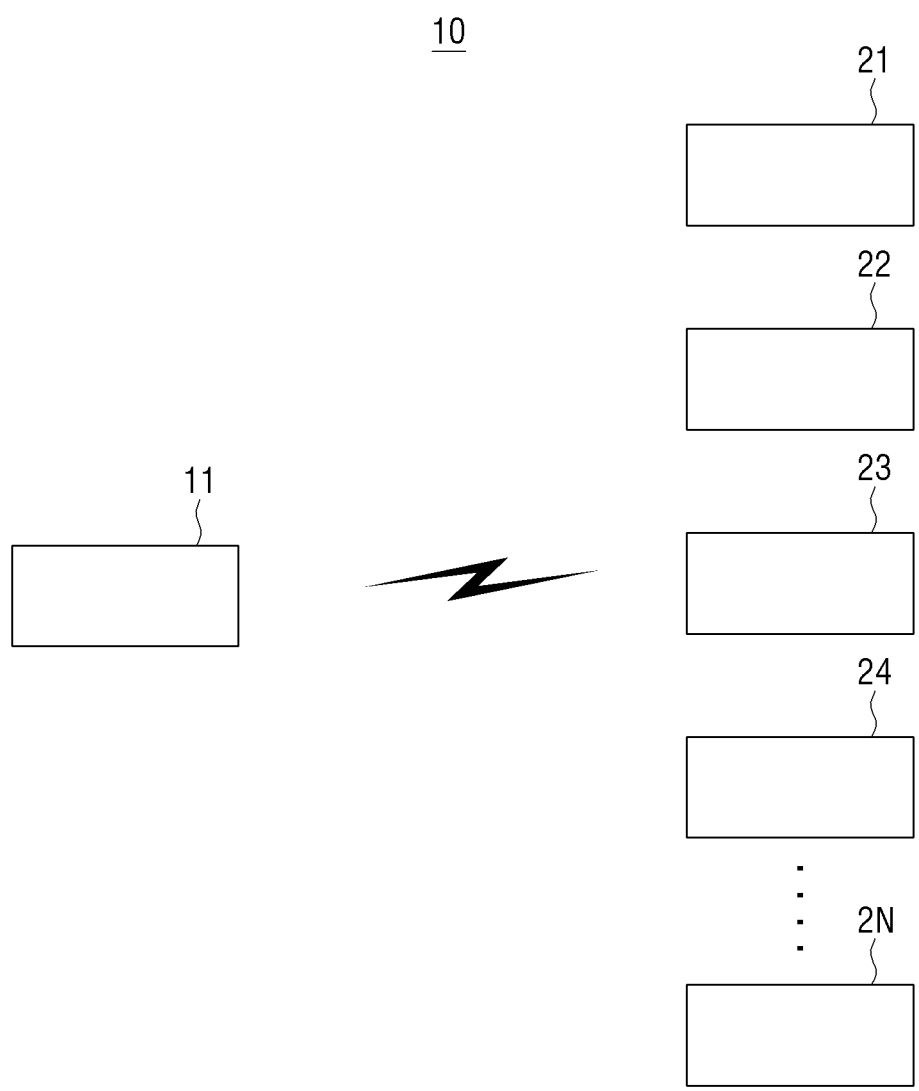
FIG. 1 is a block diagram of a system according to an embodiment of the present invention.

Terms used in the present disclosure will be briefly described and the present invention will be described in detail.

The terms used to describe embodiments of the present invention are general terms which are currently widely used, but the terms may vary depending on the intentions of those skilled in the art, practice, an emergence of new technologies, and the like. In addition, the meanings of some terms are defined in a description of the present invention. Therefore, the terms used in the present invention should be defined based on the meanings of the terms and the contents throughout the present invention.

An embodiment of the present invention may be modified and the present invention may have various embodiments. Accordingly, some embodiments of the present invention are illustrated in the accompanying drawings and are described in detail in the detailed description below. However, it is to be understood that the present invention is not limited to an embodiment of the present invention, but includes all modifications, equivalents, and substitutions without departing from the scope and spirit of the present invention, as defined by the appended claims and their equivalents. In describing the embodiments of the present invention, well-known functions are not described in detail since they would obscure the present invention with unnecessary detail.

The terms "first," "second," and the like may be used to describe diverse components, but the present invention is not limited by the terms. The terms are only used to distinguish one component from the others.

Singular forms used herein are intended to include plural forms unless explicitly indicated otherwise. In the present disclosure, the terms "include" and "consist of" designate the presence of features, numbers, steps, operations, components, elements, or a combination thereof that are described in the present disclosure, but do not exclude the presence or possibility of addition of one or more other features, numbers, steps, operations, components, elements, or a combination thereof.

In an embodiment of the present invention, a "module" or a "unit" performs at least one function or operation, and may be implemented in hardware, software, or a combination of hardware and software. In addition, a plurality of "modules" or a plurality of "units" may be integrated into at least one module except for a "module" or a "unit" which must be implemented in hardware, and may be implemented in at least one processor.

In an embodiment of the present invention, a case in which any one part is "connected" with other part includes a case in which the parts are directly connected with each other and a case in which the parts are "electrically connected" with each other with other elements interposed therebetween. In addition, unless explicitly described to the contrary, "comprising" any components should be understood to imply the inclusion of other elements rather than the exclusion of any other elements.

Hereinafter, embodiments of the present invention are described in detail with reference to the accompanying drawings so that those skilled in the art may easily practice the present invention. However, the present invention may be implemented in various different forms and is not limited to the embodiments described in the present disclosure. In the accompanying drawings, portions unrelated to the description are omitted in order to obviously describe the present invention, and similar reference numerals are used to describe similar portions throughout the present disclosure.

In addition, in an embodiment of the present invention, a user input may include at least one of a touch input, a bending input, a voice input, a button input, and a multi-modal input, but the present invention is not limited thereto.

In addition, in an embodiment of the present invention, a "touch input" indicates a touch gesture, or the like in which a user contacts a display or a cover to control an apparatus. In addition, the "touch input" may include a touch (e.g., a floating or a hovering) of a state in which an object is not in contact with the display but is spaced apart from the display by a predetermined distance or more. The touch input may include a touch and hold gesture, a tap gesture in which a touch is performed and is then released, a double tap gesture, a panning gesture, a flick gesture, a touch and drag gesture in which the touch is performed and is then moved in one direction, a pinch gesture, and the like, but the present invention is not limited thereto.

In addition, in an embodiment of the present invention, a "button input" indicates an input in which a user controls an apparatus using a physical button attached to the apparatus.

In addition, in an embodiment of the present invention, a "motion input" indicates a motion that a user makes to an apparatus to control the apparatus. For example, a motion input may include inputs where the user rotates the apparatus, tilts the apparatus, or moves the apparatus in any direction.

In addition, in an embodiment of the present invention, a "multi-input" indicates an input in which at least two or more input schemes are coupled. For example, an apparatus may also receive a touch input and a motion input of a user, and may also receive a touch input and a voice input of a user.

In addition, in an embodiment of the present invention, an "application" is referred to as a collection of computer programs devised to perform a certain task. In an embodiment of the present invention, various applications may be present. For example, examples of an application may include a game application, a video play application, a map application, a memo application, a calendar application, a phone book application, a broadcasting application, an exercise supporting application, a payment application, a picture folder application, and the like, but is not limited thereto.

In addition, in an embodiment of the present invention, "application identification information" may be unique information for distinguishing one application from other applications. As an example, the application identification information may be icons, index items, link information, and the like, but is not limited thereto.

In addition, in an embodiment of the present invention, a UI element indicates an element which may interact with a user to provide feedback such as visual, auditory, olfactory, or the like, in response to a user input. As to the UI element, if one region which is represented by at least one form of an image, a text, and a video, or which does not display the above-mentioned information but may provide the feedback in response to the user input is present, this region may be referred to as the UI element. In addition, an example of a UI element may be the application identification information described above.

Hereinafter, embodiments of the present invention are described in detail with reference to the accompanying drawings.

FIG. 1 is a block diagram of a system 10 according to an embodiment of the present invention.

Referring to FIG. 1, the system 10 may include a first device 11 that transmits a screen or image contents, and second devices 21 to 2N that receive the screen or the image contents. The first device 11 and the second devices 21 to 2N that receive the screen or the image contents may be connected to each other using various communication schemes. For example, communication between the first device 11 and the second devices 21 to 2N may be performed using a wireless communication module such as Bluetooth, Wi-Fi, or the like.

The first device 11 and the second devices 21 to 2N, which are displayable apparatuses, may be, for example, smartphones, notebooks, desktop PCs, PDAs, e-book terminals, digital broadcasting terminals, kiosks, electronic frames, navigation, digital TVs, wearable devices such as a wrist watch or a head-mounted display (HMD), and other mobile or non-mobile computing apparatuses.

The first device 11 and the second devices 21 to 2N may display a screen using each display unit. In this case, the screen may include image contents (e.g., a video, an image, etc.) which are received from an external device or are prestored. Alternatively, the screen may include various objects such as icons, texts, images, and the like. The various objects may also include a UI element which may interact with a user to provide feedback such as visual, auditory, olfactory, or the like in response to a user input.

Although the present invention describes the first device 11 targeted on a portable terminal and the second device 21 targeted on a digital TV, it is merely an example. The first device 11 and the second device 21 are not limited thereto, but may be targeted on various kinds of devices as described above.

Figure 2:
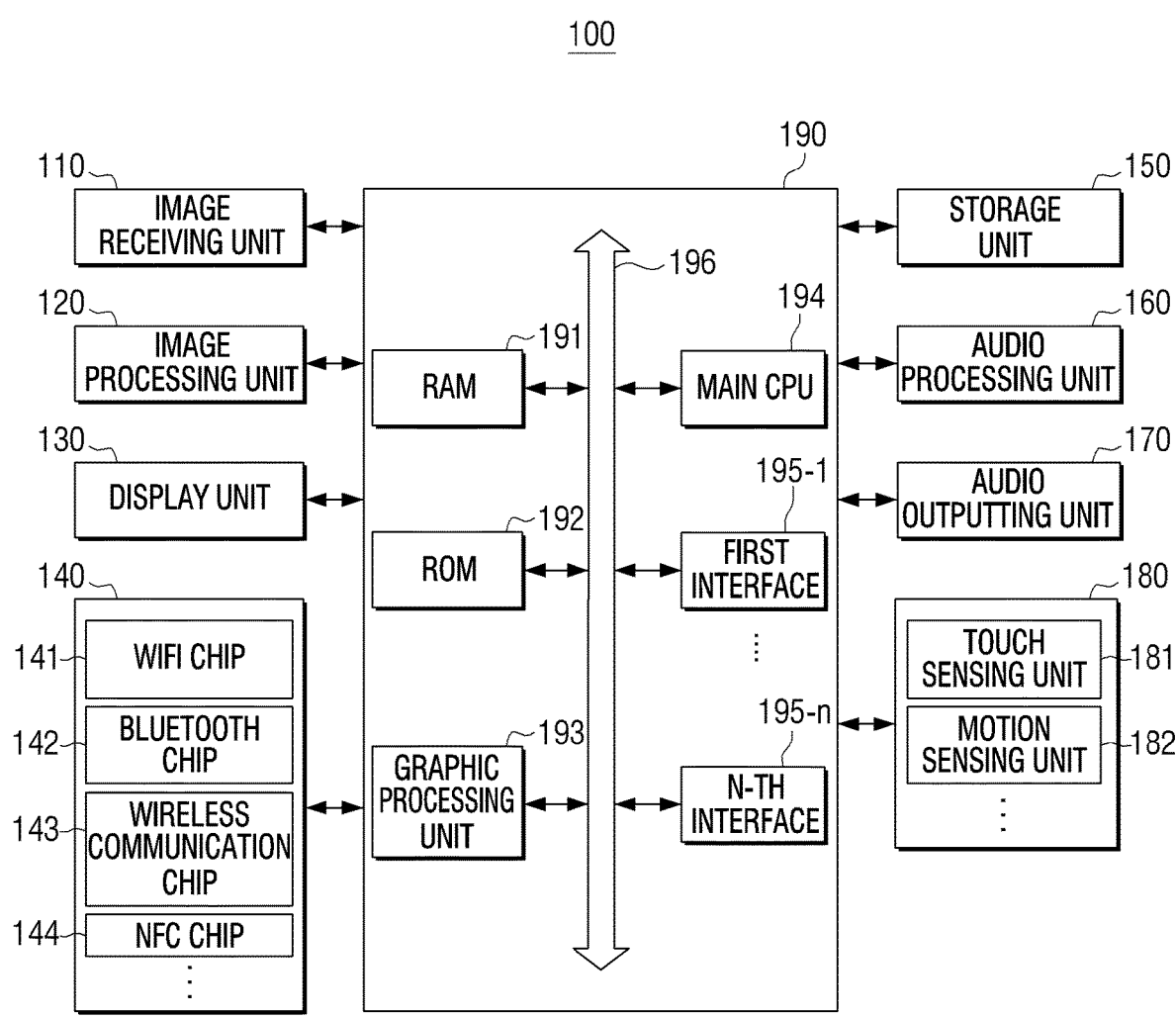
FIG. 2 is a block diagram of a device according to an embodiment of the present invention.

FIG. 2 is a block diagram of a device 100 according to an embodiment of the present invention. The configuration of the device 100 illustrated in FIG. 2 may be applied to the first and second devices 11 and 21 to 2N of FIG. 1.

As illustrated in FIG. 2, the device 100 may include at least one of a first image receiving unit 110, a second image processing unit 120, a display unit 130, a communication unit 140, a storage unit 150, an audio processing unit 160, an audio outputting unit 170, a sensing unit 180, and a control unit 190. However, the configuration of the device 100 illustrated in FIG. 2 is merely an example, and is not necessarily limited to the block diagram described above. Therefore, some of the configuration of the device 100 may be omitted, modified, or added depending on a type of the device 100 or a purpose of the device 100.

The first image receiving unit 110 receives image data through various sources. For example, the first image receiving unit 110 may receive broadcast data from an external broadcasting station, VOD data in real time from an external server, and image data from an external device.

The second image processing unit 120 is a component that processes the image data received by the first image receiving unit 110. The second image processing unit 120 may perform various image processing such as decoding, scaling, noise filtering, frame rate converting, resolution converting, and the like for the image data.

The display unit 130 displays at least one of a video frame obtained by processing the image data by the second image processing unit 120 and various screens generated by a graphic processing unit 193.

An implementation scheme of the display unit 130 is not limited thereto. For example, the display unit 130 may be implemented in various forms of displays such as a liquid crystal display (LCD), an organic light emitting diode (OLED) display, an active-matrix organic light-emitting diode (AM-OLED) display, a plasma display panel (PDP), and the like. The display unit 130 may further include additional components depending on the implementation scheme thereof. For example, in the case in which the display unit 130 is implemented in a liquid crystal scheme, the display unit 130 may include an LCD display panel, a backlight unit (that supplies light to the LCD display panel, and a panel driving substrate that drives a panel. The display unit 130 may be coupled to a touch sensing unit 181 of the sensing unit 180 that is provided as a touch screen.

The display unit 130 may also be coupled to at least one of a front region, a side region, and a rear region of the device 100 in a form of a bent display. A bent display may also be implemented as a flexible display and may also be implemented as a general display which is not flexible. For example, a bent display may be implemented by connecting a plurality of flat displays to each other.

In the case in which a bent display is implemented as a flexible display, the flexible display may be characterized in that it may be curved, bent, or rolled without being damaged using a thin and flexible substrate such as paper. The above-mentioned flexible display may also be manufactured using a plastic substrate as well as a glass substrate which is generally used. In the case in which a plastic substrate is used, a flexible display may be formed by using a low temperature manufacturing processor without using an existing manufacturing processor in order to prevent damage of the substrate. In addition, the flexible display may provide the capability of folding and unfolding the flexible display by replacing the glass substrate encompassing a liquid crystal in an LCD, an OLED display, an AM-OLED display, a plasma display panel (PDP), and the like with a plastic film. The above-mentioned flexible display has advantages that it is thin and light, is shock-resistant, may be curved or bent, and may be manufactured in various forms.

The communication unit 140 is a component that communicates with various types of external devices according to various types of communication schemes. The communication unit 140 may include a Wi-Fi integrated circuit or chip 141, a Bluetooth chip 142, a wireless communication chip 143, and a near field communications (NFC) chip 144. The control unit 190 may communicate with a variety of external devices using the communication unit 140.

For example, each of the Wi-Fi chip 141 and the Bluetooth chip 142 may communicate in a Wi-Fi scheme and a Bluetooth scheme. In the case in which the Wi-Fi chip 141 or the Bluetooth chip 142 is used, a variety of access information such as a service set identifier (SSID), a session key, and the like may be first transmitted and received, communication access may be performed using the variety of access information, and a variety of information may then be transmitted and received. The wireless communication chip 143 indicates a chip that performs communication according to various communication standards such as standards of the Institute for Electrical and Electronics Engineers (IEEE), ZigBee, 3rd generation (3G), 3rd generation partnership project (3GPP), long term evolution (LTE), and the like. The NFC chip 144 indicates a chip which is operated in the NFC scheme that uses a frequency band of 13.56 MHz among various radio frequency identification (RF-ID) frequency bands such as 135 kHz, 13.56 MHz, 433 MHz, 860 to 960 MHz, 2.45 GHz, and the like.

The storage unit 150 may store a variety of programs and data necessary to operate the device 100. The storage unit 150 may be implemented as a non-volatile memory, a volatile memory, a flash-memory, a hard disk drive (HDD), a solid state drive (SSD), or the like. The storage unit 150 may be accessed by the control unit 190, where read/record/edit/delete/update, etc. of data by the control unit 190 may be performed. The term "storage unit" in the present disclosure may include the storage unit 150, a read only memory (ROM), a random access memory (RAM) in the control unit 190, or a memory card (e.g., a micro secure digital (SD) memory card, a memory stick, or the like) mounted in the device 100.

For example, the storage unit 150 may store a program, data, and the like for configuring a variety of screens to be displayed on the display region.

Hereinafter, a structure of software stored in the device 100 is described with reference to FIG. 3.

Figure 3:
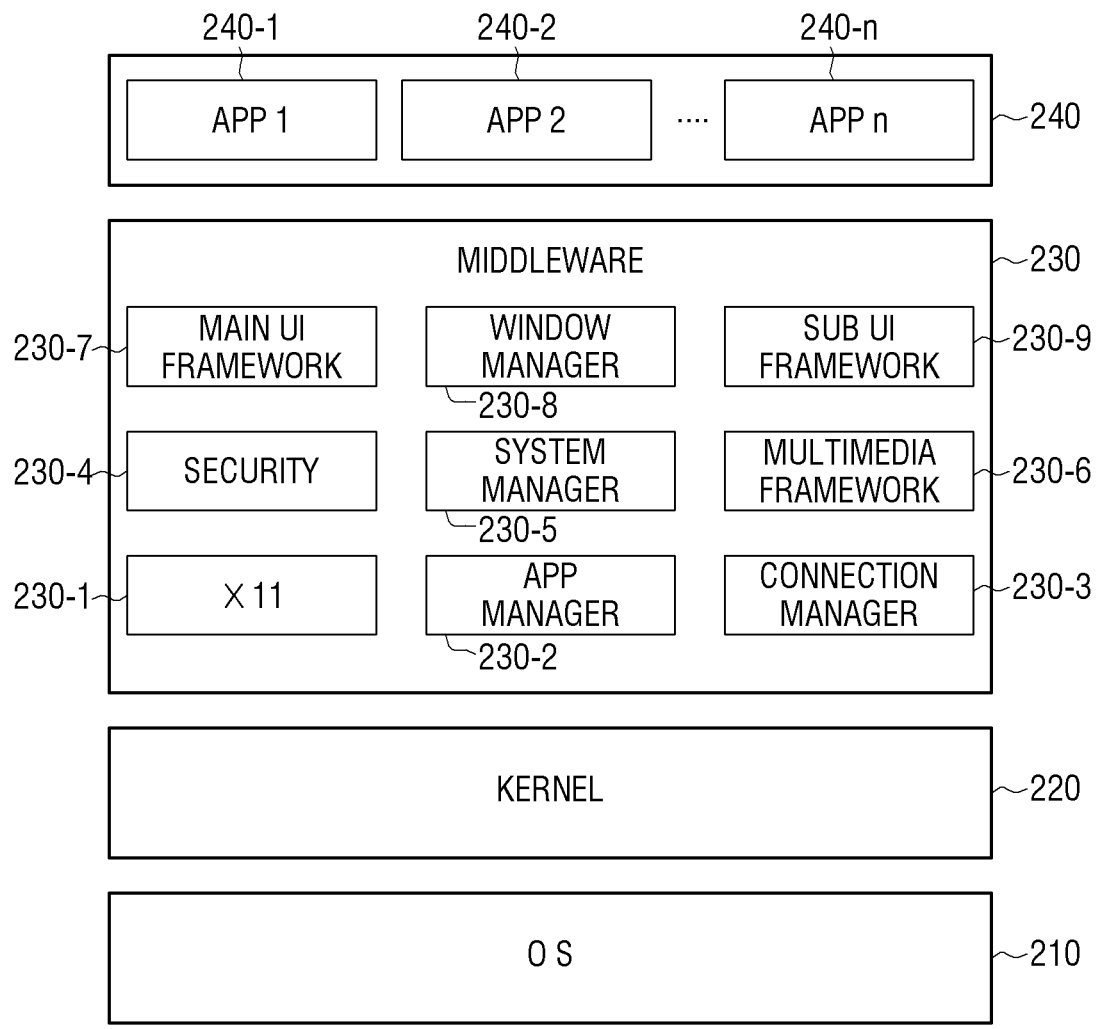
FIG. 3 is a block diagram of software according to an embodiment of the present invention.

Referring to FIG. 3, the storage unit 150 may store software including an operating system (OS) 210, a kernel 220, middleware 230, an application 240, and the like.

The OS 210 performs a function that controls and manages a general operation of hardware. That is, the OS 210 is a layer that performs a basic function such as hardware management, memory, security, or the like.

The kernel 220 serves as a gateway through which a variety of signals including a touch signal sensed by the sensing unit 180 are transmitted to the middleware 230.

The middleware 230 includes a variety of software modules that control an operation of the device 100.

Referring to FIG. 2, the middleware 230 includes an X11 module 230-1, an application (APP) manager 230-2, a connection manager 230-3, a security module 230-4, a system manager 230-5, a multimedia framework 230-6, a main UI framework 230-7, a window manager 230-8, and a sub UI framework 230-9.

The X11 module 230-1 is a module that receives a variety of event signals from a variety of hardware included in the device 100. In this case, the event may be variously set such as an event in which a user gesture is sensed, a system alarm is generated, a certain program is executed or terminated, and the like.

The APP manager 230-2 is a module that manages an execution state of a variety of applications 240 installed in the storage unit 150. If the APP manager 230-2 senses an application execution event from the X11 module 230-1, the APP manager 230-2 calls and executes an application corresponding to the sensed application execution event.

The connection manager 230-3 is a module for supporting a wired or wireless network connection. The connection manager 230-3 may include various sub-modules such as a distribution network evaluation tool (DNET) module, a universal plug and play (UPnP) module, and the like.

The security module 230-4 is a module for supporting certification, request permission, secure storage, and the like for hardware.

The system manager 230-5 monitors states of the respective components in the device 100 and provides the monitored results to other modules. For example, if a case in which remaining battery power is lacking, an error occurs, a communication connection is disconnected, and the like, the system manager 230-5 may provide the monitored results to the main UI framework 230-7 or the sub-UI framework 230-9 to output a notification message or a notification sound.

The multimedia framework 230-6 is a module for reproducing multimedia contents stored in the device 100 or provided from an external source. The multimedia framework 230-6 may include a player module, a camcorder module, a sound processing module, and the like. Therefore, the multimedia framework 230-6 may reproduce a variety of multimedia contents to perform an operation generating and reproducing a screen and a sound.

The main UI framework 230-7 is a module for providing a variety of UIs to be displayed on a main region of the display unit 130, and the sub-UI framework 230-9 is a module for providing a variety of UIs to be displayed on a sub-region. The main UI framework 230-7 and the sub-UI framework 230-9 may include an image compositor module for configuring a variety of UI elements, a coordinate compositor module for calculating coordinates at which the UI elements are to be displayed, a rendering module for rendering the configured UI elements to the calculated coordinates, a 2D/3D UI toolkit for providing a tool for configuring a 2D or 3D type of UI, and the like.

The window manager 230-8 may sense a touch event using a user's body or a pen, or other input events. If the window manager 230-8 senses the above-mentioned event, the window manager 230-8 transmits an event signal to the main UI framework 230-7 or the sub-UI framework 230-9 to perform an operation corresponding to the event.

In addition, the window manager 230-8 may also store various program modules such as a writing module for drawing a line along a drag trajectory when a user touches and drags on a screen, an angle calculation module for calculating a pitch angle, a roll angle, a yaw angle, and the like based on a sensor value sensed by the motion sensing unit 182, and the like.

The application module 240 includes applications 240-1 to 240-*n* for supporting various functions. For example, the application module 240 may include program modules for providing various services such as a navigation program module, a game module, an electronic book module, a calendar module, an alarm management module, and the like. The above-mentioned applications may also be installed as a default, and may also be arbitrarily installed and used by a user during a use process. If a UI element is selected, the main CPU 194 may execute an application corresponding to the UI element selected using the application module 240.

The structure of software illustrated in FIG. 3 is merely an example, and is not limited thereto. Therefore, some of the structure of software may be omitted, modified, or added depending on a type of the device 100 or a purpose of the device 100.

Referring to again FIG. 2, the audio processing unit 160 is a component that processes audio data of image contents. The audio processing unit 160 may perform various processes such as decoding, amplification, noise filtration, etc., for audio data. Audio data processed by the audio processing unit 160 may be output to an audio outputting unit 170.

The audio outputting unit 170 is a component that outputs a variety of notification sounds or voice messages as well as a variety of audio data for which various processing tasks such as decoding, amplification, and noise filtration are performed by the audio processing unit 160. For example, the audio outputting unit 170 may be implemented as a speaker, but this is merely an example, and the present invention is not limited thereto. For example, the audio outputting unit 170 may be implemented as an output terminal capable of outputting audio data.

The sensing unit 180 senses various user interactions. The sensing unit 180 may be configured of various sensors and may be configured to include at least one device of all types of sensing devices capable of detecting a state change of the device 100. For example, the sensing unit 180 may be configured to include at least one sensor among various sensing devices such as a touch sensor, an acceleration sensor, a gyro sensor, an illuminance sensor, a proximity sensor, a pressure sensor, an audio sensor (e.g., a microphone), a video sensor (e.g., a camera module), a timer, and the like.

The sensing unit 180 may be classified into a touch sensing unit 181, a motion sensing unit 182, and the like, as illustrated in FIG. 2, depending on a sensing purpose, but is not limited thereto. For example, the sensing unit 180 may be classified depending on various other purposes. This does not indicate a physical classification, and one or more sensors may be coupled to each other to serve as the sensing units 181 and 182. In addition, some of the configurations or functions of the sensing unit 180 may also be included in the control unit 190 depending on an implementation method.

For example, the touch sensing unit 181 may sense a touch input of a user using a touch sensor attached to a rear surface of a display panel. The control unit 190 may obtain information such as a touch coordinate, a touch time, and the like from the touch sensing unit 181 and may determine a type of the touch input (e.g., a tap gesture, a double tap gesture, a panning gesture, a flick gesture, a touch and drag gesture, etc.). Alternatively, the control unit 190 may directly determine a type of a touch input using a touch coordinate, a touch time, and the like obtained by the touch sensing unit 181.

The motion sensing unit 182 may sense a motion (e.g., a rotation, a tilt, or the like) of the device 100 using at least one of an accelerator sensor, a tilt sensor, a gyro sensor, and a 3-axis magnetic sensor. In addition, the motion sensing unit 182 may transmit a generated electrical signal to the control unit 190. As an example, the motion sensing unit 182 may measure acceleration in which kinetic acceleration and acceleration of gravity of the device 100 are added, but may measure only acceleration of gravity when the device 100 is not in motion.

The control unit 190 may control an overall operation of the device 100 using a variety of programs stored in the storage unit 150.

As illustrated in FIG. 2, the control unit 190 may be configured as a random access memory (RAM) 191, a read only memory (ROM) 192, a graphic processing unit 193, a main central processing unit (CPU) 194, first to n-th interfaces 195-1 to 195-*n*, and a bus 196. In this case, the RAM 191, the ROM 192, the graphic processing unit 193, the main CPU 194, the first to n-th interfaces 195-1 to 195-*n*, and the like may be connected to each other through the bus 196.

The RAM 191 stores the OS and the application program. For example, when the device 100 is booted, the RAM 191 may store the OS and a variety of application data selected by the user.

The ROM 192 stores a set of instructions for booting a system. When a turn-on instruction is input to supply power, the main CPU 194 copies the OS stored in the storage unit 150 in the RAM 191 according to instructions stored in the ROM 192 and executes the OS to boot the system. When booting is completed, the main CPU 194 copies a variety of application programs stored in the storage unit 150 in the RAM 191 and executes the application programs copied in the RAM 191 to perform a variety of operations.

The graphic processing unit 193 generates a screen including various objects such as an item, an image, a text, and the like using a calculating unit and a rendering unit. In this case, the calculating unit may be a component that calculates attribute values such as coordinate values, shapes, sizes, colors, and the like in which respective objects are to be displayed according to a layout of a screen, using a control instruction received from the sensing unit 180. In addition, the rendering unit may be a component that generates a screen of various layouts including objects, based on attribute values calculated by the calculating unit. A screen generated by the rendering unit may be displayed in a display region of the display unit 130.

The main CPU 194 accesses the storage unit 150 and performs booting using an OS stored in the storage unit 150. In addition, the main CPU 194 performs various operations using a variety of programs, contents, data, and the like stored in the storage unit 150.

The first to n-th interfaces 195-1 to 195-*n* are connected to a variety of components described above. One of the first to n-th interfaces 195-1 to 195-*n* may be a network interface connected to an external device through a network.

For example, if the control unit 190 receives a user input switching a first screen which is being displayed on the first display 11 into a second screen while the first device 11 and the second device 21 display the same screen, the control unit 190 may control the display unit 130 so that the first screen which is being displayed on the first device 11 is switched into the second screen to be displayed, and may control one of the first to n-th interfaces 195-1 to 195-*n* (and the communication unit 140) so that the first screen which is being displayed is continuously displayed on the second device 21.

In addition, if the control unit 190 receives information switching a first screen which is being displayed on the second device 21 into a third screen from the second device 21 while the first device 11 and the second device 21 display the same screen, the control unit 190 may transmit information on the third screen to the second device 21 while the first screen is continuously displayed on the first device 11, in response to the received information.

In addition, the control unit 190 may receive a user input switching a first screen into a third screen through the sensing unit 180 while the first screen is displayed on the first device 11 and the second screen is displayed on the second device 21, and may transmit the information on the third screen to the second device 21 so that the same screen is displayed on the first device 11 and the second device 21, in a first mode state. In a second mode state, the control unit 190 may control the display unit 130 so that a third screen is displayed on a first device 11 and may control one of the first to n-th interfaces 195-1 to 195-*n* and the communication unit 140 so that only the first screen is continuously displayed on the second device 21.

The first device 11 and the second device 21 may be connected to each other in one connection state of a plurality of connection states. For example, the plurality of connection states may include a first connection state in which the first device 11 and the second device 21 display the same screen and a second connection state in which the first device 11 and the second device 21 display independent screens.

The first connection state, which is a state in which screens of the first device 11 and the second device 21 are synchronized with each other, may indicate a connection state in which a screen of the second device 12 is also simultaneously or almost simultaneously changed when a screen of the first device 11 is changed. A case in which screens are almost simultaneously changed may include, for example, a network connection situation between the first device 11 and the second device 21, or the case in which a same screen is displayed while having a predetermined time difference by a screen data processing time of the first device 11 or the second device 21. In a first connection state, the first device 11 may compress a screen which is currently being displayed on the first device 11 and transmit the compressed screen to the second device 21, in order to synchronize the screen with the second device 21. In this case, the situation in which the first device 11 compresses the screen may occur when an event occurs every predetermined period or an event occurs that changes at least a portion of the screen.

In addition, a second connection state, in which screens of the first device 11 and the second device 21 are desynchronized with each other, may indicate a state in which the second device 12 continuously displays a screen which was previously being displayed, even though a screen of the first device 11 is changed. As another embodiment of the present invention, the second connection state may indicate a state in which the first device 11 continuously displays a screen which was previously being displayed, even though a screen of the second device 12 is changed. In the second connection state, even though screens of the first device 11 and the second device 12 are not synchronized with each other, the first device 11 and the second device may transmit and receive information on a screen and the contents with each other. As an example, in the case in which a screen of the first device 11 is changed, the first device 11 may transmit information on the screen of the first device 11 to the second device 12. In this case, even though the second device 21 receives the information on the screen of the first device 11, the second device 21 may temporarily or permanently store the received information on the screen in the storage unit 150 while continuously displaying a screen which was previously being displayed. Hereinafter, various embodiments of the present invention for the second connection state are described below. In addition, various embodiments of the present invention occurring in response to switching between the first connection state and the second connection state are described below.

Figure 4:
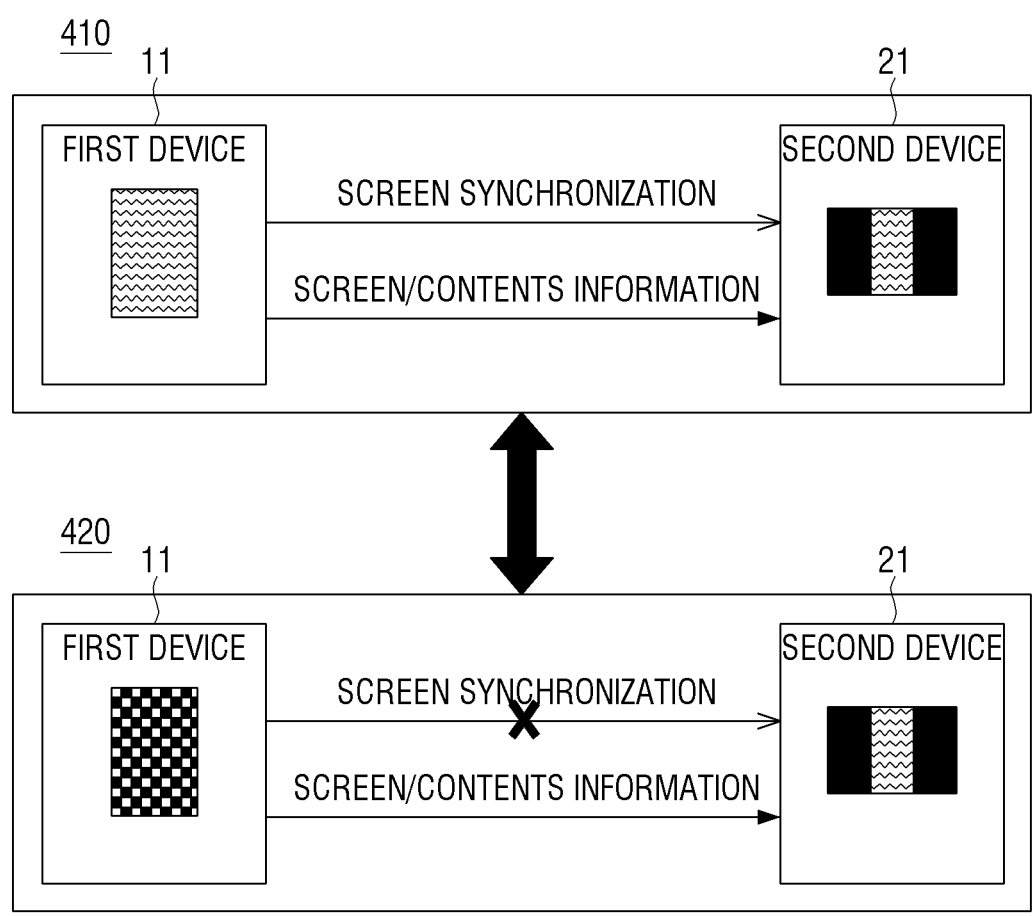
FIG. 4 is a diagram of a method of sharing a screen between a first device and a second device according to an embodiment of the present invention.

FIG. 4 is a diagram of a method of sharing a screen between the first device 11 and the second device 21 according to an embodiment of the present invention.

Referring to FIG. 4, reference numeral 410 denotes that the first device 11 and the second device 21 share a screen in a screen synchronization state, and reference numeral 420 of FIG. 4 denotes that the first device 11 and the second device 21 share a screen in a screen desynchronization state.

In the screen synchronization state as denoted in reference numeral 410 of FIG. 4, in the case in which the screen of the first device 11 is switched into another screen while the first device 11 and the second device 21 display the same screen, the screen of the second device 21 may also be switched into another screen. In order to maintain the screen synchronization state, the first device 11 may transmit information on the screen of the first device 11 to the second device 21 when an event according to a predetermined period or a user input occurs. In the case in which the screen includes the contents, the first device 11 may transmit information on the contents to the second device 21.

In contrast, in the screen desynchronization state as denoted in reference numeral 420 of FIG. 4, in the case in which the screen of the first device 11 is switched into another screen while the first device 11 and the second device 21 display the same screen, the screen of the second device 21 may not be switched. In this case, the first device 11 may perform a control so that the screen of the second device 21 is not switched and the second device 21 continuously displays a previous screen. The performing of the control so that the second device 21 continuously displays the previous screen may include a case in which the first device 11 controls the first device 11 or the second device 21. For example, the performing of the control so that the second device 21 continuously displays the previous screen may include a case in which the first device 11 does not transmit the information on the screen to the second device 21, or the first device 11 transmits information on the previous screen which is displayed before the screen switching to the second device 21. Alternatively, the performing of the control so that the second device 21 continuously displays the previous screen may include a case in which the first device 11 transmits control information to the second device 21 so that the second device 21 continuously displays the information on the previous screen even though the information on the screen is not transmitted from the first device 11.

In this case, the screen synchronization state and the screen desynchronization state may be switched between each other depending on a selection of a user. For example, depending on whether or not a user selects a UI element included in a pop-up screen displayed on a screen of the first device 11, the first device 11 and the second device 21 may be operated in the screen synchronization state or the screen desynchronization state.

In addition, the sharing of a screen between the first device 11 and the second device 21 may include all cases in which the screen is shared by a mirroring scheme, a streaming scheme, and a combination thereof.

Figure 5:
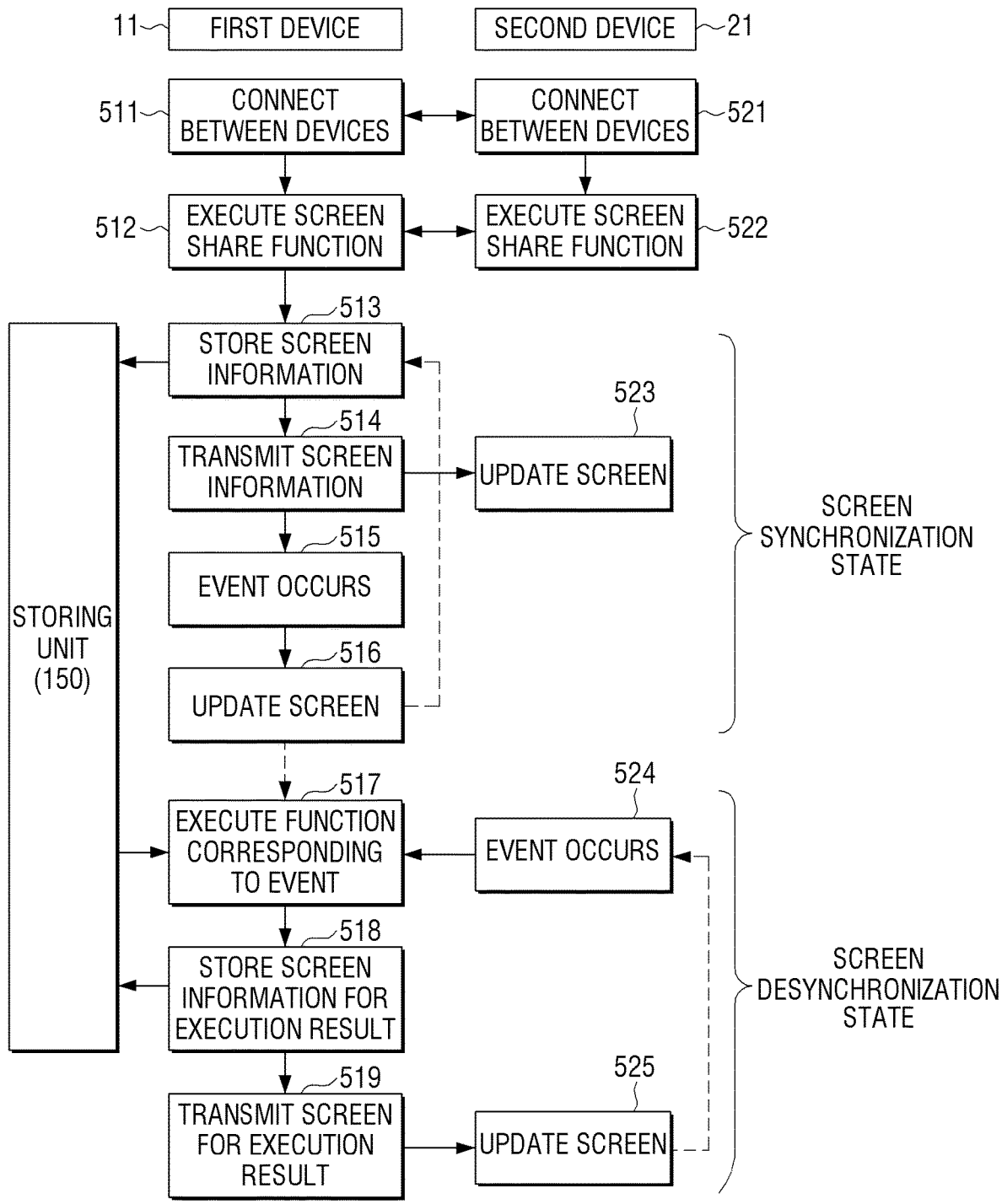
FIG. 5 is a flowchart of a method of sharing a screen between a first device and a second device according to an embodiment of the present invention.

FIG. 5 is a flowchart of a method of sharing a screen between a first device 11 and a second device 21 according to an embodiment of the present invention.

Referring to FIG. 5, when the first device 11 and the second device 21 are connected to each other in steps 511 and 521 and a user of the first device 11 executes a function of sharing a screen in step 512, the first device 11 may transmit a signal requesting whether or not the screen is shared to the second device 21. In response, the second device 21 may grant a screen sharing request to execute a function of sharing the screen with the first device 11 in step 522. The sharing of the screen between the first device 11 and the second device 21 may include a case in which a screen which is currently being displayed on the first device 11 is shared, as well as a case in which the screen is shared so that a screen which is displayable on the first device 11 and processed by the image processing unit 120 of the first device 11 is instead displayed on the second device 21 even though the screen is not displayed on the first device 11.

In this case, the sharing of the screen which is currently being displayed on the first device 11 between the first device 11 and the second device 21 may be referred to as a screen synchronization state, and the sharing of the screen which is displayable on the first device 11 and processed by the image processing unit 120 of the first device 11 between the first device 11 and the second device 21 may be referred to as a screen desynchronization state.

In the case in which the first device 11 and the second device 21 are in the screen synchronization state, the first device 11 may compress a first screen which is currently being displayed on the first device 11 and store the first compressed screen in step 513. The first compressed screen may be, for example, temporarily or permanently stored in the storage unit 150 of the first device 11, a recordable medium located external to the first device 11, or a storage unit of a server. Then, the first device 11 may transmit the first compressed screen to the second device 21 as information related to the screen in step 514. The second device 21 may decompress the first compressed screen and update the screen of the second device 21 in step 523. That is, the second device 21 may display the first screen.

In the case in which an event occurs in step 515 while the first device 11 and the second device 21 display the same screen, the first device 11 may update the screen to another screen in step 516. In other words, the first device 11 may switch the first screen into the second screen. The case in which the event occurs may include, for example, a user input switching the first screen into the second switch is received, or the event occurring every predetermined period so that the screens of the first device 11 and the second device 21 continuously maintain a synchronized state. In the case in which the first screen of the first device 11 is switched into the second screen, the first device 11 may compress the second screen which is currently being displayed on the first device 11 and store the compressed second screen. Then, the first device 11 may transmit the compressed second screen to the second device 21. The second device 21 may decompress the compressed second screen and update the screen of the second device 21. In other words, the second device 21 may display the second screen.

As such, in the case in which the first device 11 and the second device 21 are in the screen synchronization state, the first device 11 and the second device 21 may continuously display the same screen. In this case, the continuously displaying of the same screen by the first device 11 and the second device 21 may also include a situation in which the same screen is displayed while having a predetermined time difference due to a network connection state between the first device 11 and the second device 21. That is, the continuously displaying of the same screen by the first device 11 and the second device 21 may also include a situation in which the same screen is displayed while having a small time difference (e.g., within 60 seconds), even though the first device 11 and the second device 21 do not display the same screen at the same time.

Then, at least one of the first device 11 and the second device 21 may receive a signal requesting that the first device 11 and the second device 21 share the screen in the desynchronization state. The signal may be, for example, a signal generated in response to a user input through the UI element of the first device 11 or the second device 21, while the first device 11 and the second device 21 display the same screen.

In the case in which the first device 11 and the second device 21 are in the screen desynchronization state, while the first device 11 and the second device 21 display the same screen, an event updating the screen which is being displayed on the second device 21 into another screen may occur in step 524. A case in which an event occurs may include, for example, the event occurring in response to a user input switching the second screen into a third screen. As the event occurs, the second device 21 may transmit information related to the event to the first device 11. For example, the second device 21 may transmit a coordinate location on the second screen corresponding to the user input or UI element identification information corresponding to the coordinate location to the first device 11.

The first device 11 may receive the information related to the event and execute a function corresponding to the received event in step 517. For example, the first device 11 may execute the function corresponding to the received event by obtaining the information related to the second screen from the storage unit 150, and applying the information related to the event in the second screen (e.g., the coordinate location on the second screen). In addition, the first device 11 may compress a third screen associated with an event execution result and store the compressed third screen in step 518. The compressed third screen may be, for example, temporarily or permanently stored in the storage unit 150 of the first device 11, a recordable medium located external to the first device 11, or a storage unit of a server. Then, the first device 11 may transmit the compressed third screen to the second device 21 in step 519. The second device 21 may decompress the compressed third screen and update the screen of the second device 21 in step 525. In other words, the second device 21 may display the third screen.

FIGS. 6A to 18 are diagrams illustrating processes for sharing a screen between the first device 11 and the second device 21 according to an embodiment of the present invention.

According to an embodiment of the present invention, while the display unit 130 of the first device 11 displays a screen, the communication unit 140 of the first device 11 may transmit the information related to the first screen to the second device 21. In addition, in the case in which a user input switching the first screen into a second screen is received, the control unit 190 of the first device 11 may control the display unit 130 so that the first screen which is being displayed on the first device 11 is switched into the second screen to be displayed, and may perform the control so that the second device 21 continuously displays the first screen.

Figure 6A:
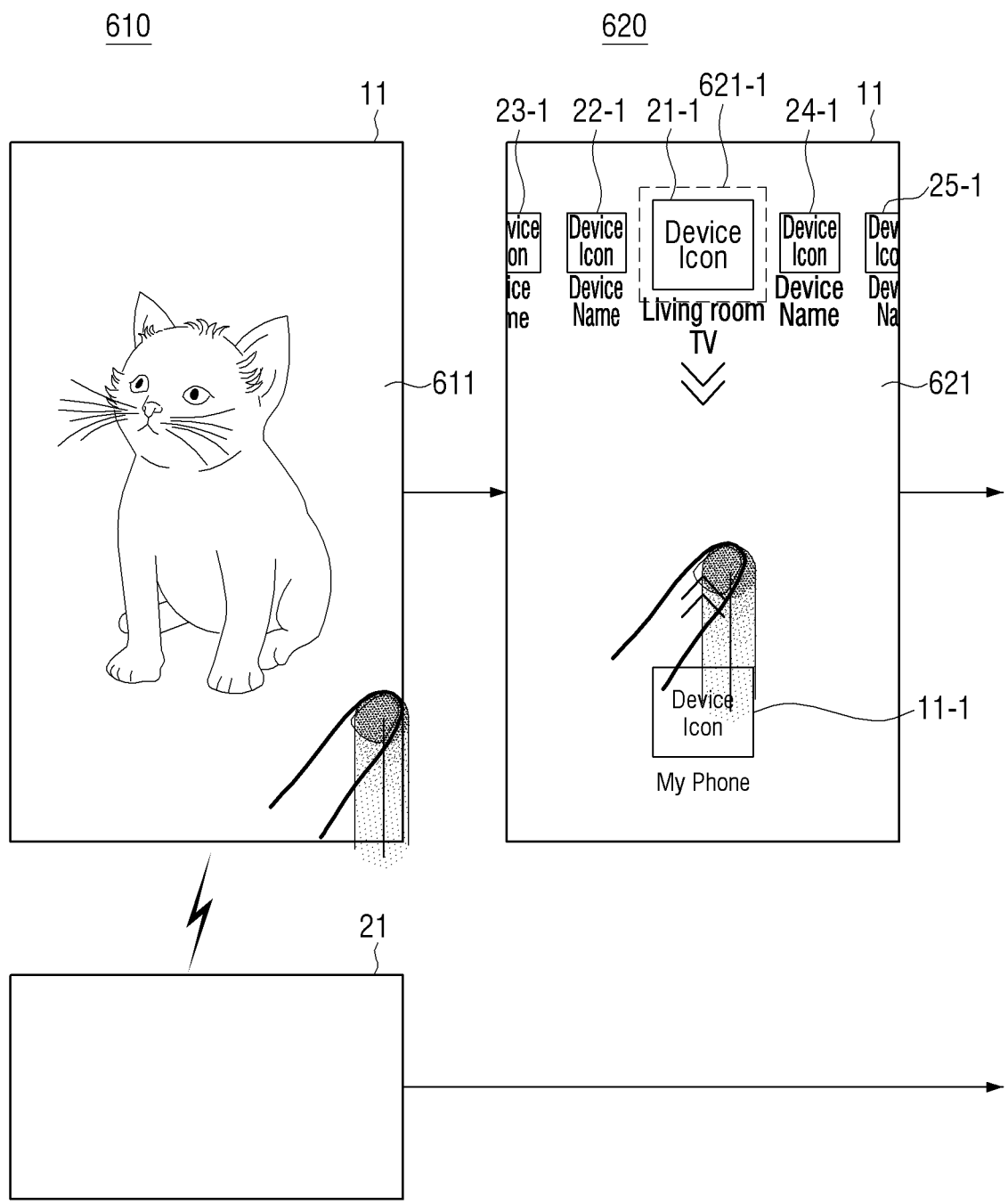

Referring to FIG. 6A, reference numeral 610, while an application (e.g., a gallery application) is executed and the display unit 130 of the first device 11 displays the first screen 611 including the image, the sensing unit 180 may sense a user input that performs an upward drag or flick gesture on the display unit 130.

In response to the user input, as in reference numeral 620 of FIG. 6A, the control unit 190 of the first device 11 may control the display unit 130 so that a share device selection screen 621 capable of selecting a device to share the screen is displayed. The share device selection screen 621 may include icons 21-1, 22-1, 23-1, 24-1, and 25-1 representative of each of the second devices 21 to 2N which may currently communicate with the first device 11, and an icon 11-1 representative of the first device 11. For example, in the case in which the Bluetooth scheme is used between the first device 11 and the second devices 21 to 2N, if a Bluetooth function of the first device 11 is turned on, the communication unit 140 may transmit a power beacon signal to the second devices 21 to 2N. In addition, in response to the power beacon signal, the second devices 21 to 2N may transmit an advertisement signal informing that the second devices 21 to 2N may be connected. In this case, the share device selection screen 621 may display the icons 21-1, 22-1, 23-1, 24-1, and 25-1 representative of each of the second devices 21 to 2N which transmit the advertisement signal.

The icons 21-1, 22-1, 23-1, 24-1, and 25-1 representative of each of the second devices 21 to 2N which are targeted to be shared may have their positions changed depending on a drag gesture or a flick gesture of the user on the icons 21-1, 22-1, 23-1, 24-1, and 25-1. In the case in which the icon 21-1 representative of the second device 21 desired to be shared by the user is positioned in a predetermined region 621-1, the sensing unit 180 may sense the user input selecting the second device 21. For example, the sensing unit 180 may select the icon 11-1 representative of the first device 11 and sense the user input that performs a drag or a flick gesture in a direction of the icon 21-1 representative of the second device 21.

Referring to FIG. 6B, in response to the user input, as in reference numeral 630, the communication unit 140 of the first device 11 may transmit the information related to a first screen 611 which is being displayed to the second device 21. As a result, the screens of the first device 11 and the second device 21 are synchronized with each other, such that the same screen 611 may be displayed. In addition, the screen of the first device 11 may display a pop-up screen 631. The pop-up screen 631 is a screen which is independent from the first screen 611 which is being displayed on the first device 11, and may not be displayed on the second device 21. The pop-up screen 631 may include at least one of a UI element 631-1 for selecting whether the screens of the first device 11 and the second device 21 are synchronized with each other, and identification information 631-2 of the second device 21 sharing the screen with the first device 11. In order to indicate that the screen synchronization state between the devices is executed, the UI element 631-1 may display the text "Clone On," but a notification indicating that the screen synchronization state is executed is not limited thereto, but may be indicated by various forms such as graphics, moving pictures, sound, and the like. The pop-up screen 631 may be referred to by a term for a bubble pop-up screen or a bubble screen in order to indicate that it is a screen independent from the screen of the first device 11. In reference numeral 630 of FIG. 6B, while the screens of the first device 11 and the second device 21 are being synchronized with each other, the sensing unit 180 may sense the user input that performs a drag or a flick gesture in one direction on the display unit 130 in order to switch the first screen 611 which is being displayed on the first device 11 into a second screen 641.

In response to the user input, as in reference numeral 640 of FIG. 6B, the display unit 130 of the first device 11 may display the second screen 641. The communication unit 140 of the first device 11 may transmit information related to the second screen 641 which is being displayed to the second device 21. The second device 21 may control the display unit 130 so that the second screen 641 is displayed, using the received information related to the second screen 641. As a result, the screens of the first device 11 and the second device 21 are synchronized with each other, such that the same second screen 641 may be displayed. While the screens of the first device 11 and the second device 21 are being synchronized with each other, the sensing unit 180 may sense a user input that performs a tap gesture selecting a UI element 631-1 included in the pop-up screen 631 in order to stop the screen synchronization state between the screens.

Referring to FIG. 6C, in response to a user input, as in reference numeral 650, a pop-up screen 651 including a text "Clone Off" for indicating that the screen synchronization state between the screens is stopped may be displayed, but a notification indicating that the screen synchronization state between the screens is stopped is not limited thereto, but may be indicated by various forms such as graphics, moving pictures, sound, and the like. Then, the sensing unit 180 may sense a user input executing another application (e.g., a message application). In an embodiment of the present invention, a user input executing another application may be, for example, a user input executing a home screen and selecting a shortcut icon of another application displayed on the home screen, a user input displaying a recently executed application list and selecting an identifier of another application included in the application list, a user input performing a shortcut gesture corresponding to another application, or the like, but is not limited thereto.

In response to a user input, as in reference numeral 660 of FIG. 6C, the control unit 190 of the first device 11 may control the display unit 130 so that a third screen 661, which is an execution screen of another application (e.g., the message application) is displayed. In addition, the control unit 190 of the first device 11 may control the display unit 130 so that a second screen 641 which is previously displayed is continuously displayed on the second device 21. Then, the sensing unit 180 of the first device 11 may sense a user input executing an application (e.g., a moving picture application).

Referring to FIG. 6D, in response to a user input, as in reference numeral 670, the control unit 190 of the first device 11 may control the display unit 130 so that a fourth screen 671, which is an execution screen of an application (e.g., a moving picture application) is displayed. In this case, the control unit 190 of the first device 11 may control the display unit 130 so that the second screen 641 which is previously displayed is continuously displayed on the second device 21. Then, the sensing unit 180 of the first device 11 may sense a user input performing a tap gesture selecting the pop-up screen 651 to execute the screen synchronization state between the screens.

In response to the user input, as in reference numeral 680 of FIG. 6D, a notification for indicating that the screen synchronization state between the screens is executed, a pop-up screen 681 including a text "Clone On" may be displayed. In this case, the control unit 190 of the first device 11 may transmit information on a fourth screen 671 which is being displayed on the first device 11 to the second device 21 so that the same screen is also displayed on the second device 21. The information on the fourth screen 671 may be, for example, data obtained by compressing image contents 671-1 included in the fourth screen 671. The second device 21 may control the display unit 130 so that the received compressed data is decompressed and the image contents 671-1 are displayed. As a result, the screens of the first device 11 and the second device 21 are synchronized with each other, such that the same screen 671-1 may be displayed.

As such, while the screen of the first device 11 is displayed, the user may easily execute a multi-tasking job using the pop-up screens 631, 651, and 681.

Referring to FIG. 7, in an embodiment of the present invention, in reference numeral 710, the screens (e.g., home screens) 711 of the first device 11 and the second device 21 are synchronized with each other, such that the same first screen 711 may be displayed on the first device 11 and the second device 21. In this case, a UI element 712-1 indicating whether or not the first device 11 and the second device 21 are synchronized with each other may be displayed on a pop-up screen 712 of the first device 11. A text "ON" may be displayed on the UI element 712-1, as the notification for indicating that the first screen 711 is in the screen synchronized state. In this state, the sensing unit 180 of the first device 11 may sense a user input performing a tap gesture selecting the UI element 712-1 included in the pop-up screen 712 to stop the screen synchronization state between the screens.

In response to a user input, as in reference numeral 720 of FIG. 7, a text "OFF" for indicating that the screen synchronization state between the screens is stopped (or desynchronized) may be displayed on the UI element 712-1 included in the pop-up screen 712. Then, the sensing unit 180 may sense a user input executing another application (e.g., a gallery application).

In response to a user input, as in reference numeral 730 of FIG. 7, the screens of the first device 11 and the second device 21 are desynchronized with each other, such that the control unit 190 of the first device 11 may control the display unit 130 so that the second screen 731, which is an execution screen of another application (e.g., the gallery application) is displayed. In addition, the control unit 190 of the first device 11 may control the display unit 130 so that the first screen 711 which is previously displayed is continuously displayed on the second device 21.

As such, the user may easily switch between the screen synchronization state and the screen desynchronization state using the pop-up screen 712. That is, the pop-up screen 712 may be used as a screen synchronization state manipulation dedication tool.

Figure 10:
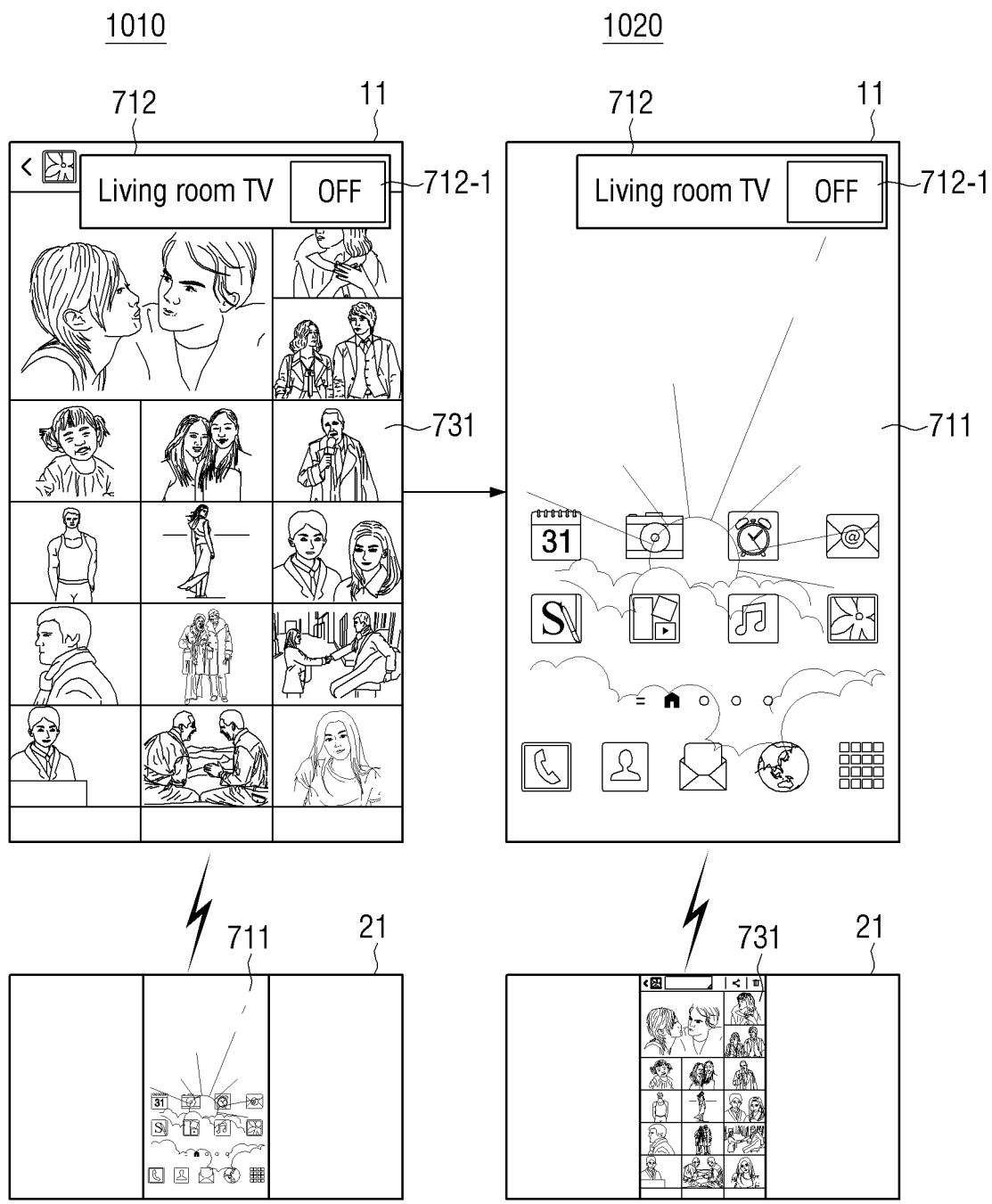

Referring to FIGS. 8 to 10, as in reference numeral 730 of FIG. 7, there are illustrated embodiments of the present invention which are extensible in a state in which the screens of the first device 11 and the second device 21 are desynchronized.

Referring to reference numeral 810 of FIG. 8, as in reference numeral 730 of FIG. 7, in the state in which the screens of the first device 11 and the second device 21 are desynchronized with each other, the sensing unit 180 of the first device 11 may sense a user input that performs a tap gesture selecting a UI element 712-1 included in the pop-up screen 712 in order to execute the screen synchronization state between the screens.

In response to the user input, as in reference numeral 820 of FIG. 8, a text "ON" may be displayed on the UI element 712-1 included in the pop-up screen 712, as notification information for indicating that the screen synchronization state between the screens is executed. In addition, the control unit 190 of the first device 11 may transmit information on the second screen 731 which is being displayed on the first device 11 to the second device 21 so that the same screen is also displayed on the second device 21. The second device 21 may display the second screen 731 using the received information related to the second screen 731. As a result, the screens of the first device 11 and the second device 21 are synchronized with each other, such that the same second screen 731 may be displayed.

Referring to reference numeral 910 of FIG. 9, as in reference numeral 730 of FIG. 7, in the state in which the screens of the first device 11 and the second device 21 are desynchronized with each other, the sensing unit 180 of the first device 11 may sense a user input that performs a tap gesture selecting a UI element 712-1 included in the pop-up screen 712 in order to execute the screen synchronization state between the screens.

In response to the user input, as in reference numeral 920 of FIG. 9, a text "ON" may be displayed on the UI element 712-1 included in the pop-up screen 712, as notification information for indicating that the screen synchronization state between the screens is executed. In this case, the control unit 190 of the first device 11 may perform a control so that a first screen 711 of the first device 11 is displayed on the second device 21. For example, the control unit 190 of the first device 11 may control the display unit 130 so that the information on the first screen 711 of the second device 21 is received from the second device 21 and the first screen 711 is displayed. Alternatively, the control unit 190 of the first device 11 may control the display unit 130 so that the first screen 711 which was transmitted to the second device 21 is obtained from the storage unit 150 and is displayed. In addition, a user interaction scheme for executing the screen synchronization state between the screens of the first device 11 and the second device 21 instead of the pop-up screen 712 may include a scheme for selecting a UI element included in a separate menu or performing a predetermined user gesture, or the like.

Referring to reference numeral 1010 of FIG. 10, as in reference numeral 730 of FIG. 7, in the state in which the screens of the first device 11 and the second device 21 are desynchronized with each other, a user input switching the second screen 731 of the first device 11 and the first screen 711 of the second device 21 may be sensed. For example, the sensing unit 180 of the first device 11 may select a UI element included in the pop-up screen 712 to switch the screen between the first device 11 and the second device 21, select a UI element included in a separate menu, or sense a user input performing a predetermined user gesture.

In response to the user input, the control unit 190 of the first device 11 may control the display unit 130 so that the second screen 731 of the first device 11 and the first screen 711 of the second device 21 are switched with each other and are displayed. For example, the control unit 190 of the first device 11 may control the display unit 130 so that the information on the first screen 711 of the second device 21 is obtained from the second device 21 or the storage unit 150 and the first screen 711 is displayed. In addition, the control unit 190 of the first device 11 may simultaneously or almost simultaneously transmit the information on the second screen 731 of the first device 11 to the second device 21. The second device 21 may control the display unit 130 so that the second screen 731 is displayed, using the received information on the second screen 731.

Figure 11A:
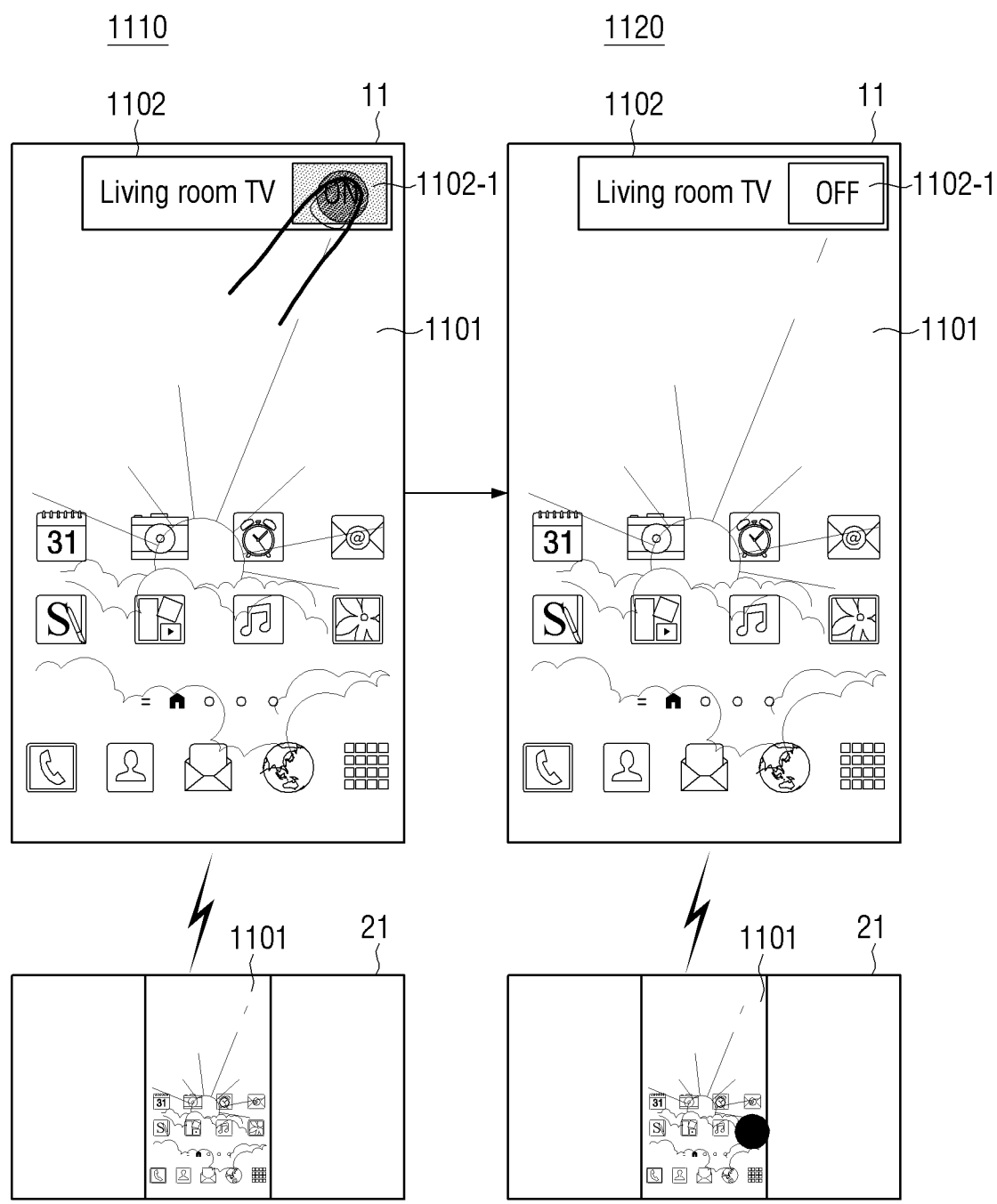

In an embodiment of the present invention, referring to reference numeral 1110 of FIG. 11A, the first screen (e.g., home screen) 1101 of the first device 11 and the second device 21 are synchronized with each other, such that the same first screen 1101 may be displayed on the first device 11 and the second device 21. In this case, a UI element 1102-1 indicating whether or not the first screens 1101 of the first device 11 and the second device 21 are synchronized with each other may be displayed on a pop-up screen 1102 of the first device 11. A text "ON" may be displayed on the UI element 1102-1, as notification information indicating that the first device 11 and the second device 21 are being synchronized with each other. In this state, the sensing unit 180 of the first device 11 may sense a user input performing a tap gesture selecting the UI-element 1102-1 included in the pop-up screen 1102 to stop the screen synchronization state between the screens.

In response to the user input, as in reference numeral 1120 of FIG. 11A, a text "OFF" may be displayed on the UI element 1102-1 included in the pop-up screen 1102, as the notification information for indicating that the screen synchronization state between the screens is stopped (or desynchronized). In the state in which the screen synchronization state between the first device 11 and the second device 21 is stopped, the second device 21 of FIG. 11A may sense a user input for executing an application (e.g., a gallery application). The user input for executing the application may be, for example, a user input selecting a shortcut icon of a certain application displayed on the first screen 1101 of the second device 21.

Figure 11B:
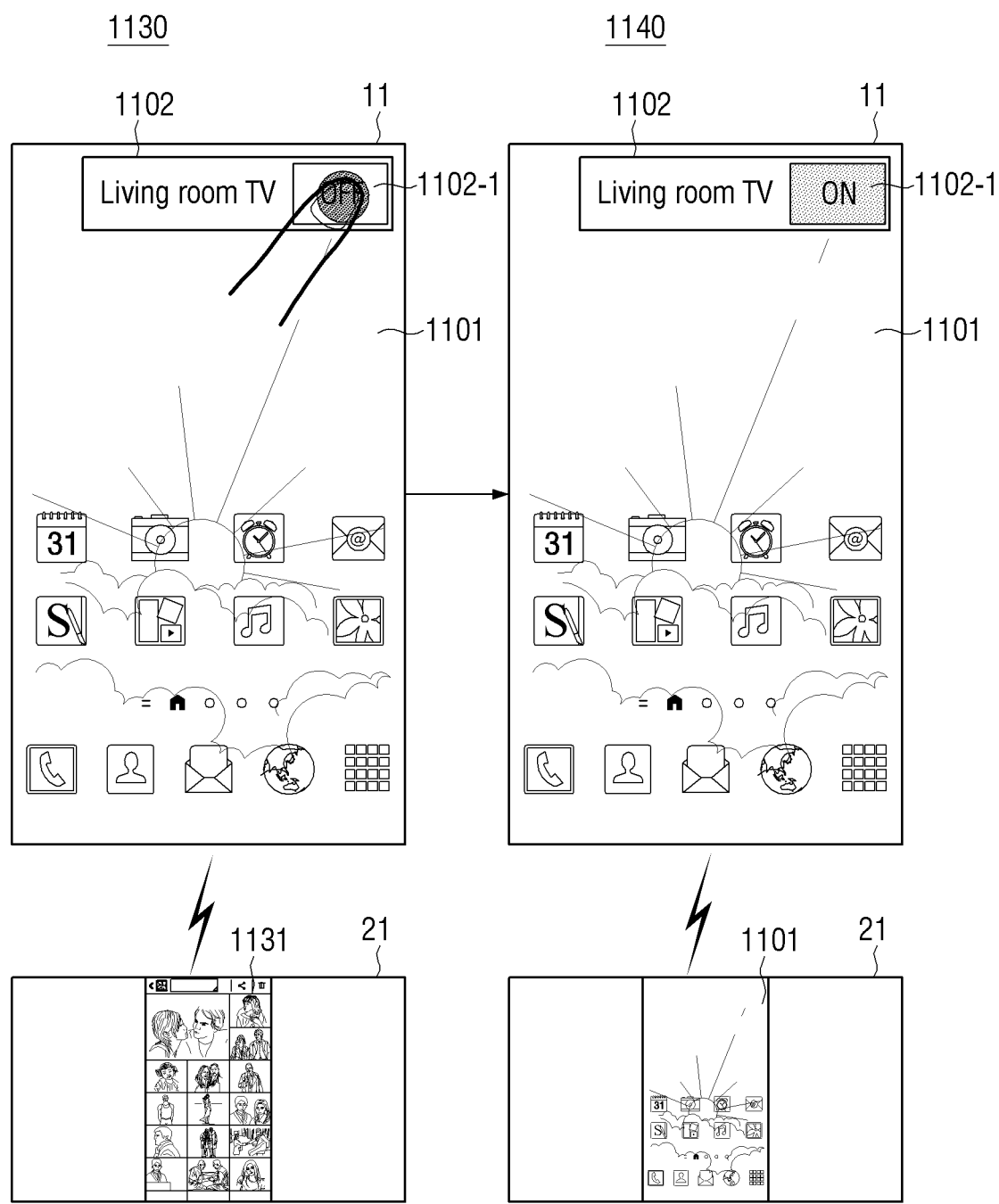

In response to a user input, as in reference numeral 1130 of FIG. 11B, the second device 21 may transmit information related to the user input to the first device 11. For example, the second device 21 may transmit a coordinate location on the first screen 1101 corresponding to the user input on the display unit 130 of the second device 21 or UI element identification information corresponding to the coordinate location to the first device 11. The first device 11 may receive the information related to the user input as described above and execute a function corresponding to the user input. For example, the first device 11 may execute the application (e.g., the gallery application). In addition, the first device 11 may transmit information related to an execution screen 1131 of the application to the second device 21. In this case, the first device 11 may control the display unit 130 so that the execution screen 1131 of the application is not displayed on the display unit 130 and the first screen 1101 is continuously displayed on the display unit 130. Then, the first device 11 may sense the user input selecting the UI element 1102-1 included in the pop-up screen 1102.

In response to the user input, as in reference numeral 1140 of FIG. 11B, a text "ON" may be displayed on the UI element 1102-1 included in the pop-up screen 1102, as notification information indicating that the screen synchronization state between the screens is executed. In this case, the control unit 190 of the first device 11 may transmit the information on the first screen 1101 to the second device 21. The second device 21 may display the first screen 1101 using the information on the received first screen 1101.

As such, according to an embodiment of the present invention, an independent control between the first device 11 and the second device 21 may be enabled, such that utilization of the second device 21 by the user may be further increased.

Figure 12A:
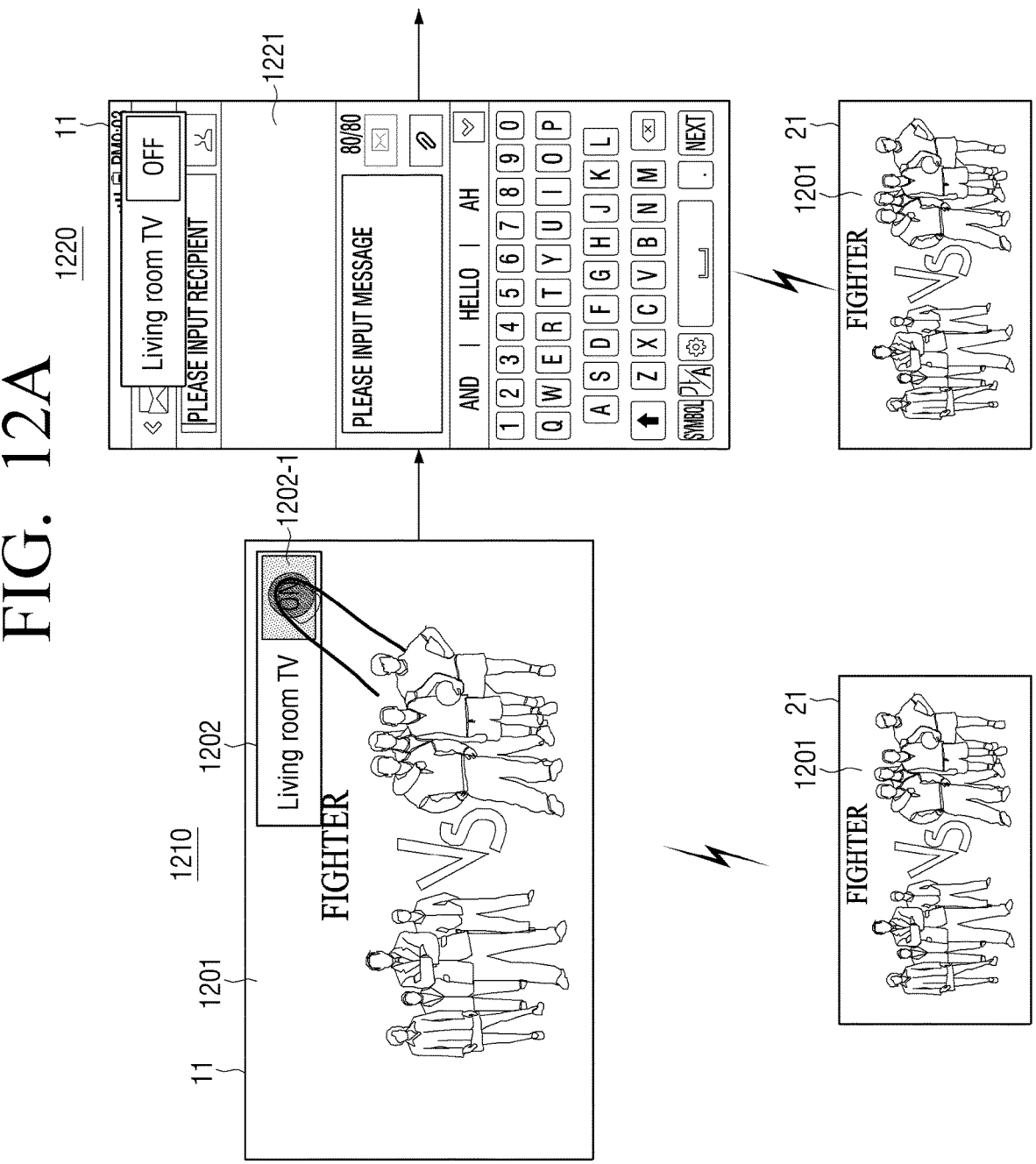

Referring to FIG. 12A, in an embodiment of the present invention, and referring to reference numeral 1210, first application execution screens (e.g., execution screens of a game application) of the first device 11 and the second device 21 are synchronized with each other, such that the same first screen 1201 may be displayed on the first device 11 and the second device 21. In this state, the sensing unit 180 of the first device 11 may sense a user input selecting a UI element 1202-1 included in a pop-up screen 1202 to stop the screen synchronization state between the screens.

In response to a user input, as in reference numeral 1220 of FIG. 12A, the control unit 190 of the first device 11 may stop the screen synchronization state between the first device 11 and the second device 21. In the state in which the screen synchronization state between the first device 11 and the second device 21 is stopped, in response to a user input executing a second application (e.g., a text message application), the control unit 190 of the first device 11 may control the display unit 130 so that the second screen 1221, which is an execution screen of the second application is displayed. In addition, the user may perform tasks (e.g., creation and transmission of a text message) using the second screen 1221, which is the execution screen of the second application. In this case, in which another user manipulates the first application which is being displayed on the second device 21, the second device 21 may request a result related to the manipulation of the first application to the first device 11. For example, the second device 21 may request an operation result of a character according to the user manipulation of the game application. In response, the first device 11 may perform a multi-tasking job which backwardly performs a job of the first application while executing the second application. In addition, the first device 11 may transmit a result related to the manipulation of the first application to the second device 21, as a result obtained by performing the multi-tasking job. In this case, the control unit 190 of the first device 11 may control the display unit 130 so that the second screen 1221 which is the execution screen of the second application is continuously displayed.

Then, the sensing unit 180 of the first device 11 may sense a user input executing the first application (e.g., the game application), which was previously being executed.

Figure 12B:
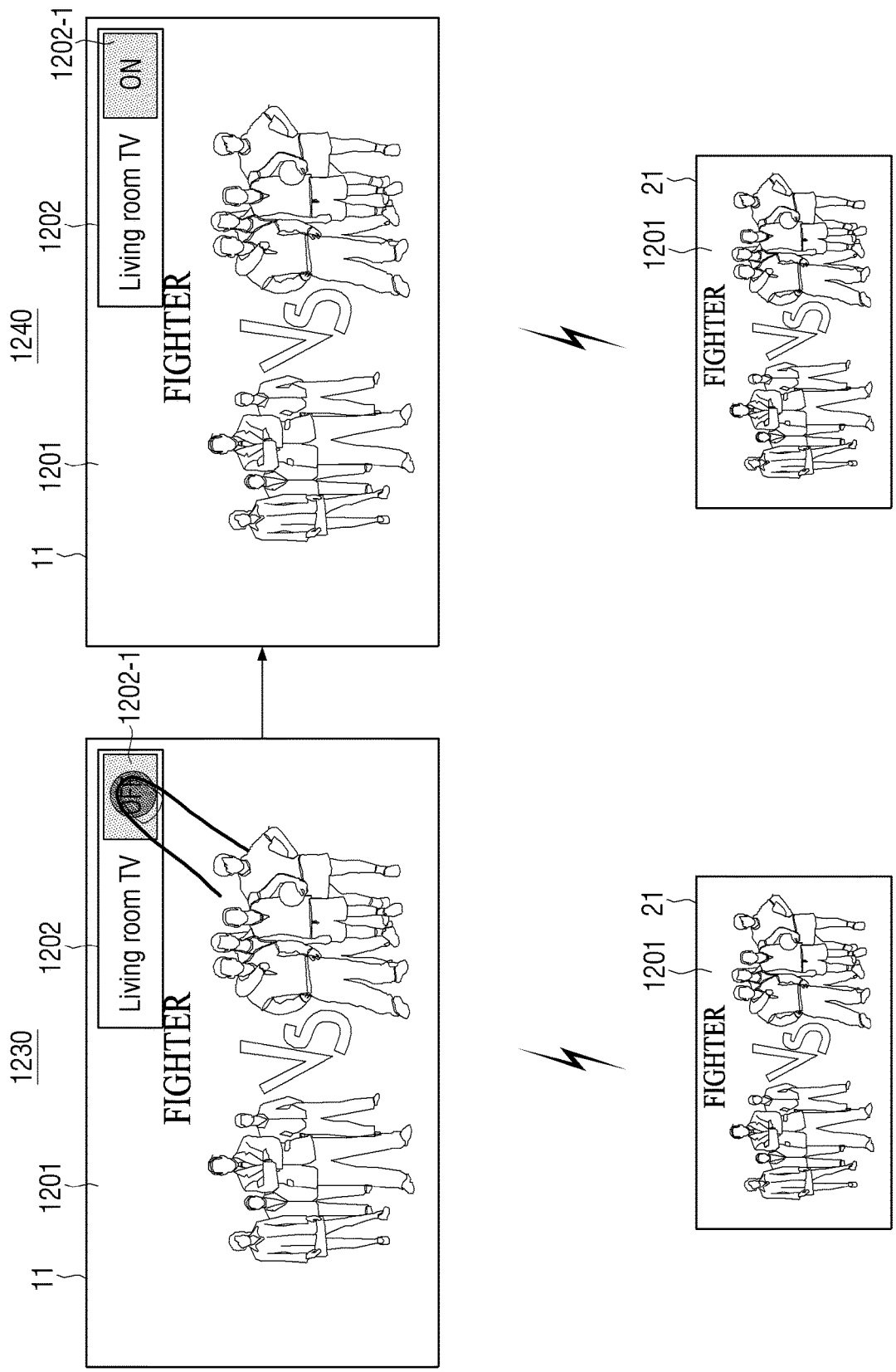

Referring to FIG. 12B, in response to the user input, as in reference numeral 1230, the control unit 190 of the first device 11 may control the display unit 130 so that the first screen 1201 which is the execution screen of the first application is displayed. While the display unit 130 of the first device 11 displays the first screen 1201, the first device 11 may sense a user input selecting a UI element 1202-1 included in the pop-up screen 1202 to execute the screen synchronization state between the screens.

In response to the user input, as in reference numeral 1240 of FIG. 12B, the control unit 190 of the first device 11 may execute the screen synchronization state between the first device 11 and the second device 21. As a result obtained by executing the screen synchronization state, the first device 11 and the second device 21 may display the same screen.

As such, in a state in which the screen synchronization state between the first screen and the second screen is being executed, the user may easily perform the multi-tasking job during a game in the first device 11 or the second device 21 by temporarily performing a screen desynchronization using the pop-up screen 1202.

Figure 13A:
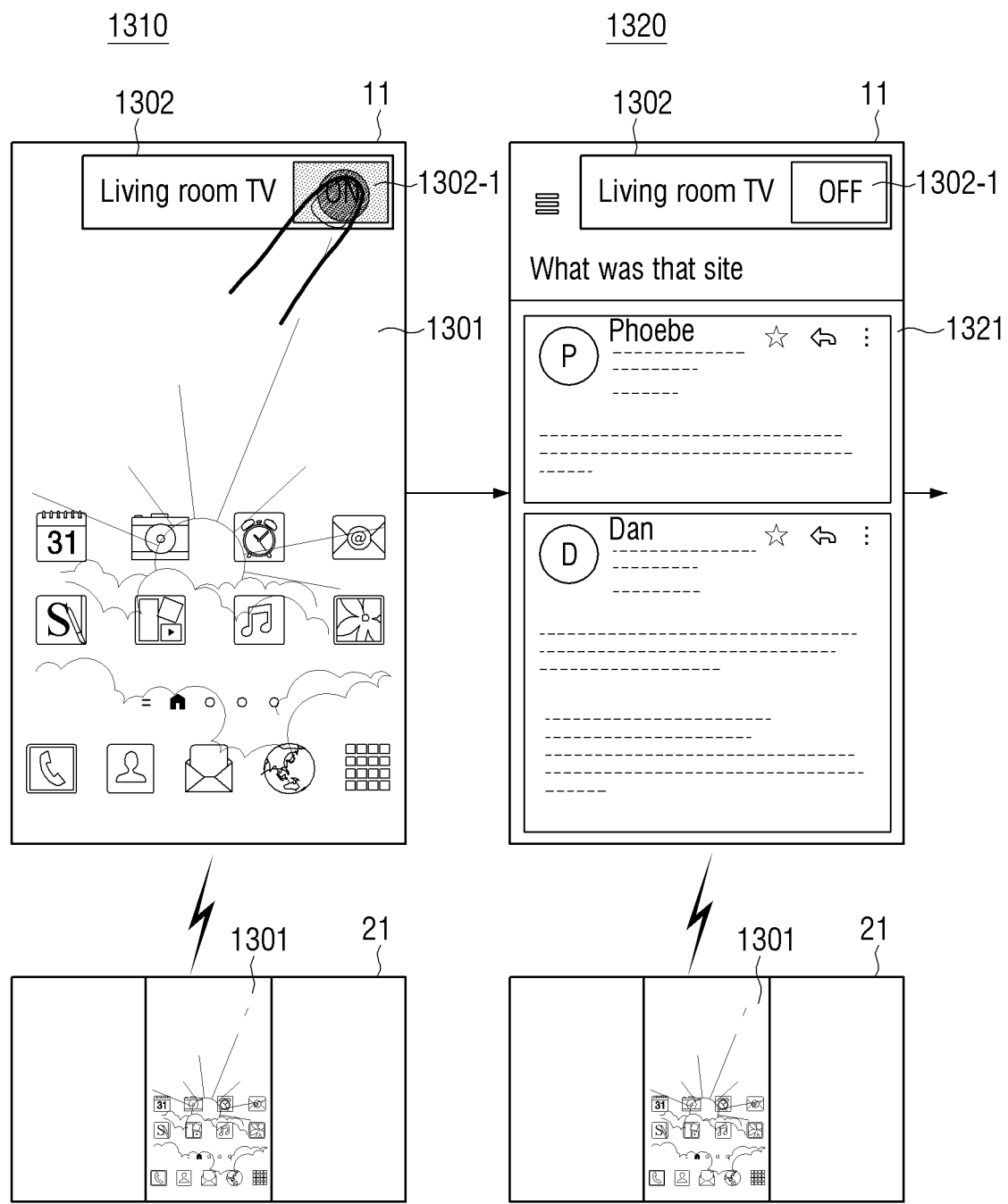

Referring to FIG. 13A, in an embodiment of the present invention, and referring to reference numeral 1310, first application execution screens (e.g., execution screens of a home screen application) 1301 of the first device 11 and the second device 21 are synchronized with each other, such that the same first screen 1301 may be displayed on the first device 11 and the second device 21. In this case, the sensing unit 180 of the first device 11 may sense a user input selecting a UI element 1302-1 included in the pop-up screen 1302 to stop the screen synchronization state between the screens.

In response to the user input, as in reference numeral 1320 of FIG. 13A, the control unit 190 of the first device 11 may stop the screen synchronization state between the first device 11 and the second device 21. In the case in which the screen synchronization state between the first device 11 and the second device 21 is stopped, in response to a user input executing a second application (e.g., a mail application), the control unit 190 of the first device 11 may control the display unit 130 so that the second screen 1321, which is an execution screen of the second application is displayed. In addition, the user may perform tasks (e.g., creation and transmission of a text message) using the second screen 1321, which is the execution screen of the second application. Then, the sensing unit 180 of the first device 11 may sense a user input executing a third application (e.g., a gallery application).

Referring to FIG. 13B, in response to the user input, as in reference numeral 1330, the control unit 190 of the first device 11 may control the display unit 130 so that the third screen 1331 which is the execution screen of the third application is displayed. In this case, since the screen synchronization state between the first device 11 and the second device 21 is in a stopped state, the first screen 1301 may be continuously displayed on the second device 21.

While the third screen 1331 is displayed on the first device 11, the sensing unit 180 of the first device 11 may sense the user input selecting the UI element 1302-1 included in the pop-up screen 1302 to execute the screen synchronization state. In response to the user input, as in reference numeral 1340 of FIG. 13B, the control unit 190 of the first device 11 may execute the screen synchronization state between the first device 11 and the second device 21. In addition, as a result obtained by executing the screen synchronization state, the communication unit 140 of the first device 11 may transmit information on the third screen 1331 to the second device 21. The second device 21 may display the third screen 1331 using the received information on the third screen 1331.

Referring to FIG. 14A, in an embodiment of the present invention, and referring to reference numeral 1410, the first device 11 may control the display unit 130 so that the application (e.g., the gallery application) is executed and the contents (e.g., moving pictures or images) list is displayed. While the contents list is displayed, the sensing unit 180 of the first device 11 may sense a user input selecting one or more contents.

In response to the user input, as in reference numeral 1420 of FIG. 14A, the first device 11 may control the display unit 130 so that visual feedback 1421-1 and 1422-1 indicating that first contents 1421 and second contents 1422 are selected. Then, the sensing unit 180 may sense a user input performing an upward drag or flick gesture on the display unit 130.

Figure 14B:
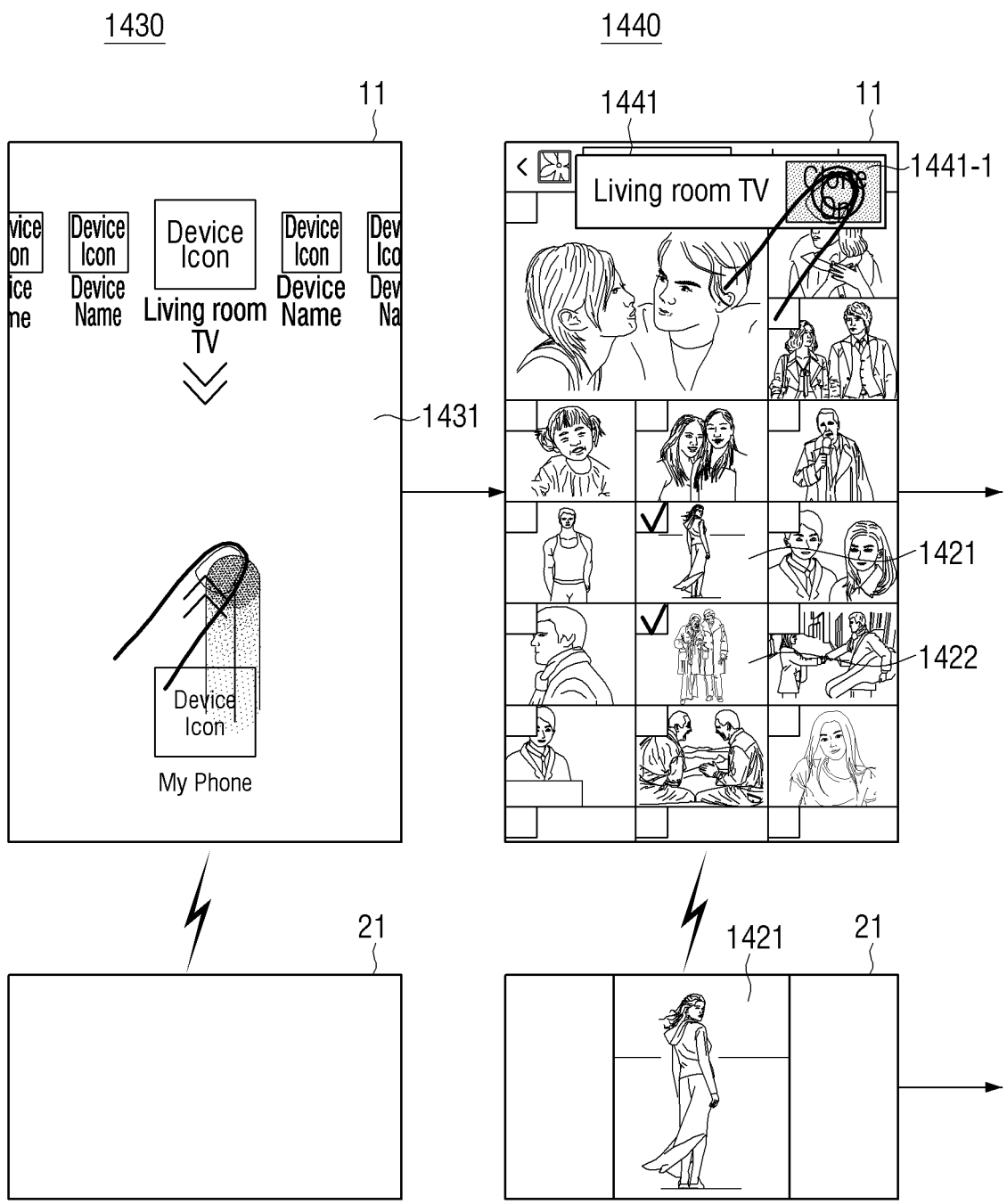

Referring to FIG. 14B, in response to the user input, as in reference numeral 1430, the control unit 190 of the first device 11 may control the display unit 130 so that a share device selection screen 1431 capable of selecting a device to share contents is displayed. While the share device selection screen 1431 is displayed, the sensing unit 180 may select an icon representative of the first device 11 to sense the user input performing a drag or flick gesture in a direction of an icon representative of the second device 21.

In response to the user input, as in reference numeral 1440 of FIG. 14B, a pop-up screen 1441 may be displayed on the screen of the first device 11. The pop-up screen 1441 may include a UI element 1441-1 indicating whether or not the screen synchronization state is performed, and the UI element 1441-1 may include a text "Clone On," as notification information indicating that the screen synchronization state between the first device 11 and the second device 21 is executed. In this case, the communication unit 140 of the first device 11 may transmit information on the selected first contents 1421 to the second device 21. For example, the information on the first contents 1421 may be compressed first contents 1421. The second device 21 may display the screen including the first contents 1421 using the information on the first contents 1421. For example, in the case in which the contents 1421 selected by the first device 11 is an image, the second device 21 may decompress the compressed image and display the decompressed image. Then, the sensing unit 180 may sense a user input selecting a UI element 1441-1. In this case, the user input may be, for example, a user gesture double-tapping the UI element.

Figure 14C:
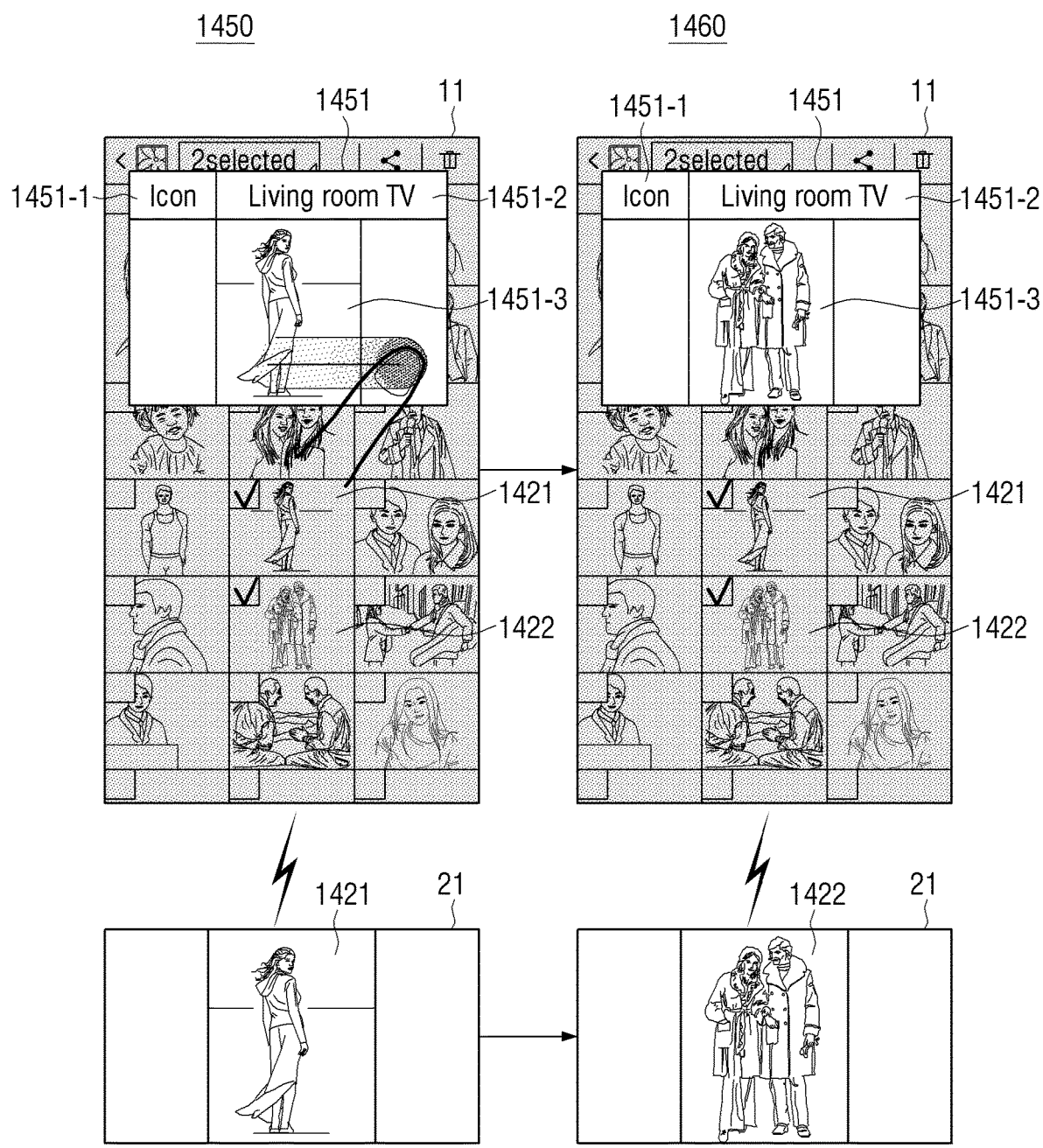

Referring to FIG. 14C, in response to the user input, as in reference numeral 1450, the control unit 190 of the first device 11 may control the display unit 130 so that a control panel 1451 of the second device 21 is displayed. The control panel 1451 may display, for example, at least one of an icon 1451-1 representative of the second device indicating a control target, a description or a name 1451-2 for the second device, and a screen 1451-3 which is being displayed on the second device. While the control panel 1451 is displayed, the sensing unit 180 of the first device 11 may sense a user input performing a flick or drag gesture in one direction on the control panel 1451. In response to the user input, the communication unit 140 of the first device 11 may transmit information on the second contents 1422 to the second device 21. The information on the second contents 1422 may be, for example, compressed contents.

As in reference numeral 1460 of FIG. 14C, the second device 21 may display the screen including the second contents 1422 using the information on the second contents 1422. In addition, the control unit 190 of the first device 11 may control the display unit 130 so that the screen of the second device 21 in which the second contents 1422 are being displayed is displayed on the control panel 1451.

As such, the user may easily manipulate the screen which is being executed in the second device 21 by the first device 11, by using the control panel 1451.

Figure 15A:
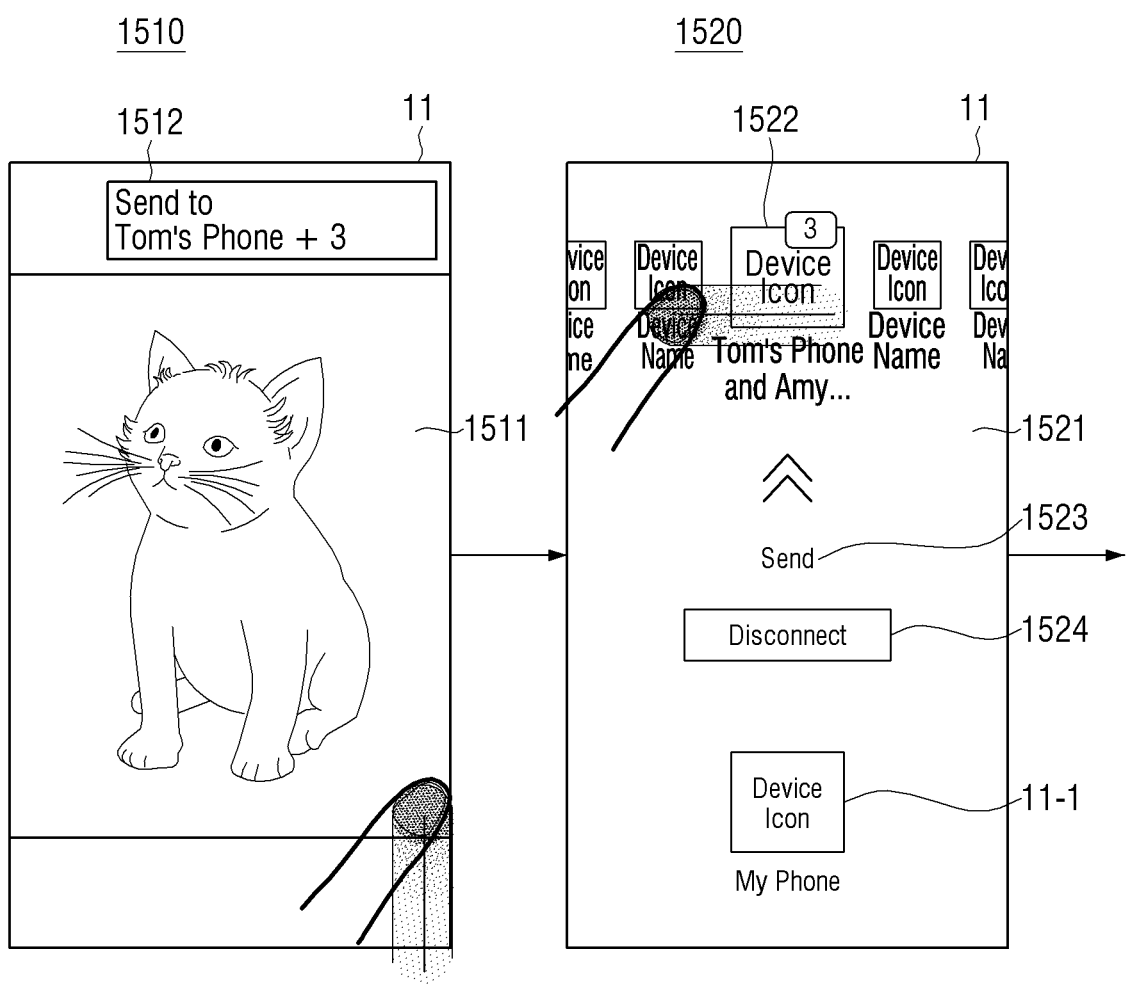

Referring to FIG. 15A, according to an embodiment of the present invention, as in reference numeral 1510, the first device 11 may control the display unit 130 so that a pop-up screen 1512 is displayed that indicates that a screen 1511 of the first device 11 is being shared with a group of the second devices. The pop-up screen 1512 may include, for example, the number of the second devices 21, 22, and 23 included in the group of the second devices, or identification information of the representative second device 21 among the group of the second devices. In this case, the second devices 21, 22, and 23 included in the group of the second devices may each display the screen 1511 of the first device 11. Then, the sensing unit 180 of the first device 11 may sense a user input performing an upward drag or flick gesture on the display unit 130.

In response to the user input, as in reference numeral 1520 of FIG. 15A, the control unit 190 of the first device 11 may control the display unit 130 so that a share device selection screen 1521 is displayed. The share device selection screen 1521 may include at least one of identifier 11-1 indicating the first device 11, identifier 1522 indicating at least one device which is currently sharing the screen, a screen share state 1523, and a UI element 1524 capable of stopping or terminating the screen share. While the share device selection screen 1521 is displayed, the sensing unit 180 of the first device 11 may sense a user input searching another device to share the screen. The user input may be, for example, a drag or a flick gesture in one direction on a list of the second devices 21 to 2N which may share with the first device 11.

Figure 15B:
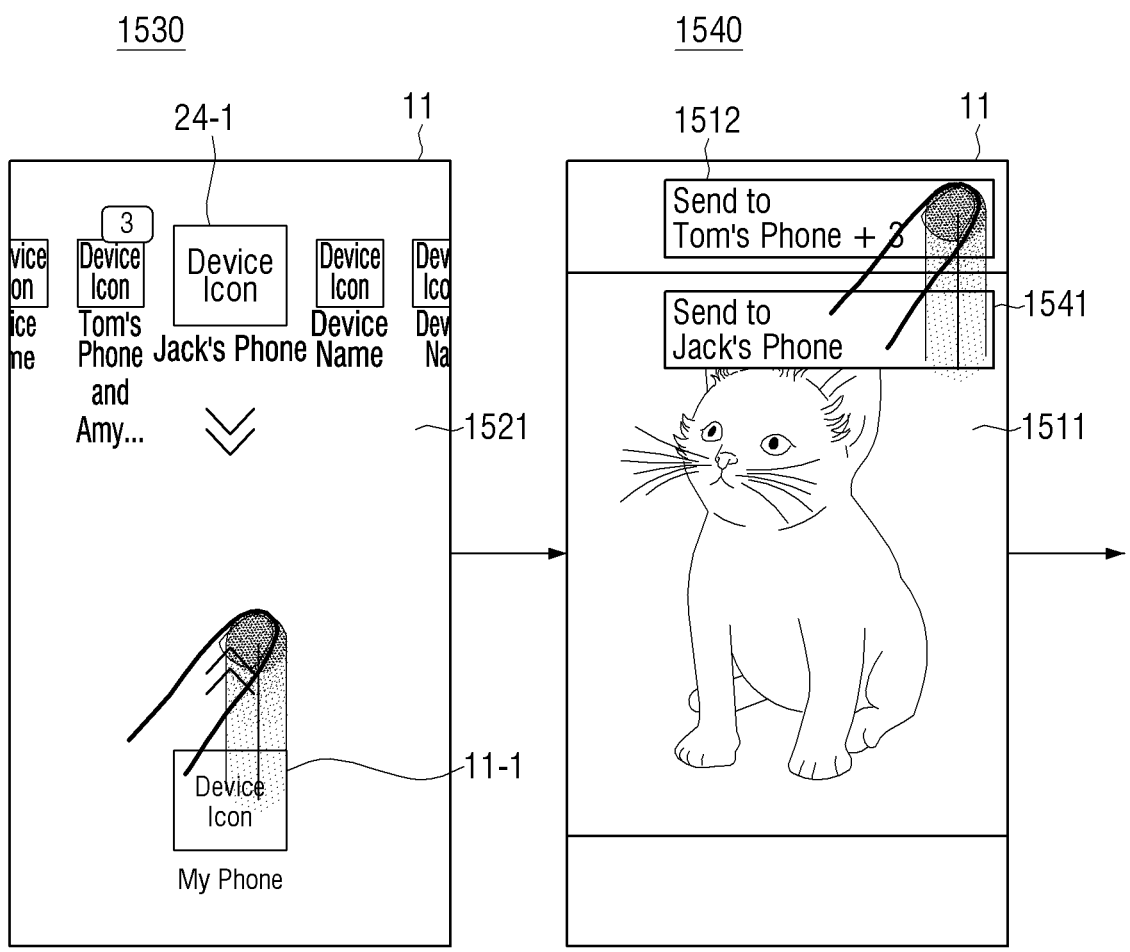

In response to the user input, as in reference numeral 1530 of FIG. 15B, in the case in which an icon 24-1 representative of a second device 24 to share the screen is located in a predetermined region, the sensing unit 180 may select the icon 11-1 representative of the first device 11 and sense a user input performing a drag or a flick gesture in a direction of the icon 24-1 representative of the second device 24.

In response to the user input, as in reference numeral 1540 of FIG. 15B, the first device 11 may control the display unit 130 so that a first pop-up screen 1512 indicating that the screen 1511 of the first device 11 is being shared with the group of the second devices and a second pop-up screen 1541 indicating that the screen 1511 of the first device 11 is being shared with the second device 24 selected in reference numeral 1530 of FIG. 15B are each displayed on the screen 1511 of the first device 11. Then, the sensing unit 180 of the first device 11 may sense a user input adding the second device 24 to the group of the second devices. The user input may be, for example, a drag or a flick gesture moving the second pop-up screen 1541 to the first pop-up screen 1512.

Referring to FIG. 15C, in response to the user input, as in reference numeral 1550, the control unit 190 of the first device 11 may add the second device 24 to the group of the second devices. In addition, the control unit 190 of the first device 11 may control the display unit 130 so that a pop-up screen 1551 is displayed that indicates that the screen of the first device 11 is being shared with the group of the second devices including the second device 24. In this case, the second devices 21, 22, 23, and 24 included in the group of the second devices may display the same screen as the screen 1511 of the first device 11. Then, the sensing unit 180 of the first device 11 may sense a user input selecting a pop-up screen 1551 to indicate a list of the second devices 21, 22, 23, and 24 included in the group of the second devices. In this case, the user input may be, for example, a user gesture double-tapping the pop-up screen 1551.

In response to the user input, as in reference numeral 1560 of FIG. 15C, the control unit 190 of the first device 11 may control the display unit 130 so that identification information 1551-1, 1551-2, 1551-3, and 1551-4 of the second devices 21, 22, 23, and 24 included in the group of the second devices is displayed on the pop-up screen 1551. The identification information of the second devices 21, 22, 23, and 24 may be, for example, a name or nickname of a user of each of the second devices 21, 22, 23, and 24, or an identifier name, type, or nickname of each of the second devices 21, 22, 23, and 24. While the identification information of the second devices 21, 22, 23, and 24 is displayed, the sensing unit 180 of the first device 11 may sense a user input selecting identification information 1551-2 of the second device 22 among identification information of the second devices 21, 22, 23, and 24. The user input may be, for example, a tap gesture touching a field on which the identification information 1551-2 of the second device 22 is displayed.

Referring to FIG. 15D, in response to the user input, as in reference numeral 1570, the control unit 190 of the first device 11 may exclude the selected second device 22 from the group of the second devices. As a result, the screen sharing between the first device 11 and the second device 22 may be stopped or a connection between the first device 11 and the second device 22 may be terminated. Then, the control unit 190 of the first device 11 may sense a user input closing a list of the second devices 21, 22, 23, and 24. The user input may be, for example, a gesture double-tapping the pop-up screen 1571.

In response to the user input, as in reference numeral 1580 of FIG. 15D, the control unit 190 of the first device 11 may control the display unit 130 so that a pop-up screen 1581 indicating that the screen of the first device 11 is being shared with the group of the second devices is displayed. The pop-up screen 1581 may include, for example, the number of the second devices 21, 23, and 24 included in the group of the second devices, or identification information of the representative second device 21 among the group of the second devices.

As such, the user may easily share the screen of the first device 11 with a plurality of second devices 21 to 2N using the pop-up screen. In addition, the user may group the second devices 21 to 2N to share the screen of the first screen 11 by various user interactions using the pop-up screen, and may easily add or exclude at least one second device to or from the grouped second devices 21 to 2N. In other words, according to an embodiment of the present invention, a group convergence service between the devices may be supported.

Referring to FIG. 16, according to an embodiment of the present invention, as in reference numeral 1610, a first screen 1611 of the first device 11 and the second device 21 are synchronized with each other, such that the same first screen 1611 may be displayed on the first device 11 and the second device 21. In this case, a UI element 1612-1 indicating whether or not the first screens 1611 of the first device 11 and the second device 21 are synchronized with each other may be displayed on a pop-up screen 1612 of the first device 11. A text "Clone On" may be displayed on the UI element 1612-1 to indicate that the first screen 1611 is being synchronized. In this state, the sensing unit 180 of the first device 11 may sense a user input selecting the UI element 1612-1 included in the pop-up screen 1612. The user input may be, for example, a holding gesture of a user which holds the UI element 1612-1 for a predetermined time.

In response to the user input, as in reference numeral 1620 of FIG. 16, the first device 11 may control the display unit 130 so that the pop-up screen 1621 is displayed that includes the UI element 1621-1 to switch contents which are being synchronized to be transmitted as a file. Then, the sensing unit 180 of the first device 11 may sense a user input selecting the UI element 1621-1. For example, the user input may be, for example, a tap gesture tapping the UI-element 1621-1.

In response to the user input, as in reference numeral 1630 of FIG. 16, the first device 11 may transmit the contents which are being displayed on the screen to the second device 21 in a file form. In this case, the first device 11 may control the display unit 130 so that a pop-up screen 1631 including notification information indicating that the file is being transmitted to the second device 21 or is transmitted to the second device 21 is displayed. In the case in which the file is transmitted from the first device 11, the second device 21 may display, for example, a visual effect 1632 indicating that the file is transmitted.

As such, the user may perform various types of convergence services using the pop-up screen. Thereby, accessibility and convenience of the user using the convergence service that is targeted to a plurality of devices may be further improved.

Figure 17:
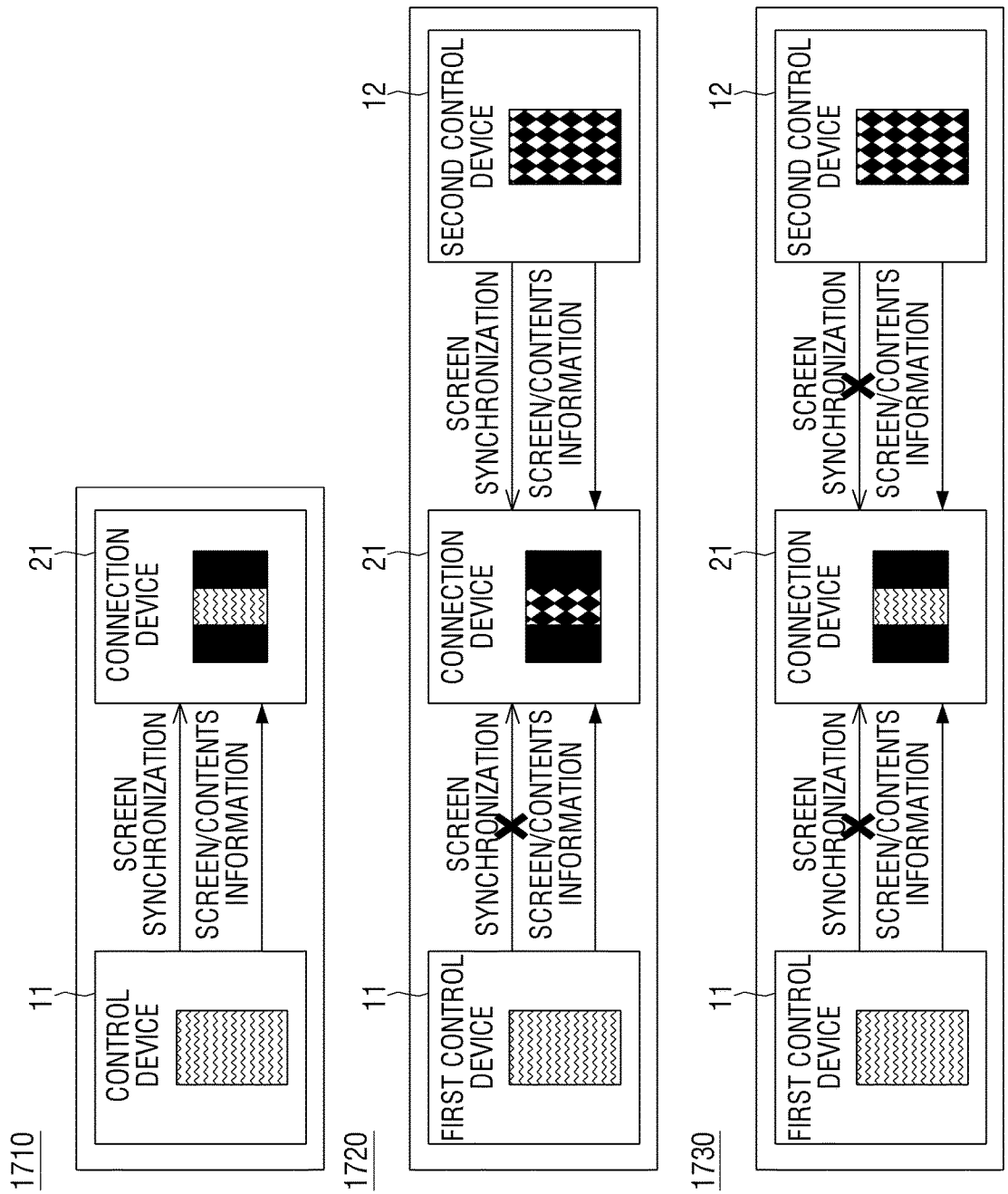

FIG. 17 is a diagram of screen sharing between a plurality of devices 11, 12, and 13 according to an embodiment of the present invention.

Referring to FIG. 17, as in reference numeral 1710, the screens are synchronized between the first device 11 and the second device 21, such that the same screen may be displayed the first device 11 and the second device 21. In this case, a user input stopping the screen synchronization state of the screens of the first device 11 and the second device 21 may be received.

In response to the user input, as in reference numeral 1720 of FIG. 17, the screen synchronization state of the screens between the first device 11 and the second device 21 may be stopped. In this case, another first device 12 may be connected to the second device 21. In addition, the screens are synchronized between the other first device 12 and the second device 21, such that the same screen may be displayed in the other first device 12 and the second device 21. In this case, the display unit 130 of the second device 21 may display only the screen of the other first device 12, or may display all of the screens of the first device 11 which are being displayed before stopping the screen synchronization state with the screen of the other first device 12. Then, the other first device 12 may receive a user input stopping the screen synchronization state of the screens of the first device 11 and the second device 21.

In response to the user input, as in reference numeral 1730 of FIG. 17, the screen synchronization state of the screens between the other first device 12 and the second device 21 may be stopped. In this case, the display unit 130 of the second device 21 may display only the screen of the other first device 12 before the screen synchronization state of the screen thereof is stopped, or may display the screen of the first device 11 and the screen of the other first device 12 together with each other before the screen synchronization state with the screen of the other first device 12 is stopped.

In addition, in the state in which the screen synchronization state between the second device 21 and the first devices 11 and 12 is stopped, the second device 21 may sense a user input for at least one of the screen of the first device 11 and the screen of the other first device 12. For example, the second device 21 may sense a user input selecting a UI element of at least one among the screens. In response to the user input, the second device 21 may transmit information related to the user input to at least one of the first devices 11 and 12. The information related to the user input may be, for example, a coordinate location on a screen corresponding to the user input, UI element identification information corresponding to the coordinate location, or the like. Then, as a result of transmitting the information related to the user input, the second device 21 may receive information on an execution result screen according to the user input from at least one of the first devices 11 and 12 and display the execution result screen.

As such, the first devices 11 and 12 may be manipulated by the display unit 130 of the second device 21 using multi-tasking in a backward state of the first devices 11 and 12.

Figure 18:
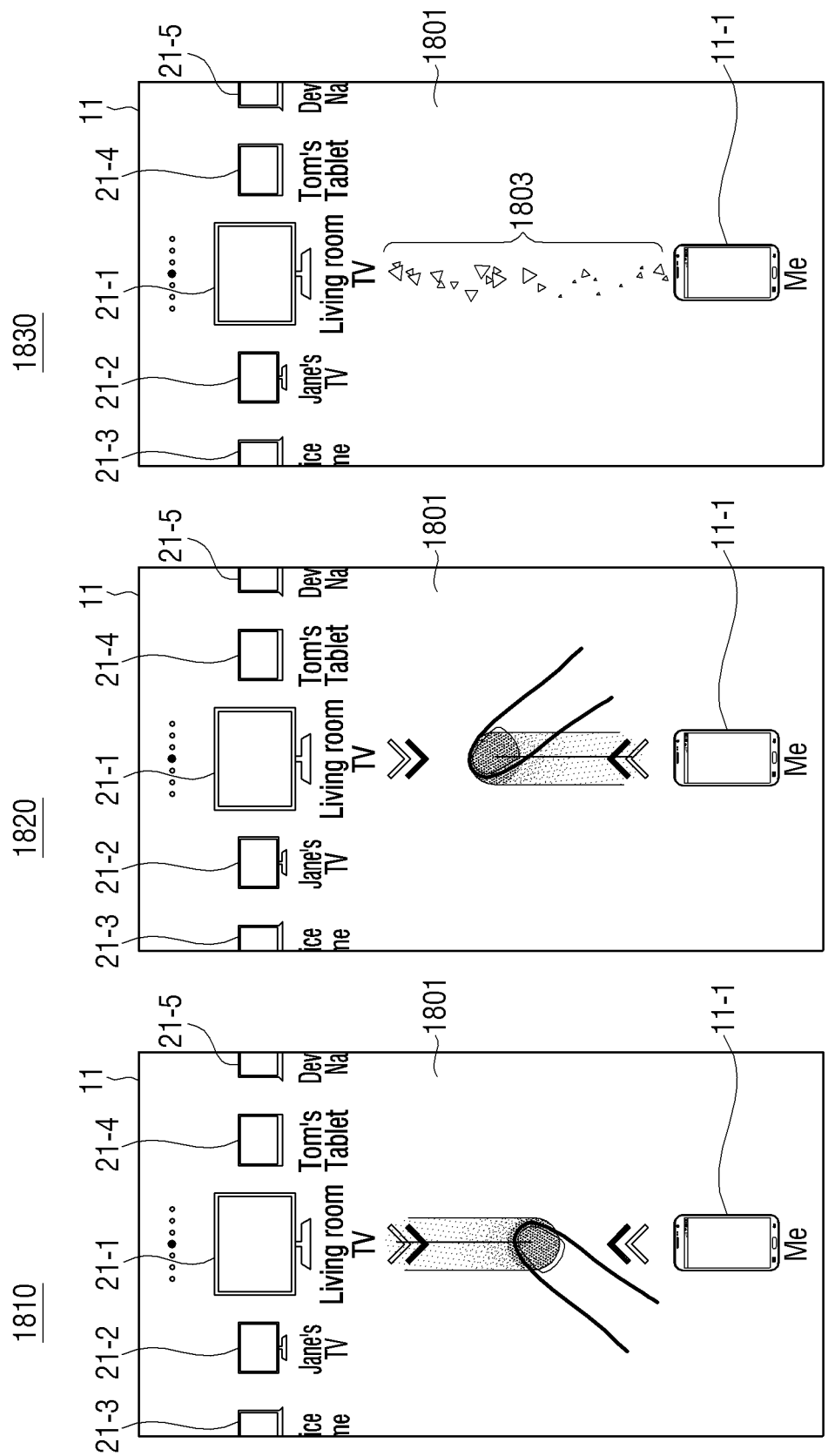

FIG. 18 is a diagram illustrating an example of a share device selection screen 1801 according to an embodiment of the present invention.

Referring to FIG. 18, as in reference numerals 1810 and 1820, the share device selection screen 1801 may include icons 21-1, 21-2, 21-3, and 21-4 representative of each of the second devices 21 to 2N which may be connected to the first device 11, and an icon 11-1 representative of the first device 11. In the case in which the icon 21-1, representative of the second device 21 for which the user wants to share the screen with the first device 11, is located in a predetermined region, the user may select the icon 21-1 and perform a drag or a flick gesture in a direction of the icon 11-1, as in reference numeral 1810 of FIG. 18. Alternatively, the user may select the icon 11-1 and perform the drag or flick gesture in a direction of the icon 21-1 as in reference numeral 1820 of FIG. 18. Referring to reference numeral 1830 of FIG. 18, in the case in which the gesture of the user is performed, a visual effect 1803 indicating that the first device 11 and the second device 21 are connected to each other may be displayed on the share device selecting screen 1801. That is, an affordance or a visual feedback indicating a connection state between the first device 11 and the second device 21 may be provided.

FIG. 19 is a diagram illustrating an example of a pop-up screen 1911 according to an embodiment of the present invention.

Referring to FIG. 19, the pop-up screen 1911 of reference numeral 1910 may indicate a state in which a screen synchronization state of the screens between the first device 11 and the second device 21 is being executed. In contrast, a pop-up screen 1921 of reference numeral 1920 of FIG. 19 may indicate a state in which the screen synchronization state of the screens between the first device 11 and the second device 21 is stopped (e.g. desynchronized).

FIG. 20 is a diagram illustrating an example of a pop-up screen 2011 according to an embodiment of the present invention.

Referring to FIG. 20, the pop-up screen 2011 of reference numeral 2010 may indicate a state in which a screen synchronization state of the screens between the first device 11 and a plurality of second devices 21 to 2N is being executed. For example, the pop-up screen 2011 may include the number of second devices 21 to 2N in which the screen synchronization state of the screens with the first device 11 is being executed, the second device representative of the second devices 21 to 2N, or a name of the group of the second devices.

A pop-up screen of reference numeral 2020 of FIG. 20 may indicate the plurality of second devices 21 to 2N in which the screen synchronization state of the screens with the first device 11 is being executed. For example, a pop-up screen 2021 may include a name or nickname of a user of each of the plurality of second devices 21 to 2N, or an identifier name, type, or nickname of each of the plurality of second devices 21 to 2N. In the case in which the number of plurality of second devices 21 to 2N which may be displayed on the pop-up screen 2021 is limited, UI elements 2021-1 and 2021-2 capable of displaying a plurality of additional second devices 21 to 2N may be included.

Figure 21:
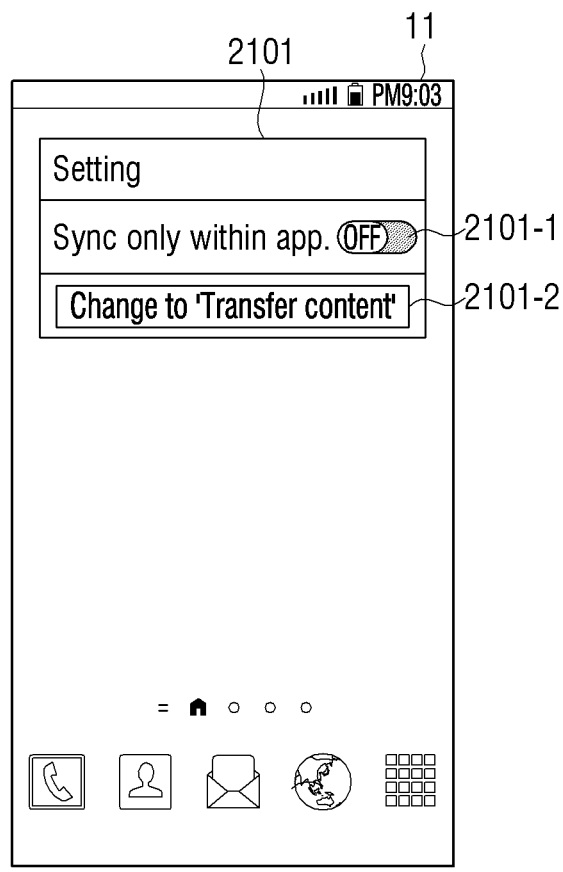

FIG. 21 is a diagram illustrating an example of a pop-up screen 2101 according to an embodiment of the present invention.

Referring to FIG. 21, the pop-up screen 2101 may include a UI element 2101-1 for determining whether or not the screens of the first device 11 and the second device 21 are synchronized with each other, and a UI element 2101-2 for determining a scheme for transmitting the contents.

In the case in which the user selects the UI element 2101-1, a screen synchronization state or a screen desynchronization state may be performed between the screens of the first device 11 and the second device 21.

In addition, in the case in which the user selects the UI element 2102-2, the first device 11 may transmit the contents to the second device 21 using one scheme of a mirroring scheme and a streaming scheme.

FIG. 22 is a diagram illustrating an example of a controller panel 2211 according to an embodiment of the present invention.

Referring to FIG. 22, the controller panel 2211 of reference numeral 2210 may indicate that the second device 21 is displaying image contents (e.g., an image). The user may select at least one UI element 2211-1 or 2211-2 included in the controller panel 2211 to switch the image contents which are being displayed on the second device 21 into another image contents. In addition, the controller panel of reference numeral 2220 of FIG. 22 may indicate that the second device 21 is reproducing audio contents (e.g., music). The user may select at least one UI element 2221-1, 2221-2, or 2221-3 included in the controller panel 2221 to control the audio contents which are being reproduced by the second device 21.

As such, according to an embodiment of the present invention, in a process of executing a convergence service, an easy connection through an intuitive gesture may be implemented by the share device selection screen, thereby making it possible to easily share the screen and the contents.

In addition, even in a process of using the convergence service, various kinds of conveniences may be provided to the user.

As an example, in the process of using the convergence service, a suitable convergence service may be used according to a use situation between the devices. For example, a type of convergence service may be applied differently depending on the type of contents and the type of devices. For example, in the case in which the contents are a home screen or a map image, the contents may be shared between the devices using a mirroring technology. In addition, in the case in which the contents are moving pictures, or music, picture images which may be continuously slid, the contents may be shared between the devices using a streaming technology. In addition, in the case in which the devices sharing the contents are smartphones and computers, the contents may be shared between the devices using a technology for transmitting files. As such, the types of convergence services are applied differently depending on the types of contents, the types of devices may be performed depending on a selection of the user, and the device automatically determines the types of contents, such that the contents may be shared in an optimal scheme.

As another example, in the process of using the convergence service, an organic service between the device and the contents may be implemented using a bubble pop-up. For example, the user may selectively determine whether or not the screens are synchronized with each other depending on the type of contents, using the bubble pop-up. For example, in a situation in which the synchronization of the screens between the devices is required, such as the home screen or the image, the user may continuously maintain the screen synchronization state of the screens. In contrast, in a situation in which a continuous synchronization of the screens is not required, as in music and a moving picture, the user may temporarily stop the screen synchronization state of the screens using the bubble pop-up. In addition, the user may integrally share the screens by grouping a plurality of devices using the bubble pop-up, and as a result, may easily remove some of the grouped devices or easily add a new device.

As another example, in the process of using the convergence service, privacy may be simply protected by using the bubble pop-up. For example, in the case in which a personal multi-tasking job during the sharing of a screen between devices is required, the user may easily stop the screen synchronization state of screens by using the bubble pop-up.

Figure 23:
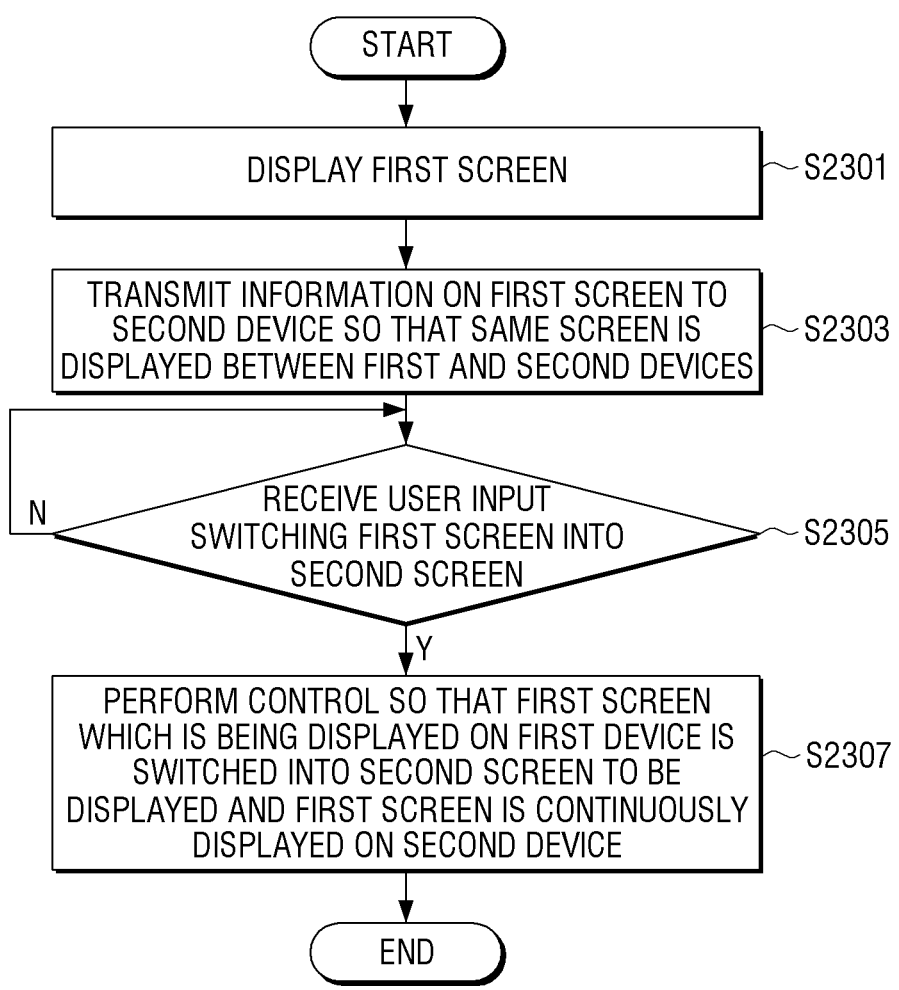
FIGS. 23 to 26 are flowcharts of methods of sharing a screen according to an embodiment of the present invention.

FIG. 23 is a flowchart of a method of sharing a screen according to an embodiment of the present invention.

Referring to FIG. 23, the first device 11 may display a first screen in step S2301. While the first screen is displayed, the first device 11 may transmit information on the first screen to the first device 11 so that the same screen is displayed by the first and second devices 11 and 21. Then, the first device 11 may receive a user input switching the first screen into a second screen in step S2305. If the user input is received, the first device 11 may switch the first screen which is being displayed on the first device 11 into the second screen and display the second screen. In addition, the first device 11 may perform a control so that the first screen is continuously displayed on the second device 21 in step S2307.

Figure 24:
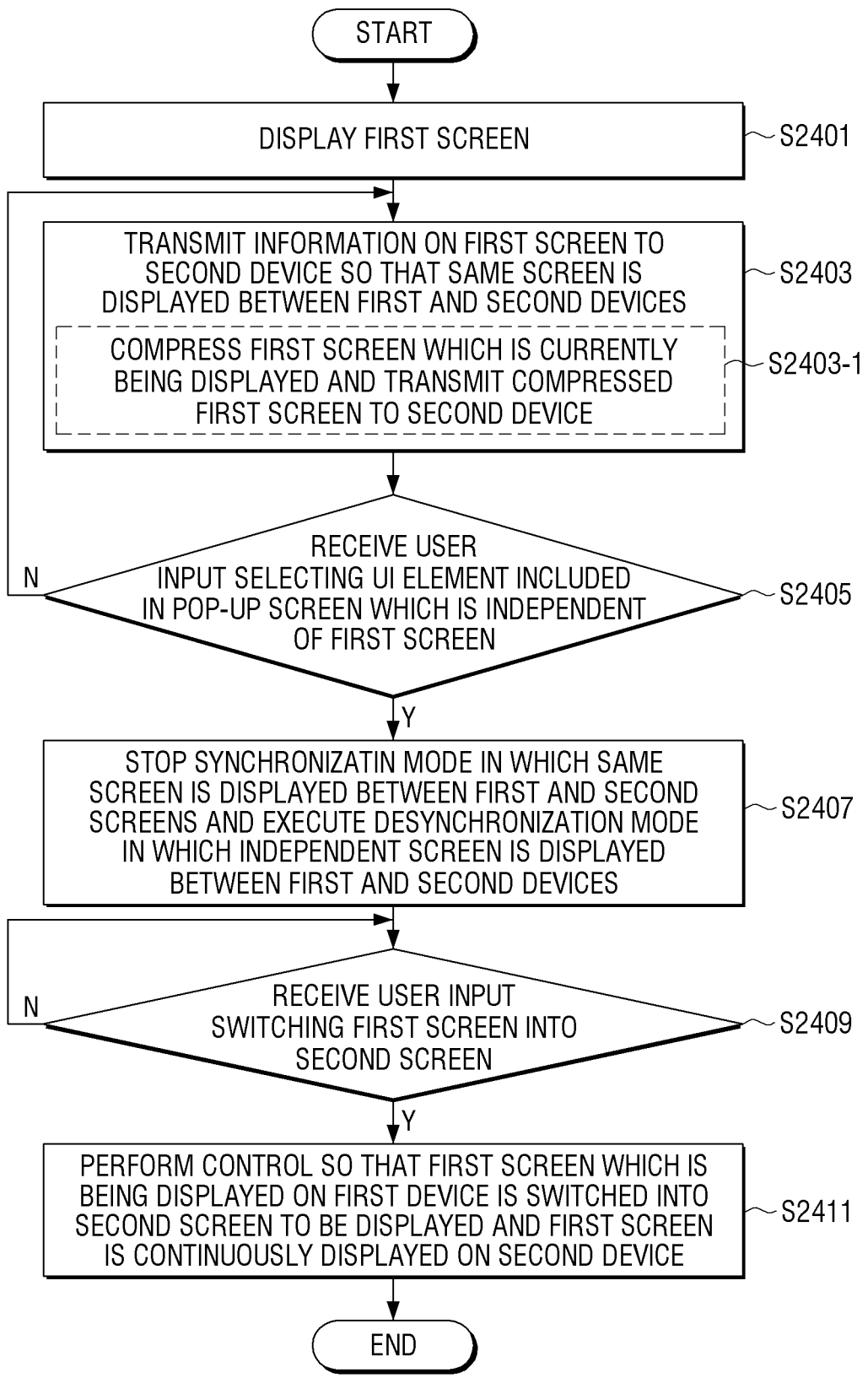

FIG. 24 is a flowchart of a method of sharing a screen according to an embodiment of the present invention.

Referring to FIG. 24, the first device 11 may display a first screen in step S2401. The first device 11 may transmit the information on the first screen to the first device 11 so that the same screen is displayed by the first and second devices 11 and 21 in step S2403. For example, the first device 11 may compress the first screen which is currently being displayed and transmit the compressed first screen to the second device 21 in step S2403-1.

Then, the first device 11 may receive a user input selecting a UI element included in a pop-up screen which is independent of the first screen in step S2405. If the user input is received, the first device 11 may stop a synchronization mode in which the same screen is displayed by the first device 11 and the second device 21, and execute a desynchronization mode in which an independent screen is displayed by the first device 11 and the second device 21 in step S2407. In contrast, if the user input is not received, the first device 11 may continuously transmit the information on the first screen to the second device 21 so that the same screen is displayed by the first and second devices 11 and 21 when an event occurs in step S2403. The event may occur, for example, according to the user input, or may occur every predetermined period so that the screens are synchronized with each other.

Then, the first device 11 may receive a user input switching the first screen into a second screen in step S2409. If the user input is received, the first device 11 may switch the first screen which is being displayed on the first device 11 into the second screen and display the second screen. In addition, the first device 11 may perform a control so that the first screen is continuously displayed on the second device 21 in step S2411.

Figure 25:
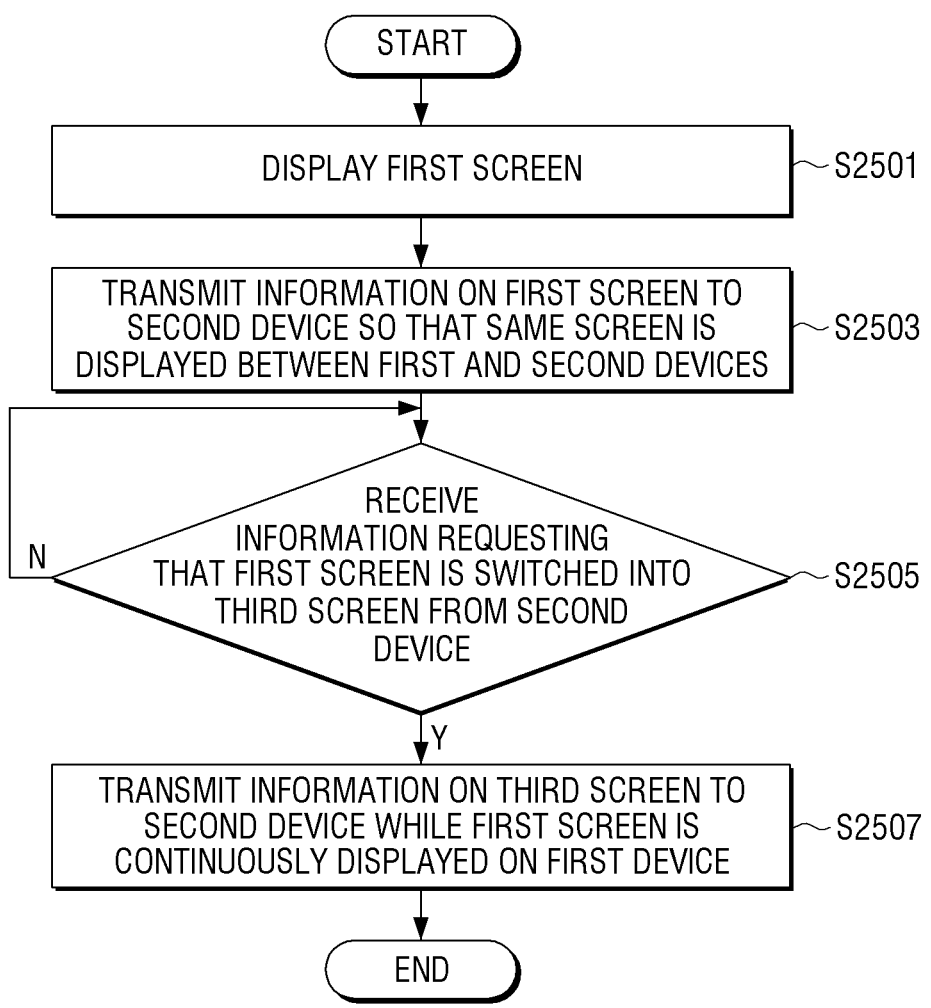

FIG. 25 is a flowchart of a method of sharing a screen according to an embodiment of the present invention.

Referring to FIG. 25, the first device 11 may display a first screen in step S2501. While the first screen is displayed, if a first connection state in which the same screen is displayed by the first device 11 and the second device 21 is implemented, the first device 11 may transmit the information on the first screen to the second device 21. Then, in a state in which the connection state between the first device 11 and the second device 21 is switched into a second connection state in which an independent screen is displayed by the first device 11 and the second device 21, the first device 11 may receive information requesting that the first screen which is being displayed on the second device 21 be switched into a third screen, from the second device 21 in step S2505. If the information is received, the first device 11 may transmit information on the third screen to the second device 21 while the first screen is continuously displayed on the first device 11 in step S2507.

Figure 26:
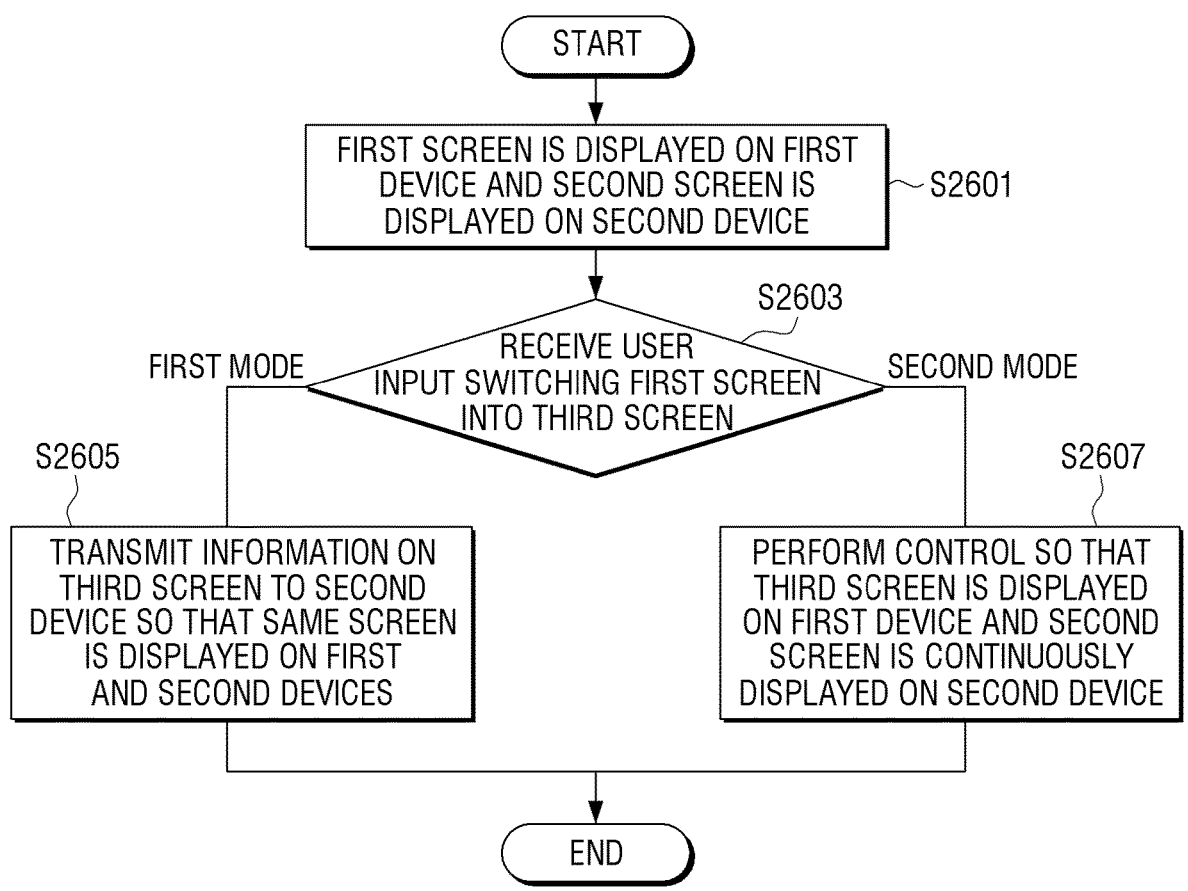

FIG. 26 is a flowchart of a method of sharing a screen according to an embodiment of the present invention.

Referring to FIG. 26, the first device 11 may display a first screen and the second device 21 may display a second screen in step S2601. In this case, the first device 11 may receive a user input switching the first screen into a third screen in step S2603. If the user input is received in a first mode state in step S2603, the first device 11 may transmit the information on the third screen to the second device 21 so that the same screen is displayed on the first device 11 and the second device 21 in step S2605. In contrast, if the user input is received in a second mode state in step S2603, the first device 11 may perform a control so that the first device 11 displays the third screen and the second device 21 displays the second screen in step S2607.

Figure 27:
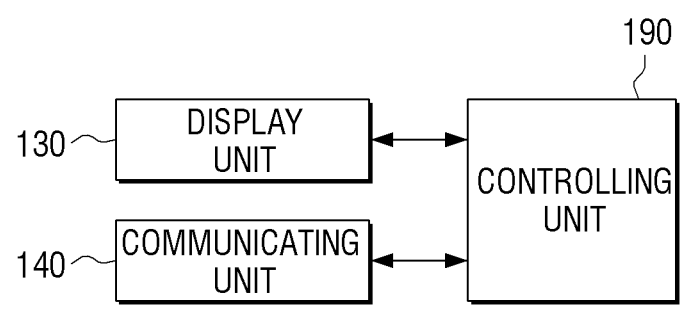
FIG. 27 is a block diagram of a device according to an embodiment of the present invention.

FIG. 27 is a block diagram of a configuration of the device 100 according to an embodiment of the present invention.

Referring to FIG. 27, the device 100 includes the display unit 130, the communication unit 140, and the control unit 190. Since examples of the configuration of the display unit 130, the communication unit 140, and the control unit 190 are described above, an overlapped description thereof is omitted.

According to an embodiment, the display unit 130 of the first device 11 may display a first screen. While the first screen is displayed, the communication unit 140 of the first device 11 may transmit the information on the first screen to the second device 21 so that the same screen is displayed by the first device 11 and the second device 21.

Then, in the case in which a user input switching the first screen into the second screen is received, the control unit 190 of the first device 11 may control the display unit 130 of the first device 11 so that the first screen which is being displayed on the first device 11 is switched into the second screen to be displayed, and may perform a control so that the second device 21 continuously displays the first screen which is being displayed.

The methods for sharing a screen according to various embodiments of the present invention described above may be implemented by a program and be provided to the first device 11 or the second device 21. For example, a non-transitory computer readable recording medium having the program including a method for sharing a screen stored thereon may be provided.

The non-transitory computer readable recording medium does not indicate a medium storing data for a short period such as a register, a cache, a memory, or the like, but indicates a machine-readable recording medium semi-permanently storing data. For example, the programs described above may be stored and provided in the non-transitory computer readable recording medium such as a compact disc (CD), a digital versatile disk (DVD), a hard disk, a Blu-ray disk, a universal serial bus (USB), a memory card, a read-only memory (ROM), or the like. In addition, the programs described above may be provided while being stored in the storage unit 150 of the first device 11 or the second device 21, as one example of the non-transitory computer readable recording medium.

Hereinabove, although embodiments of the present invention have been shown and described, it should be understood that the present invention is not limited to the disclosed embodiments and may be modified without departing from the scope and spirit of the present invention. Therefore, the present invention should be construed as including all modifications, equivalents, and substitutions included in the scope and spirit of the present invention, as defined by the appended claims and their equivalents.

What is claimed is:

1. A method of sharing a screen of a first device with a second device by the first device, the method comprising:
   transmitting video content displayed on the first device to the second device while the first device and the second device are connected in a first connection state, in which content displayed on the first device is displayed on the second device;
   based on a user input selecting a user interface (UI) element displayed on the first device, switching from the first connection state to a second connection state, in which content independent of the content displayed on the first device is displayed on the second device; and
   while the first device and the second device are connected in the second connection state, displaying content different than the video content on the first device and continuously transmitting the video content to the second device so that the video content is continuously displayed on the second device.

2. The method as claimed in claim 1, wherein switching the first connection state between the first device and the second device into the second connection state includes switching the first connection state between the first device and the second device into the second connection state in response to the user input selecting the UI element included in a pop-up screen which is independent of the video content displayed on the first device.

3. The method as claimed in claim 2, wherein the pop-up screen includes notification information indicating synchronization or desynchronization between screens of the first device and the second device.

4. The method as claimed in claim 2, wherein when the first device shares the video content with a group of second devices, the pop-up screen includes at least one of a number of second devices in the group of second devices, identification information of the group of second devices, and identification information of the second devices in the group of second devices.

5. The method as claimed in claim 1, wherein switching the first connection state between the first device and the second device into the second connection state includes stopping a synchronization mode in which the same screen is displayed by the first device and the second device and executing a desynchronization mode in which independent screens are displayed by the first device and the second device.

6. The method as claimed in claim 1, wherein transmitting the video content displayed on the first device to the second device includes compressing the video content and transmitting the compressed video content to the second device.

7. The method as claimed in claim 1, wherein transmitting the video content displayed on the first device to the second device includes compressing image contents included in the video content displayed on the first device and transmitting the compressed image contents to the second device.

8. The method as claimed in claim 1, further comprising:
receiving information on the user input through the second device from the second device; and
transmitting information related to the user input to the second device, in response to the information on the user input.

9. The method as claimed in claim 1, further comprising, before transmitting the video content displayed on the first device to the second device,
displaying icons representative of each of a plurality of second devices which communicate with the first device; and
when one of the displayed icons is selected, connecting the first device to one of the plurality of second devices corresponding to the selected icon in the first connection state.

10. The method as claimed in claim 1, wherein the user input is a floating input which is not in contact with a display of the first device.

11. A first device for sharing video content with a second device, the first device comprising:
a touch screen configured to sense a user input, and display the video content on the first device;
a communicator configured to transmit the displayed video content on the first device to the second device while the first device and the second device are connected in a first connection state, in which content displayed on the first device is displayed on the second device; and
a processor configured to:
based on a user input selecting a user interface (UI) element displayed on the first device, switch from the first connection state to a second connection state, in which content independent of content displayed on the first device is displayed on the second device, and
while the first device and the second device are connected in the second connection state, displaying content different than the video content on the first device, and continuously transmit the video content to the second device so that the video content is continuously displayed on the second device.

12. The first device as claimed in claim 11, wherein the touch screen is further configured to sense the user input selecting a UI element included in a pop-up screen which is independent of the video content displayed on the first device, in order to switch from the first connection state to the second connection state.

13. The first device as claimed in claim 12, wherein the pop-up screen includes notification information indicating synchronization or desynchronization between screens of the first device and the second device.

14. The first device as claimed in claim 12, wherein when the first device shares the video content with a group of second devices, the pop-up screen includes at least one of a number of second devices in the group of second devices, identification information of the group of second devices, and identification information of the second devices in the group of second devices.

15. The first device as claimed in claim 11, wherein when the first connection state is switched to the second connection state,
the processor is further configured to stop a synchronization mode in which the same screen is displayed by the first device and the second device, and execute a desynchronization mode in which independent screens are displayed by the first device and the second device.

16. The first device as claimed in claim 11, wherein when the communicator transmits the video content displayed on the first device to the second device, the communicator is further configured to compress the video content and transmit the compressed video content to the second device.

17. The first device as claimed in claim 11, wherein when the communicator transmits the video content displayed on the first device to the second device, the communicator is further configured to compress image contents included in the video content and transmit the compressed image contents to the second device.

18. The first device as claimed in claim 11, wherein the communicator is further configured to receive information on the user input from the second device, and transmit information related to the user input to the second device.

19. The first device as claimed in claim 11, wherein the touch screen is further configured to display icons representative of each of a plurality of second devices which communicate with the first device, and
wherein the processor is further configured to connect the first device to one of the plurality of second devices corresponding to a selected icon in the first connection state, when a user input selecting one of the displayed icons is received through the touch screen.

20. The first device as claimed in claim 11, wherein the user input is a floating input which is not in contact with a display of the first device.

* * * * *